US011340437B2

(12) United States Patent
Langlois et al.

(10) Patent No.: US 11,340,437 B2
(45) Date of Patent: May 24, 2022

(54) INCREASED CALCULATION EFFICIENCY FOR STRUCTURED ILLUMINATION MICROSCOPY

(71) Applicant: Illumina, Inc., San Diego, CA (US)

(72) Inventors: Robert Ezra Langlois, San Diego, CA (US); Andrew James Young, San Diego, CA (US); Andrew Dodge Heiberg, San Diego, CA (US); Bo Lu, San Diego, CA (US)

(73) Assignee: Illumina, Inc., San Diego, CA (US)

( * ) Notice: Subject to any disclaimer, the term of this patent is extended or adjusted under 35 U.S.C. 154(b) by 30 days.

(21) Appl. No.: 17/075,694

(22) Filed: Oct. 21, 2020

(65) Prior Publication Data

US 2021/0118110 A1  Apr. 22, 2021

Related U.S. Application Data

(60) Provisional application No. 62/924,130, filed on Oct. 21, 2019, provisional application No. 62/924,138, filed on Oct. 21, 2019.

(51) Int. Cl.
*G02B 21/00* (2006.01)
*G02B 27/60* (2006.01)
(Continued)

(52) U.S. Cl.
CPC ....... *G02B 21/008* (2013.01); *G01N 21/6428* (2013.01); *G01N 21/6458* (2013.01);
(Continued)

(58) Field of Classification Search
CPC .............. G02B 21/008; G02B 21/0032; G02B 21/0076; G02B 21/14; G02B 27/60;
(Continued)

(56) References Cited

U.S. PATENT DOCUMENTS 6,169,723 B1   1/2001 Fertner et al.
7,054,504 B2 *  5/2006 Ludwig .................... G06T 5/10
                                                         382/280
(Continued)

FOREIGN PATENT DOCUMENTS

WO   WO-2008140758 A1 * 11/2008 ......... G02B 21/0032
WO      2019147584 A1    8/2019

OTHER PUBLICATIONS

Chowdhury—Technical Developments in Structured Illumination Microscopy for Coherent and Multimodal Fluorescent Sub-Diffraction Resolution Imaging, (pp. 1-161) (Year: 2016).*
(Continued)

*Primary Examiner* — Manav Seth
(74) *Attorney, Agent, or Firm* — Haynes Beffel & Wolfeld, LLP; Ernest J. Beffel, Jr.

(57) ABSTRACT

The technology disclosed relates to structured illumination microscopy (SIM). In particular, the technology disclosed relates to capturing and processing, in real time, numerous image tiles across a large image plane, dividing them into subtiles, efficiently processing the subtiles, and producing enhanced resolution images from the subtiles. The enhanced resolution images can be combined into enhanced images and can be used in subsequent analysis steps. The technology disclosed includes logic to reduce computing resources required to produce an enhanced resolution image from structured illumination of a target. A method is described for producing an enhanced resolution image from images of a target captured under structured illumination. This method applies one or more transformations to non-redundant data and then recovers redundant data from the non-redundant data after the transformations.

44 Claims, 57 Drawing Sheets
(24 of 57 Drawing Sheet(s) Filed in Color)

(51) Int. Cl.
  *G01N 21/64* (2006.01)
  *G06T 3/40* (2006.01)
  *G02B 21/14* (2006.01)
  *G06T 5/50* (2006.01)

(52) U.S. Cl.
  CPC ..... *G02B 21/0032* (2013.01); *G02B 21/0076* (2013.01); *G02B 21/14* (2013.01); *G02B 27/60* (2013.01); *G06T 3/4053* (2013.01); *G06T 5/50* (2013.01); *G01N 2021/6439* (2013.01); *G06T 2207/10056* (2013.01); *G06T 2207/10152* (2013.01); *G06T 2207/20024* (2013.01); *G06T 2207/20056* (2013.01)

(58) Field of Classification Search
  CPC .......... G01N 21/6428; G01N 21/6458; G01N 2021/6439; G06T 3/4053; G06T 5/50; G06T 2207/10056; G06T 2207/10152; G06T 2207/20024; G06T 2207/20056; G06T 3/40; G06T 3/4069; G01B 11/25
  See application file for complete search history.

(56) References Cited

U.S. PATENT DOCUMENTS

| | | | | |
|---|---|---|---|---|
| 7,803,609 | B2 * | 9/2010 | Kaplan | G01N 21/6456 435/288.7 |
| 8,094,969 | B2 * | 1/2012 | Ludwig | G06T 5/10 382/280 |
| 8,934,731 | B2 * | 1/2015 | Ludwig | G06T 5/10 382/255 |
| 9,159,119 | B2 * | 10/2015 | Shechtman | H04N 5/232411 |
| 10,429,628 | B2 * | 10/2019 | Chou | G01N 21/6458 |
| 10,996,399 | B2 * | 5/2021 | Yang | G02B 6/3512 |
| 11,184,062 | B2 * | 11/2021 | Wang | H04B 7/0417 |
| 2018/0348500 | A1 | 12/2018 | Naaman, III et al. | |
| 2019/0226992 | A1 | 7/2019 | Guo | |

OTHER PUBLICATIONS

PCT/US2020/056718—Article 34 Amendments in response to Written Opinion filed Dec. 10, 2021, 29 pages.
Chowdry et al, Technical Developments in Structured Illumination Microscopy for Coherent and Multimodal Fluorescent Sub-Diffraction, Duke University, 2016, 161 pgs.
PCT/US2020/056718—International Search Report and Written Opinion dated Feb. 9, 2021, 19 pages.
Gustafsson, Surpassing the Lateral Resolution Limit By a Factor of Two Using, Journal of Microscopy, vol. 198, part 2, dated May 2, 2000, 6 pages.
PCT/US2020/056718—Article 34 Amendments in response to Written Opinion filed Aug. 23, 2021, 26 pages.
PCT/US2020/056717—Article 34 Amendments in response to Written Opinion filed Aug. 23, 2021, 26 pages.
PCT/US2020/056717—International Search Report and the Written Opinion dated Feb. 8, 2021, 20 pages.
PCT/US2020/056717—Second Written Opinion dated Sep. 24, 2021, 6 pages.
Mudry et. al., Structured Illumination Microscopy Using Unknown Speckle Patterns, Nature Photonics, dated Apr. 22, 2012, 4 pages.
Lal et. al., Structured Illumination Microscopy Image Reconstruction Algorithm, IEEE Journal of Selected Topics in Quantum Electronics, Feb. 19, 2016, 15 pages.
Wicker et. al., Phase Optimisation for Structured Illumination Microscopy, Optics Express, vol. 21, No. 2, Jan. 28, 2013, 18 pages.
Ayuk et. al., Structured Illumination Fluorescence Microscopy with Distorted Excitations Using, Optics Letters, dated Nov. 12, 2013, 4 pages.
Mudry et. al., Stuctured Illumination microscopy using unknown speckle patterns. Supplementary Text and Figures, Supplementary Information, Nature Photonics, dated 2012, 9 pages.
Ingerman et. al., Signal, noise and resolution in linear and nonlinear structured-illumination microscopy, Jounal of Microscopy, vol. 273, Issue 1 2019, dated Aug. 9, 2018, 23 pages.
Gustafsson et. al., Three-Dimensional Resolution Doubling in Wide-Field Fluoresence Microscopy by Structured Illumination, Biophysical Journal, vol. 94, dated Jun. 2008, 14 pages.
Sydor et. al., Super-Resolution Microscopy: From Single Molecules to Supramolecular Assemblies, Trends in Cell Biology, dated Nov. 2015, 19 pages.
Ball et. al., SIMCheck: a Toolbox for Successful Super-resolution Structured Illumination Microscopy, Scientific Reports, dated Mar. 3, 2015, 11 pages.
Allen et. al., Structured Illumination Microscopy for Superresolution, ChemPhysChem, vol. 15, dated 2014, 11 pages.
Gustafsson et. al., Doubling the lateral resolution of wide-field fluoresence microscopy using structured illumination, Proceedings of SPIE, vol. 3919, dated May 2, 2000, 11 pages.
Jost et. al., Structured illumination fluoresence microscopy with distorted excitations using a filtered blind-SIM algorithm, Optics Letters, vol. 38, No. 22, dated Nov. 15, 2013, 4 pages.
Lefman et. al., Live, Video-Rate Super-Resolution Microscopy Using Structured Illumination and Rapid GPU-Based Parallel Processing, Microscopy and Microanalysis, vol. 17, dated 2011, 6 pages.

* cited by examiner

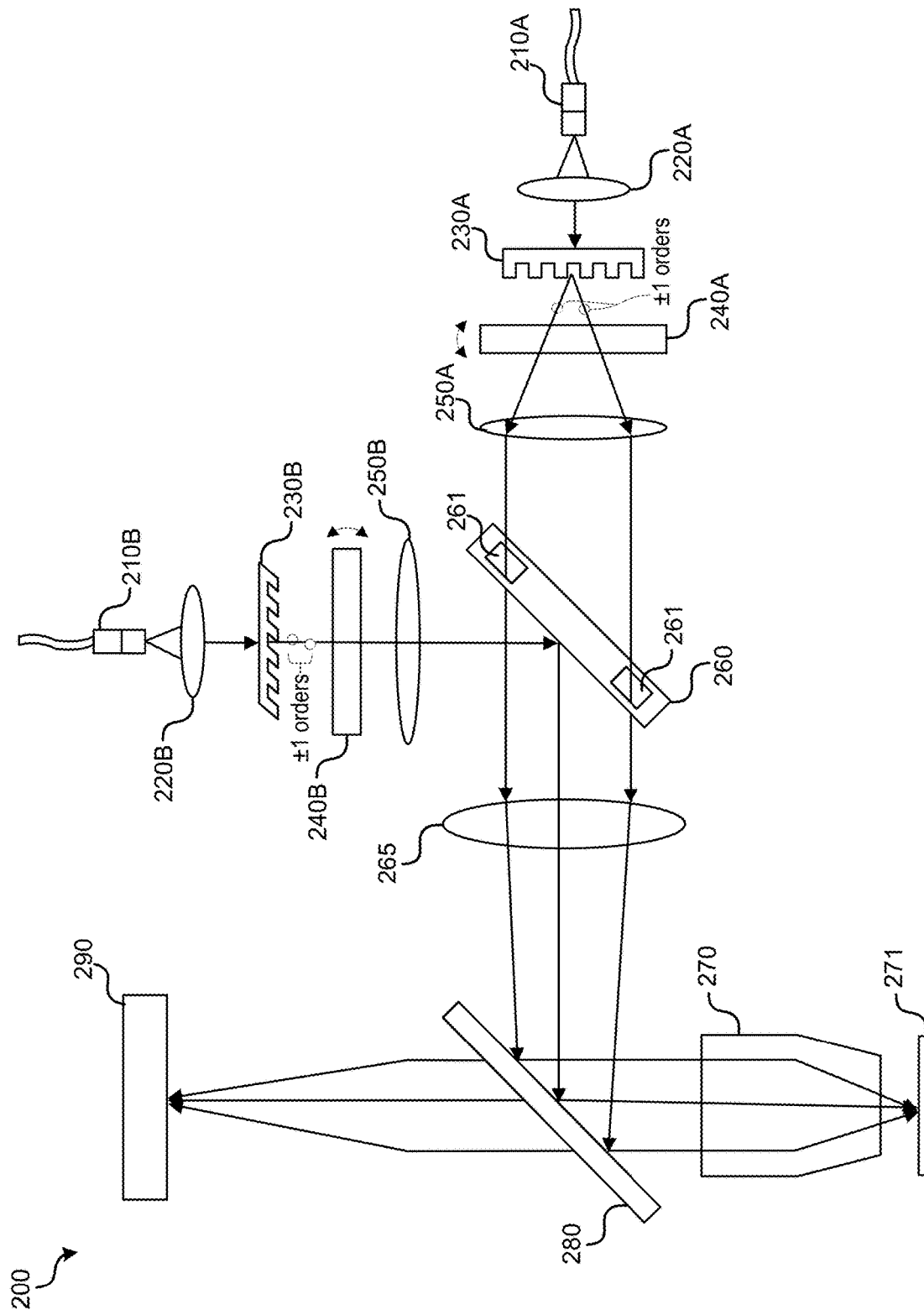

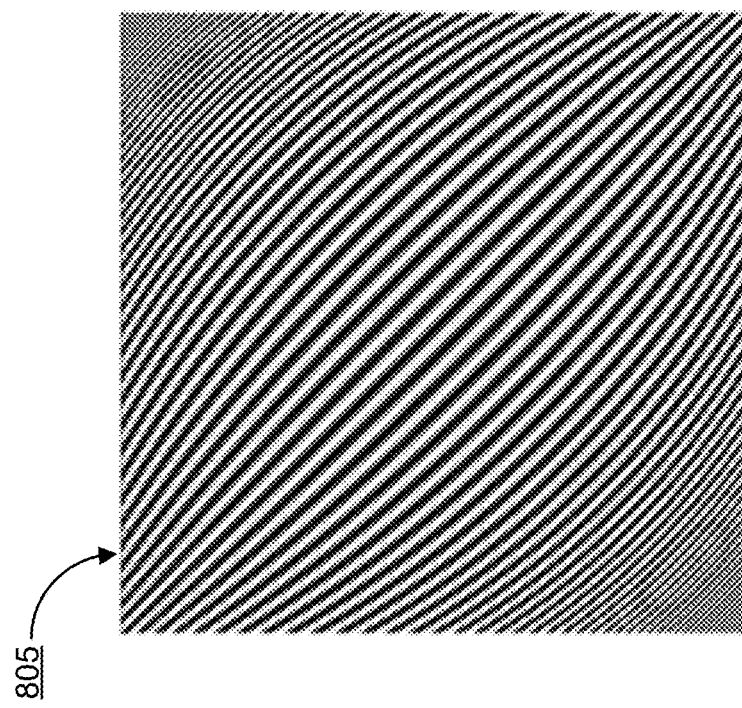
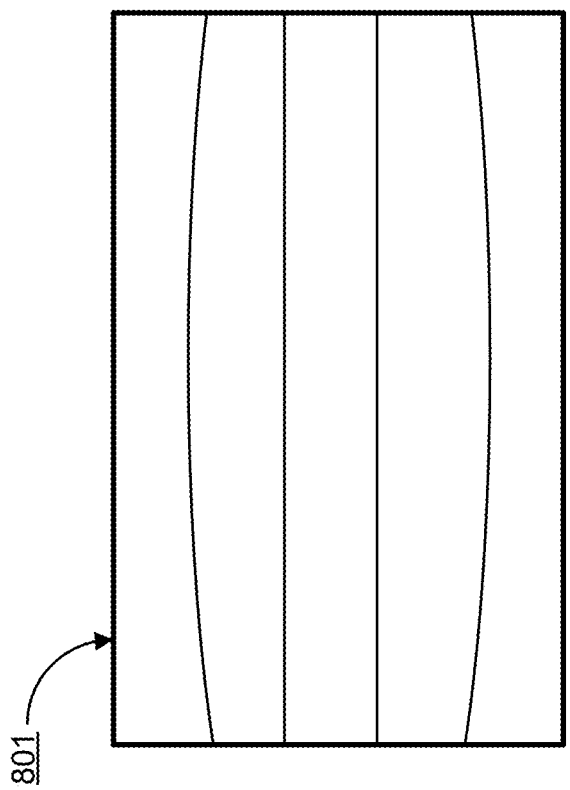
FIG. 8A

Fourier Space Symmetry  N x N Matrix X is divided into two matrices A and B
A = N x ((N/2) + 1)     B = N x (N - (N/2) - 1)

Matrix X 1910 with Even N          Matrix X 1920 with Odd N

FIG. 19

Three acquired images with one angle in Frequency domain
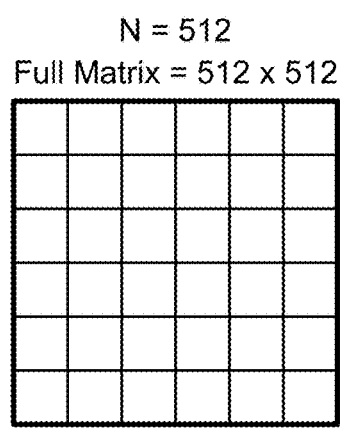
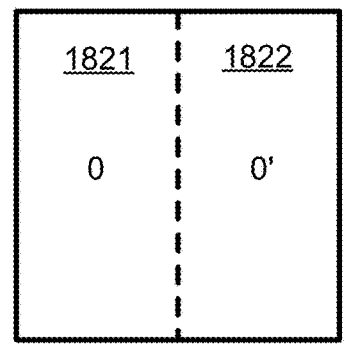
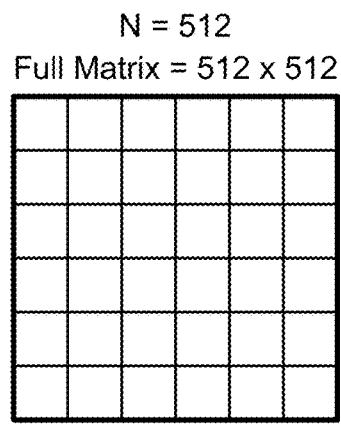
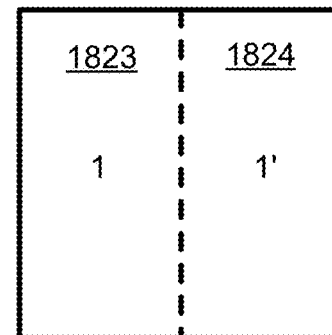
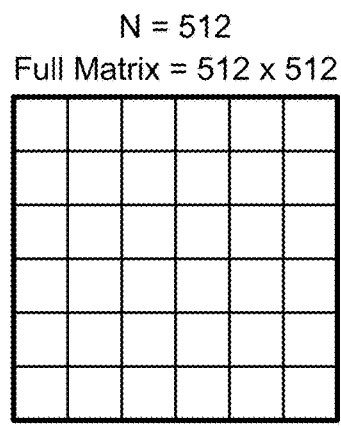
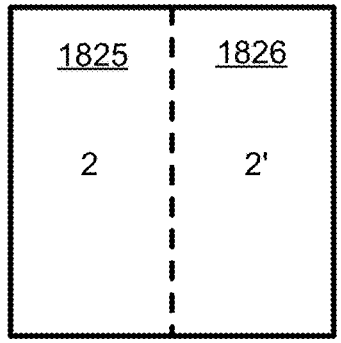
FIG. 20

Band Separation (1/2)
Non-redundant left half
matrix = 512 x 257
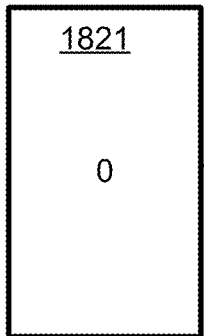
Non-redundant left half
matrix = 512 x 257
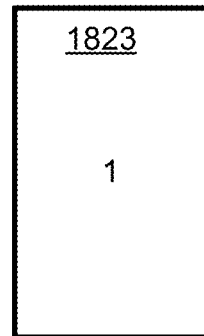
Non-redundant left half
matrix = 512 x 257
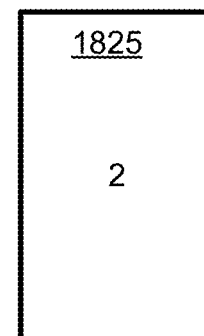
Reshape
Reshape
Reshape
Combined matrix
3 rows x 131584 columns
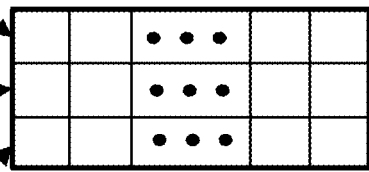
FIG. 21

Fourier Space Symmetry

N x N Matrix X is divided into two matrices A and B
A = N x ((N/2) + 1)    B = N x (N - (N/2) - 1)

DC Column

Illustration of (1,1) Shift

| 0 | 1 | 2 | 3 | 2* | 1* |
|---|---|---|---|----|----|
| 4 | 5 | 6 | 7 | 19* | 18* |
| 8 | 9 | 10 | 11 | 17* | 16* |
| 12 | 13 | 14 | 15 | 14* | 13* |
| 8* | 16 | 17 | 11* | 10* | 9* |
| 4* | 18 | 19 | 7* | 6* | 5* |

DC Row (1, 1) Shift

| 5 | 6 | 7 | 19* | 18* | 4 |
|---|---|---|-----|-----|---|
| 9 | 10 | 11 | 17* | 16* | 8 |
| 13 | 14 | 15 | 14* | 13* | 12 |
| 16 | 17 | 11* | 10* | 9* | 8* |
| 18 | 19 | 7* | 6* | 5* | 4* |
| 1 | 2 | 3 | 2* | 1* | 0 |

DC Row

DC Column

FIG. 23A

First and Middle Column Averaging
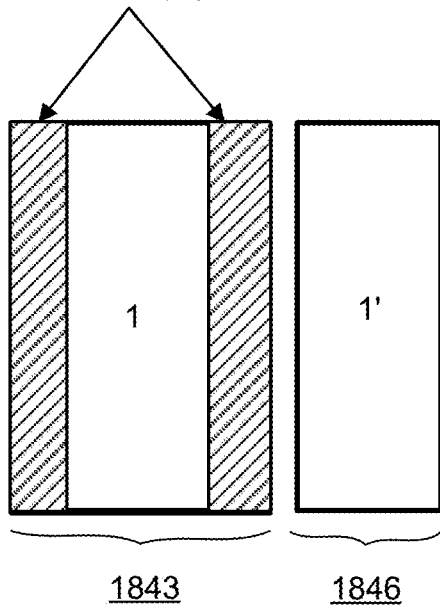
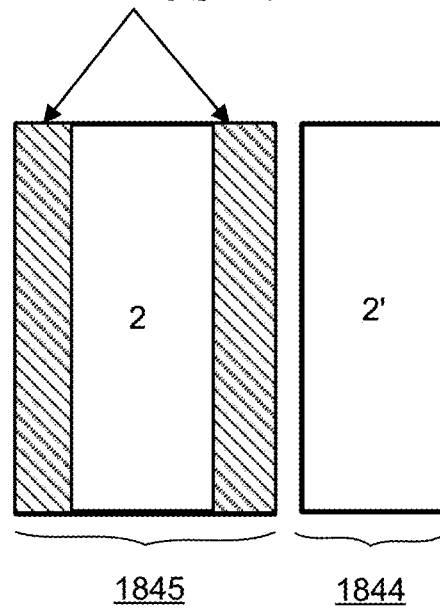
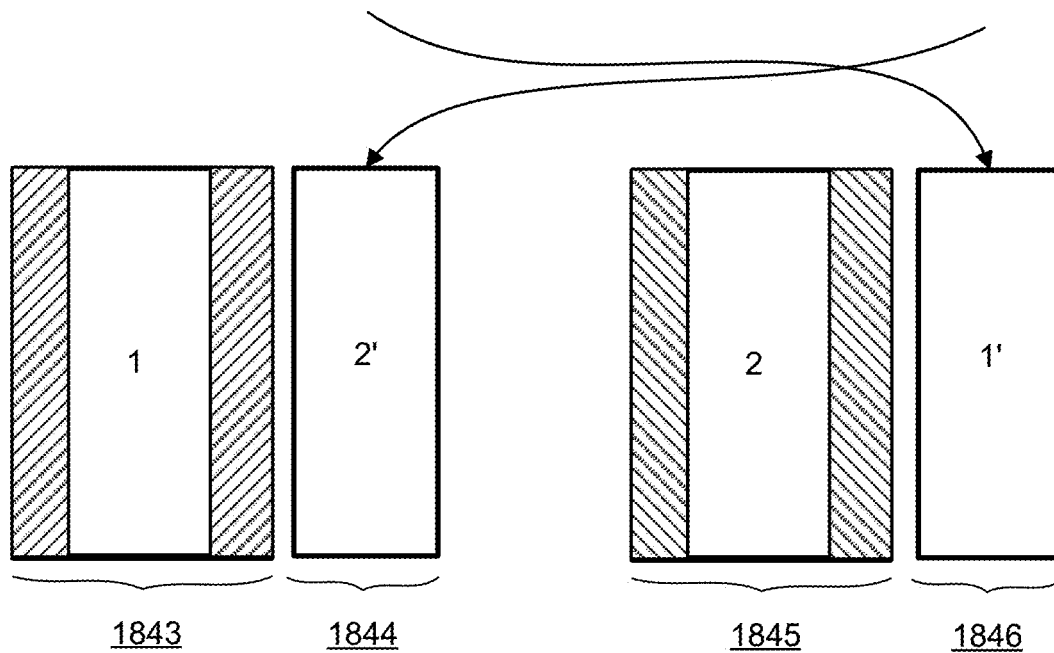
FIG. 23B

INCREASED CALCULATION EFFICIENCY FOR STRUCTURED ILLUMINATION MICROSCOPY

PRIORITY APPLICATIONS

This application claims the benefit of and incorporates by reference U.S. Provisional Patent Application No. 62/924,130, entitled, "Systems and Methods for Structured Illumination Microscopy", filed Oct. 21, 2019, and U.S. Provisional Patent Application No. 62/924,138, entitled, "Increased Calculation Efficiency for Structured Illumination Microscopy", filed on Oct. 21, 2019. This application also claims priority to and incorporates by reference U.S. Nonprovisional patent application Ser. No. 17/075,692, entitled, "Systems and Methods for Structured Illumination Microscopy", filed Oct. 21, 2020, and U.S. Nonprovisional patent application Ser. No. 17/075,694, entitled, "Increased Calculation Efficiency for Structured Illumination Microscopy", filed on Oct. 21, 2020, which both claim the benefit of the foregoing provisional applications.

INCORPORATIONS

The following are incorporated by reference for all purposes as if fully set forth herein: U.S. Provisional Application No. 62/692,303, entitled "Device for Luminescent Imaging" filed on Jun. 29, 2018 (unpublished) and US Nonprovisional Patent Application "Device for Luminescent Imaging" filed on Jun. 29, 2019.

FIELD OF THE TECHNOLOGY DISCLOSED

The technology disclosed relates to structured illumination microscopy (SIM). In particular, the technology disclosed relates to capturing and processing, in real time, numerous image tiles across a large image plane, dividing them into subtiles, efficiently processing the subtiles, and producing enhanced resolution images from the subtiles. The enhanced resolution images can be combined into enhanced images and can be used in subsequent analysis steps.

The technology disclosed relates to structured illumination microscopy. In particular, the technology disclosed relates to reducing the computation required to process, in real time, numerous image tiles across a large image plane and producing enhanced resolution images from image tiles/subtiles. During some intermediate transformations in the SIM processing chain, nearly half of the multiplications and divisions otherwise required can be replace by lookup operations using the particular exploitations of symmetry that are described.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

More than a decade ago, pioneers in structured illumination microscopy receive a Nobel Prize for Physics. Enhancing image resolution, beyond the Abbe diffraction limit, was an outstanding development.

Both 2D and 3D SIM have been applied to imaging biological samples, such as parts of individual cells. Much effort has gone into and many alternative technical variations have resulted from efforts to study the interior of cells.

Resolving millions of sources spread across an image plane presents a much different problem than looking inside cells. For instance, one of the new approaches that has emerged, combines numerous images with specular illumination to produce an enhanced resolution image after extensive computation. Real time processing of a large image plane with modest resources requires a radically different approach than such recent work has taken.

Accordingly, an opportunity arises to introduce new methods and systems adapted to process large image planes with reduced requirements for computing resources.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The color drawings also may be available in PAIR via the Supplemental Content tab. In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which:

FIG. 3 is an optical system diagram illustrating an example optical configuration of two-arm SIM image system.

FIG. 8A is a simplified depiction of bending parallel lines due to distortion of a lens that magnifies.

FIG. 19 illustrates symmetries in Fourier space for matrices with even and odd number of rows and columns.

FIG. 20 illustrates non-redundant and redundant halves of the full matrices in frequency domain representing three acquired images acquired with one illumination peak angle.

FIG. 21 illustrates reshaping of non-redundant halves of the three matrices in frequency domain representing the three images acquired with one illumination peak angle.

FIG. 23A illustrates an example of (1, 1) shift operation applied to a matrix.

FIGS. 23B and 23C illustrate averaging of first and middle columns in non-redundant SIM image reconstruction.

DETAILED DESCRIPTION

Figure 1A:
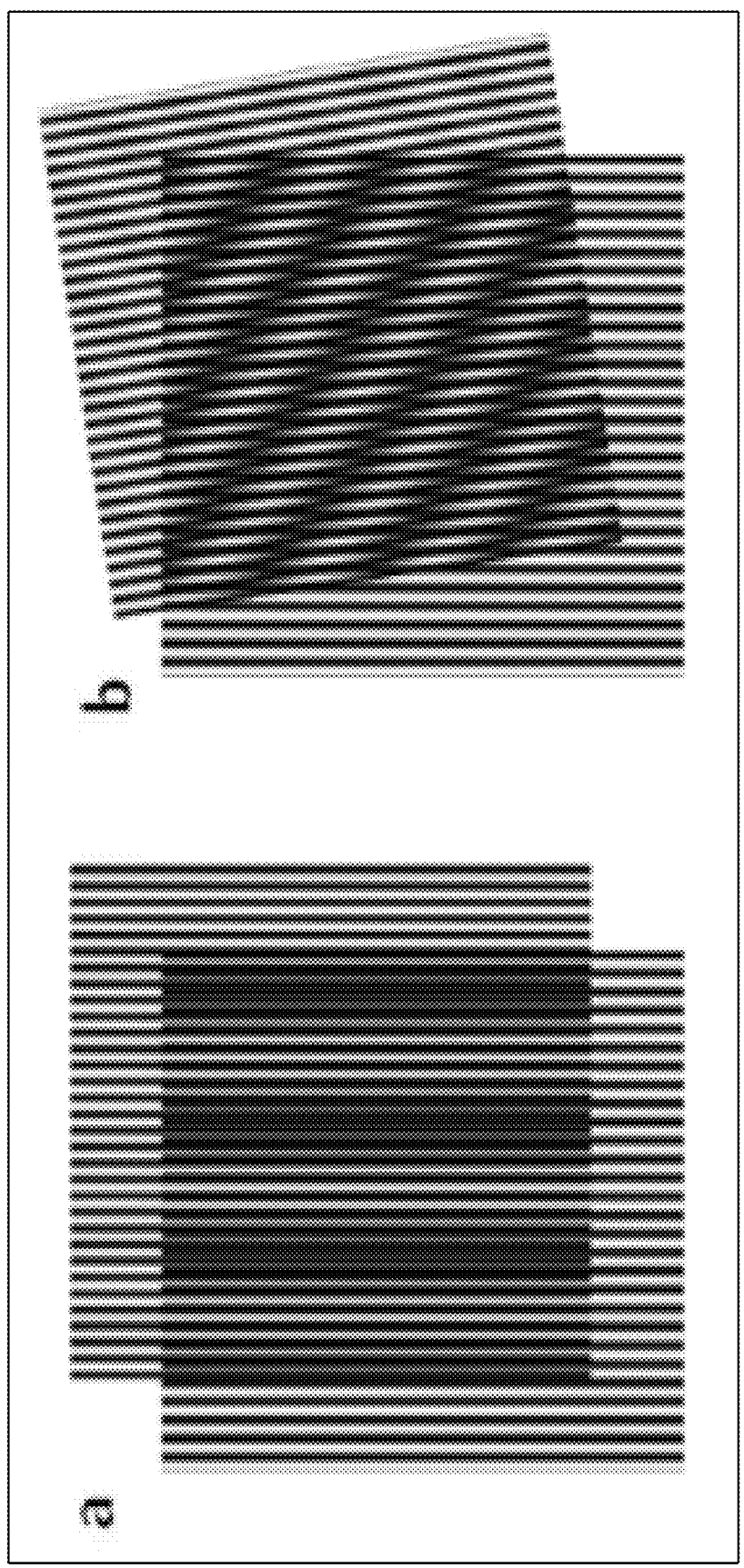
FIG. 1A shows Moiré fringe formation by using a grating with one dimensional (1D) modulation.

The following discussion is presented to enable any person skilled in the art to make and use the technology disclosed, and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein.

Introduction

Structured illumination microscopy in two and three dimensions has helped researchers investigate the internal structure of living cells and even the molecular arrangement of biological materials, because it improves the resolution of image capture systems. See, e.g., Sydor, Andrew & Czymmek, Kirk & Puchner, Elias & Mennella, Vito. (2015). Super-Resolution Microscopy: From Single Molecules to Supramolecular Assemblies. Trends in Cell Biology. 25. 10.1016/j.tcb.2015.10.004; also, Lal et al. 2015, A., Shan, C., & Xi, P. (2015). Structured illumination microscopy image reconstruction algorithm. IEEE Journal of Selected Topics in Quantum Electronics, 22(4), 50-63. For readers who desire a refresher on SIM processing, Lal et al. 2015 is an excellent combination of illustrations and mathematical exposition, short of deriving the equations used. This disclosure extends SIM technology to image processing of flow cells with several technologies that can be used individually or in combination.

SIM holds the potential to resolve densely packed samples, from flow cells with fluorescent signals from millions of sample points, thereby reducing reagents needed for processing and increasing image processing throughput. The trick is to resolve densely pack fluorescent samples, closer together even than the Abbe diffraction limit for resolving adjoining light sources, using SIM techniques. The samples can be in regularly spaced nanowells or they can be randomly distributed clusters. Most of the description that follows is directed to patterned nanowells, but the SIM technology also applies to randomly distributed clusters.

Technical problems related to lens distortions and required computational resources emerge from resolving densely packed sources. This disclosure addresses those technical problems.

Structured illumination can produce images that have several times as many resolved illumination sources as with normal illumination. Information is not simply created. Instead, multiple images with varying angles and phase displacements of structured illumination are used to transform closely spaced, otherwise unresolvably high spatial frequency features, into lower frequency signals that can be sensed by an optical system without violating the Abbe diffraction limit. This limit is physically imposed on imaging by the nature of light and optics and is expressed as a function of illumination wavelength and the numerical aperture (NA) of the final objective lens. Applying SIM reconstruction, information from multiple images is transformed from the spatial domain into the Fourier domain, combined and processed, then reconstructed into an enhanced image.

In SIM, a grating is used, or an interference pattern is generated, between the illumination source and the sample, to generate an illumination pattern, such as a pattern that varies in intensity according to a sine or cosine function. In the SIM context, "grating" is sometimes used to refer to the projected structured illumination pattern, in addition to the surface that produces the structured illumination pattern.

The structured illumination pattern alternatively can be generated as an interference pattern between parts of a split coherent beam.

Figure 1B:
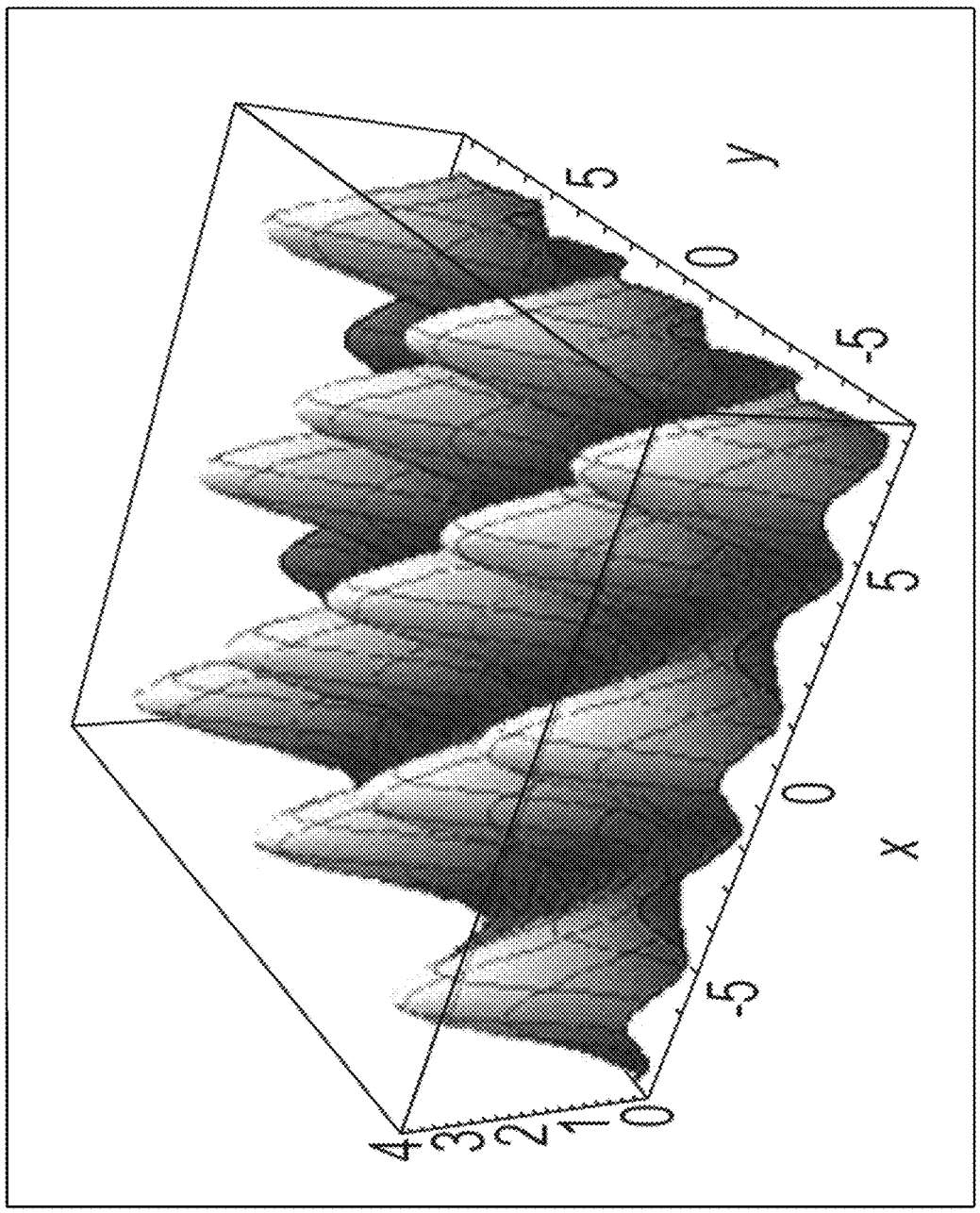
FIG. 1B presents a graphical illustration of illumination intensities produced by a two dimensional (2D) structured illumination pattern.

Projection of structured illumination onto a sample plane, for example in FIG. 1, mixes the illumination pattern with fluorescent (or reflective) sources in a sample to induce a new signal, sometimes called a Moiré fringe or aliasing. The new signal shifts high-spatial frequency information to a lower spatial frequency that can be captured without violating the Abbe diffraction limit. After capturing images of a sample illuminated with a 1D intensity modulation pattern, as shown in FIG. 1A, or 2D intensity modulation pattern, as in FIG. 1B, a linear system of equations is solved and used to extract from multiple images of the Moiré fringe or aliasing, parts of the new signal that contains information shifted from the higher to the lower spatial frequency. To solve the linear equations, three or more images are captured with the structured illumination pattern shifted or displaced in steps. Often, images of varying phases (3 to 7 phases) per angle (with one to five angles) are captured for analysis and then separated by bands for Fourier domain shifting and recombination. Increasing the number of images can improve the quality of reconstructed images by boosting the signal-to-noise ratio. However, it can also increase computation time. The Fourier representation of the band separated images is shifted and summed to produce a reconstructed sum. Eventually, an inverse Fast Fourier Transform (FFT) reconstructs a new high-resolution image from the reconstructed sum.

Applying the multiple image and shifting approach only enhances image information in a specific direction along which a 1D structured illumination pattern is shifted, so the structured illumination or grating pattern is rotated, and the shifting procedure repeated. Rotations such as 45, 60, 90 or 120 degrees of a 1D pattern can be applied to produce six or nine images in sets of three steps. Environmental factors such as damage to molecules on the surface of flow cells due to blue and green colored lasers, tilts of tiles on the surface of flow cells etc., can cause distortions in phase bias estimations for image subtiles or subwindows of the full field of view (FOV) image. They also can cause differences among tiles across a substrate. More frequent estimation of SIM image reconstruction parameters can be performed to compensate for these environmental factors. For example, the phase biases of subtiles can be re-estimated for every tile, every cycle of reconstruction to minimize these errors. Angle and spacing parameters do not change as frequently as phase bias and therefore, increasing their estimation frequency can introduce additional compute that is not necessary. However, angle and spacing parameters can be computed more frequently, if required.

Application of SIM to Flow Cell Image Analysis

Imaging a flow cell with millions of fluorescent samples is more like scanning space with a telescope than like studying micro-structures of a living cell. Scanning a flow cell with economical optics is more like capturing images with an instamatic camera than like using the adaptive optics of the Mount Palomar Observatory. Scanning a flow cell or the sky involves numerous images that cover tiles of the target, as opposed to imaging a living cell in the sweet spot of a lens. The number of images required to cover any target depends on the field of view of each image tile and the extent of overlap. An economical lens suffers distortions at the edges of the field of view, which complicates generation of enhanced images.

Calculations used in SIM reconstruction are sensitive to lens distortions, pattern alignment in a particular image set, and thermal effects on pattern alignment over imaging cycles that progress for hours and hours. Increasing the field of view, using most of the lens instead of a sweet spot in the center, makes the reconstruction of the SIM images susceptible to distortion induced by the aberrations in the lens. These aberrations, such as coma, distort the structured illumination pattern and make parallel lines of illumination peaks appear to curve, as generally depicted in FIG. 8A, changing the distance between brightness peaks of the pattern and apparent pattern angles.

Practical instruments require characterization that maps distortions and offsets across subtiles of a tile. Due to the duration of flow cell imaging over cycles, some instruments will benefit from updated characterization at the beginning of a run or even during a run. Thermal distortion over hours and hours of flow cell imaging in hundreds of cycles, can make it useful to recharacterize the angle, spacing and phase (shift) of the structured illumination occasionally or regularly.

The angle (rotation) and spacing (scale) of a projected structured illumination pattern can be determined by fringe peak estimation when the instrument is characterized. The estimated phase or displacement of the repeating pattern along a direction of stepping can be expressed as a spatial shift of 0 to 360 degrees, or could be expressed in radians. Distortion across the lens complicates parameter estimation, leading to proposals for computationally expensive reconstructions from numerous images. See, e.g., Ayuk et al. (2013) Structured illumination fluorescence microscopy with distorted excitations using a filtered blind-SIM algorithm. Optics letters. 38. 4723-6. 10.1364/OL.38.004723; and Mudry et al. (2012) Structured illumination microscopy using unknown speckle patterns. Nature Photonics. 6. 312-315. The technology disclosed simplifies repeated parameter estimation and reduces the computation needed in repeated estimation cycles.

Real time parameter estimation for SIM reconstruction is computationally challenging. The computing power needed for SIM reconstruction increases with a cubic relationship to the number of pixels in an image field or subfield. For example, for an image with a width of M pixels and a height of N pixels, the Fourier Transform can have a computational complexity of $k*M*N(\log(M*N))$. Therefore, the order of magnitude of resources for SIM image reconstruction can increase between quadratic $O(N^2)$ and cubic $O(N^3)$ as the number of pixels in the images increase. Thus, a two-fold increase in image dimensions such as from 512×512 to 1024×1024 can result in up to eight times increase in computational cost. It is particularly challenging to reconstruct an enhanced image from six or nine images of 20 megapixels on a CPU, at a rate of one completed reconstruction each 0.3 seconds, while scanning proceeds. Real time processing is desirable to reduce storage requirements and track quality of flow cell processing over hours and hours as scanning and sequencing proceeds. The technology disclosed reduces some core computations by approximately one-half, using symmetry and near symmetry in matrices of Fourier domain coefficients.

Addressing Lens Distortion

The technology disclosed addresses lens distortion that is not too severe, for an optical system within economical manufacturing tolerances, by subdividing a captured image tile into subtiles and handling a near-center subtile differently than other subtiles. The image captured by the optical sensor can be referred to as a tile. An imaging cycle for the flow cell captures many image tiles with some overlap. Each image tile is divided into independently evaluated subtiles.

Subtiles can be reconstructed independently of one another, even in parallel. Reconstructions from enhanced subtiles can be stitched together to create a reconstructed tile with enhanced spatial resolution.

The interpolation technology disclosed for relating reconstruction parameters for the near-center subtile to other subtiles approximates a non-linear function, such as a quadratic curve, with a piece-wise approximation. The technology disclosed subdivides an image tile into subtiles such that the peak lines are approximately evenly spaced within a subtile, thereby achieving better image quality from reconstructed subtiles across a field of view of a lens.

This subtiling approach to mitigate fringe distortion creates a new problem: reconstruction parameters must be estimated for each subtile. Parameter estimation is the most expensive setup in SIM reconstruction and subtiling makes increases the parameter estimation run time by at least one order of magnitude, e.g., an image divided into a 5×5 subtiles will create an algorithm that is 25 times slower. A tile divided into 8×11 subtiles requires 88 sets of reconstruction parameters instead of just one set.

The technology disclosed learns a function that maps the distortion and thereby reduces recalculation in repeated cycles. The learned function remains valid across cycles and image sets because it maps optical characteristics of the optical system that change when the optical system is changed, e.g., through realignment. During estimation cycles, between instrument characterizations, expensive parameter estimate computation focuses on a single, near-center subtile. The parameters for each subtile map measurements in cycles from the near-center, reference subtile and to the other subtiles.

Three parameters are mapped for the subtiles: illumination peak angle, illumination peak spacing and phase displacement. The illumination peak angle is also referred to as grating angle. The illumination peak spacing is also referred to as grating spacing. The technology disclosed maps the angle and spacing using quadratic surface distortion models. The phase displacement or simply the phase is the shift of the structured illumination pattern or grating as projected onto the sample plane.

Reusable spacing and angle distortion models are computed a priori using a subtiling approach to characterize the full FOV. The window or subtile approach divides a tile into overlapping windows or subtiles of images and performs SIM parameter estimation on each subtile. The subtile parameter estimation results are then fed into least squares regression, which generates quadratic surfaces of distortion. Stored coefficients of the equations can then be used to extrapolate the parameters of subtiles or at any location in the full field of view image. In alternative implementations, the coefficients can be stored and used, or they can be translated into a subtile a lookup table that relates the near-center subtile to the other subtiles. A near-center subtile is used as the reference, because the center of a lens suffers less distortion than the rim.

For phase relationship among subtiles, a lookup table works better than a curve fit, as presented below.

Over the course of a run that extends hours and hours, periodic recharacterization can be applied to guard against thermal instability and resulting drift. After the extrapolation factors have been redetermined, the process resumes extrapolating parameter estimates for the near-center subtile to the other subtiles by extrapolation and without expensive parameter estimates for the other subtiles.

Exploiting Symmetry to Reduce Calculation Cost

When imaging a single cell, SIM reconstruction from numerous images is often done on specialized hardware such as a GPU, FPGA or CGRA. Using abundant computing resources, reconstruction algorithms work with fully redundant, center shifted Fourier Transforms. Using, instead, a reasonably priced CPU, we disclose SIM reconstruction using non-redundant coefficients of Fourier transformed images. An implementation is described based on symmetries of data in a corner shifted Fourier transform space. Using certain symmetries increases program complexity, but can reduce the amount of data for compute in a core set of calculations by half and the number of calculations required by half, while maintaining nearly the same accuracy. We also reduce computation required to shift Fourier representations of images being combined.

Adaptation to 2D Illumination Patterns

The standard algorithms for 1D modulated illumination require modification when used with a 2D modulated illumination pattern. This includes illumination peak spacing and illumination peak angle estimation, which requires a 2D band separation instead of a 1D. It also includes Wicker phase estimation, which must work from two points (instead of one) in order to estimate the phase in 2 dimensions. A 1D interference pattern can be generated by one dimensional diffraction grating as shown in FIG. 1A or as a result of an interference pattern of two beams.

FIG. 1B illustrates an intensity distribution that can be produced by a two-dimensional (2D) diffraction grating or by interference of four light beams. Two light beams produce an intensity pattern (horizontal bright and dark lines) along y-axis and are therefore referred to as the y-pair of incident beams. Two more light beams produce an intensity pattern (vertical bright and dark lines) along x-axis and are referred to as the x-pair of incident beams. The interference of the y-pair with the x-pair of light beams produces a 2D illumination pattern. FIG. 1B shows intensity distribution of such a 2D illumination pattern.

Figure 1C:
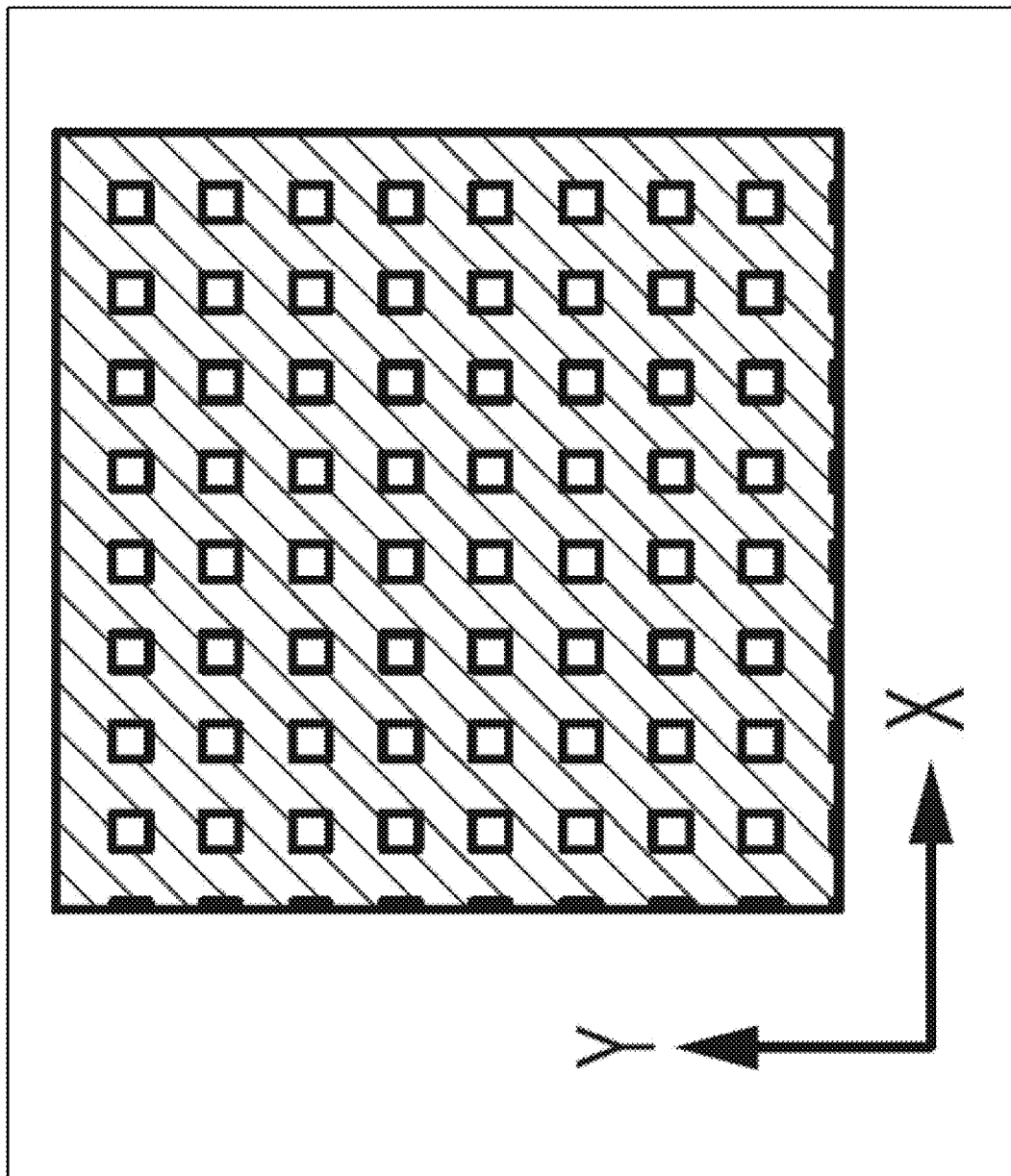
FIG. 1C illustrates an example geometrical pattern for nanowell arrangement.

FIG. 1C illustrates an arrangement of nanowells at the surface of a flow cell positioned at corners of a rectangle. When using 1D structured illumination, the illumination peak angle is selected such that images are taken along a line connecting diagonally opposed corners of the rectangle. For example, two sets of three images (a total of six images) can be taken at +45 degree and −45-degree angles. As the distance along the diagonal is more than the distance between any two sides of the rectangle, we are able to achieve a higher resolution image. Nanowells can be arranged in other geometric arrangements such as a hexagon. Three or more images can then be taken along each of three diagonals of the hexagon, resulting, for instance, in nine or fifteen images.

The new and specialized technologies disclosed can be used individually or in combination to improve scanning performance while detecting florescence of millions of samples distributed across a flow cell, over multiple cycles. In sections that follow, we introduce terminology, describe an imaging instrument that can be improved using the technology disclosed, and disclose new image enhancement technologies that can be used individually or in combination.

Terminology

As used herein to refer to a structured illumination parameter, the term "frequency" is intended to refer to an inverse of spacing between fringes or lines of a structured illumination pattern (e.g., fringe or grid pattern) as frequency and period are inversely related. For example, a pattern having a greater spacing between fringes will have a lower frequency than a pattern having a lower spacing between fringes.

As used herein to refer to a structured illumination parameter, the term "phase" is intended to refer to a phase of a structured illumination pattern illuminating a sample. For example, a phase may be changed by translating a structured illumination pattern relative to an illuminated sample.

As used herein to refer to a structured illumination parameter, the term "orientation" is intended to refer to a relative orientation between a structured illumination pattern (e.g., fringe or grid pattern) and a sample illuminated by the pattern. For example, an orientation may be changed by rotating a structured illumination pattern relative to an illuminated sample.

As used herein to refer to a structured illumination parameter, the terms "predict" or "predicting" are intended to mean calculating the value(s) of the parameter without directly measuring the parameter or estimating the parameter from a captured image corresponding to the parameter. For example, a phase of a structured illumination pattern may be predicted at a time t1 by interpolation between phase values directly measured or estimated (e.g., from captured phase images) at times t2 and t3 where t2<t1<t3. As another example, a frequency of a structured illumination pattern may be predicted at a time t1 by extrapolation from frequency values directly measured or estimated (e.g., from captured phase images) at times t2 and t3 where t2<t3<t1.

As used herein to refer to light diffracted by a diffraction grating, the term "order" or "order number" is intended to mean the number of integer wavelengths that represents the path length difference of light from adjacent slits or structures of the diffraction grating for constructive interference. The interaction of an incident light beam on a repeating series of grating structures or other beam splitting structures can redirect or diffract portions of the light beam into predictable angular directions from the original beam. The term "zeroth order" or "zeroth order maximum" is intended to refer to the central bright fringe emitted by a diffraction grating in which there is no diffraction. The term "first-order" is intended to refer to the two bright fringes diffracted to either side of the zeroth order fringe, where the path length difference is ±1 wavelengths. Higher orders are diffracted into larger angles from the original beam. The properties of the grating can be manipulated to control how much of the beam intensity is directed into various orders. For example, a phase grating can be fabricated to maximize the transmission of the ±1 orders and minimize the transmission of the zeroth order beam.

As used herein to refer to a sample, the term "feature" is intended to mean a point or area in a pattern that can be distinguished from other points or areas according to relative location. An individual feature can include one or more molecules of a particular type. For example, a feature can include a single target nucleic acid molecule having a particular sequence or a feature can include several nucleic acid molecules having the same sequence (and/or complementary sequence, thereof).

As used herein, the term "xy plane" is intended to mean a 2-dimensional area defined by straight line axes x and y in a Cartesian coordinate system. When used in reference to a detector and an object observed by the detector, the area can be further specified as being orthogonal to the beam axis, or the direction of observation between the detector and object being detected.

As used herein, the term "z coordinate" is intended to mean information that specifies the location of a point, line or area along an axis that is orthogonal to an xy plane. In particular implementations, the z axis is orthogonal to an area of an object that is observed by a detector. For example, the direction of focus for an optical system may be specified along the z axis.

As used herein, the term "optically coupled" is intended to refer to one element being adapted to impart light to another element directly or indirectly.

SIM Hardware

This section of builds on the disclosure previously made by Applicant in U.S. Provisional Application No. 62/692,303 filed on Jun. 29, 2018 (unpublished). Structured illumination microscopy (SIM) describes a technique by which spatially structured (i.e., patterned) light may be used to image a sample to increase the lateral resolution of the microscope by a factor of two or more. FIG. 1A shows Moiré fringe (or Moiré pattern) formation by using a grating with 1D modulation. The surface containing the sample is illuminated by a structured pattern of light intensity, typically sinusoidal, to effect Moiré fringe formation. FIG. 1A shows two sinusoidal patterns when their frequency vectors, in frequency or reciprocal space, are (a) parallel and (b) non-parallel. FIG. 1A is a typical illustration of shifting high-frequency spatial information to lower frequency that can be optically detected. The new signal is referred to as Moiré fringe or aliasing. In some instances, during imaging of the sample, three images of fringe patterns of the sample are acquired at various pattern phases (e.g., 0°, 120°, and 240°), so that each location on the sample is exposed to a range of illumination intensities, with the procedure repeated by rotating the pattern orientation about the optical axis to 2 (e.g., 45°, 135°) or 3 (e.g. 0°, 60° and 120°) separate angles. The captured images (e.g., six or nine images) may be assembled into a single image having an extended spatial frequency bandwidth, which may be retransformed into real space to generate an image having a higher resolution than one captured by a conventional microscope.

In some implementations of SIM systems, a linearly polarized light beam is directed through an optical beam splitter that splits the beam into two or more separate orders that may be combined and projected on the imaged sample as an interference fringe pattern with a sinusoidal intensity variation. Diffraction gratings are examples of beam splitters that can generate beams with a high degree of coherence and stable propagation angles. When two such beams are combined, the interference between them can create a uniform, regularly-repeating fringe pattern where the spacing is determined by factors including the angle between the interfering beams.

FIG. 1B presents an example of a 2D structured illumination. A 2D structured illumination can be formed by two orthogonal 1D diffraction gratings superimposed upon one another. As in the case of 1D structured illumination patterns, the 2D illumination patterns can be generated either by use of 2D diffraction gratings or by interference between four light beams that creates a regularly repeating fringe pattern.

During capture and/or subsequent assembly or reconstruction of images into a single image having an extended spatial frequency bandwidth, the following structured illumination parameters may need to be considered: the orientation or angle of the fringe pattern also referred to as illumination peak angle relative to the illuminated sample, the spacing between adjacent fringes referred to as illumination peak spacing (i.e., frequency of fringe pattern), and phase displacement of the structured illumination pattern. In an ideal imaging system, not subject to factors such as mechanical instability and thermal variations, each of these parameters would not drift or otherwise change over time, and the precise SIM frequency, phase, and orientation parameters associated with a given image sample would be known. However, due to factors such as mechanical instability of an excitation beam path and/or thermal expansion/contraction of an imaged sample, these parameters may drift or otherwise change over time.

As such, a SIM imaging system may need to estimate structured illumination parameters to account for their variance over time. As many SIM imaging systems do not perform SIM image processing in real-time (e.g., they process captured images offline), such SIM systems may spend a considerable amount of computational time to process a SIM image to estimate structured illumination parameters for that image.

FIGS. 2-4B illustrate three such example SIM imaging systems. It should be noted that while these systems are described primarily in the context of SIM imaging systems that generate 1D illumination patterns, the technology disclosed herein may be implemented with SIM imaging systems that generate higher dimensional illumination patterns (e.g., two-dimensional grid patterns).

Figure 2:
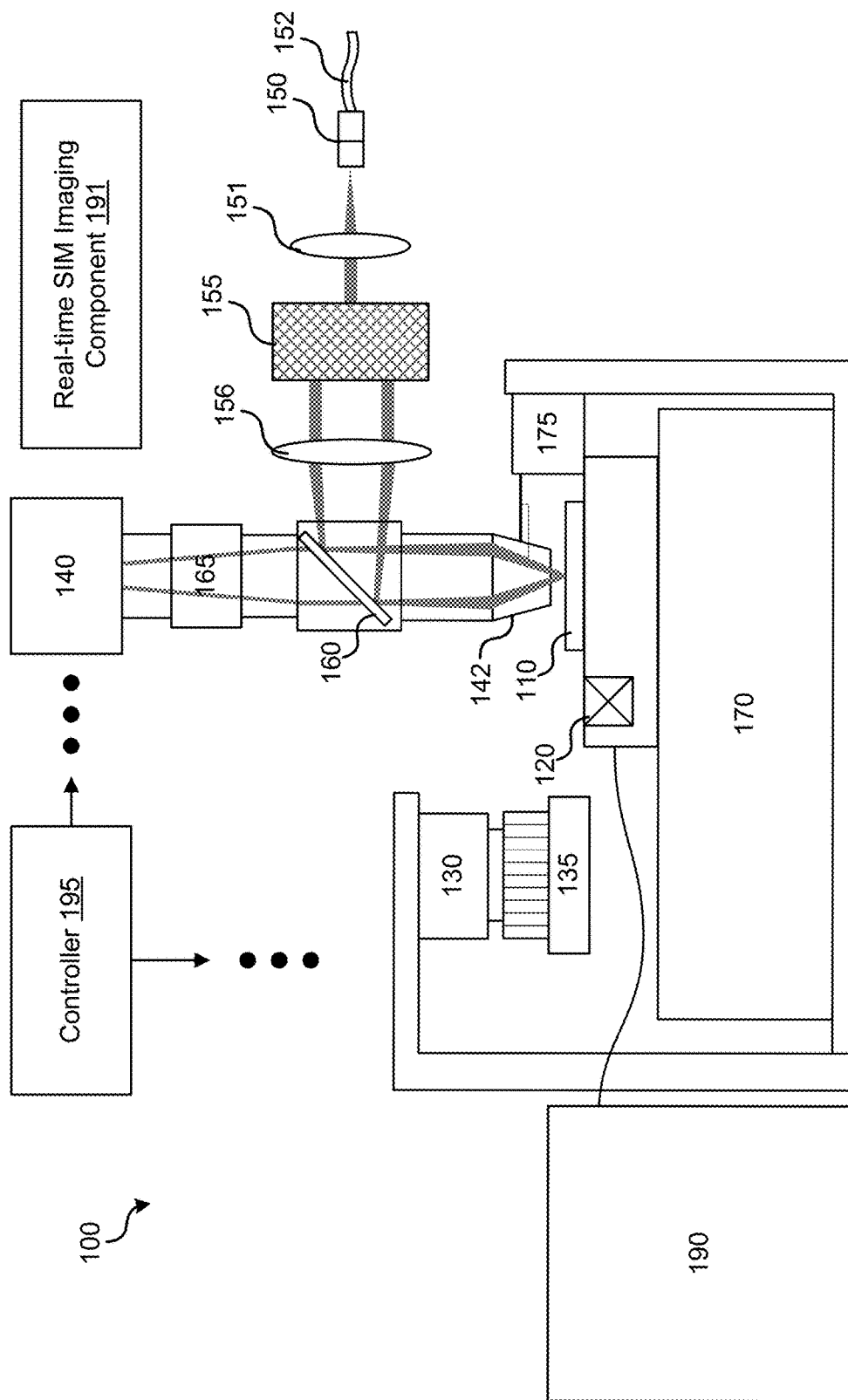
FIG. 2 illustrates a structured illumination microscopy imaging system that may utilize spatially structured excitation light to image a sample.

FIG. 2 illustrates a structured illumination microscopy (SIM) imaging system 100 that may implement structured illumination parameter prediction in accordance with some implementations described herein. For example, system 100 may be a structured illumination fluorescence microscopy system that utilizes spatially structured excitation light to image a biological sample.

In the example of FIG. 2, a light emitter 150 is configured to output a light beam that is collimated by collimation lens 151. The collimated light is structured (patterned) by light structuring optical assembly 155 and directed by dichroic mirror 160 through objective lens 142 onto a sample of a sample container 110, which is positioned on a motion stage 170. In the case of a fluorescent sample, the sample fluoresces in response to the structured excitation light, and the resultant light is collected by objective lens 142 and directed to an image sensor of camera system 140 to detect fluorescence.

Light structuring optical assembly 155 includes one or more optical diffraction gratings or other beam splitting elements (e.g., a beam splitter cube or plate) to generate a pattern of light (e.g., fringes, typically sinusoidal) that is projected onto samples of a sample container 110. The diffraction gratings may be one-dimensional or two-dimensional transmissive or reflective gratings. The diffraction gratings may be sinusoidal amplitude gratings or sinusoidal phase gratings.

In some implementations, the diffraction grating(s)s may not utilize a rotation stage to change an orientation of a structured illumination pattern. In other implementations, the diffraction grating(s) may be mounted on a rotation stage. In some implementations, the diffraction gratings may be fixed during operation of the imaging system (i.e., not require rotational or linear motion). For example, in a particular implementation, further described below, the diffraction gratings may include two fixed one-dimensional transmissive diffraction gratings oriented perpendicular to each other (e.g., a horizontal diffraction grating and vertical diffraction grating).

As illustrated in the example of FIG. 2, light structuring optical assembly 155 outputs the first orders of the diffracted light beams (e.g., m=±1 orders) while blocking or minimizing all other orders, including the zeroth orders. However, in alternative implementations, additional orders of light may be projected onto the sample.

During each imaging cycle, imaging system 100 utilizes light structuring optical assembly 155 to acquire a plurality of images at various phases, with the fringe pattern displaced laterally in the modulation direction (e.g., in the x-y plane and perpendicular to the fringes), with this procedure repeated one or more times by rotating the pattern orientation about the optical axis (i.e., with respect to the x-y plane of the sample). The captured images may then be computationally reconstructed to generate a higher resolution image (e.g., an image having about twice the lateral spatial resolution of individual images).

In system 100, light emitter 150 may be an incoherent light emitter (e.g., emit light beams output by one or more excitation diodes), or a coherent light emitter such as emitter of light output by one or more lasers or laser diodes. As illustrated in the example of system 100, light emitter 150 includes an optical fiber 152 for guiding an optical beam to be output. However, other configurations of a light emitter 150 may be used. In implementations utilizing structured illumination in a multi-channel imaging system (e.g., a multi-channel fluorescence microscope utilizing multiple wavelengths of light), optical fiber 152 may optically couple to a plurality of different light sources (not shown), each light source emitting light of a different wavelength. Although system 100 is illustrated as having a single light emitter 150, in some implementations multiple light emitters 150 may be included. For example, multiple light emitters may be included in the case of a structured illumination imaging system that utilizes multiple arms, further discussed below.

In some implementations, system 100 may include a tube lens 156 that may include a lens element to articulate along the z-axis to adjust the structured beam shape and path. For example, a component of the tube lens may be articulated to account for a range of sample thicknesses (e.g., different cover glass thickness) of the sample in container 110.

In the example of system 100, fluid delivery module or device 190 may direct the flow of reagents (e.g., fluorescently labeled nucleotides, buffers, enzymes, cleavage reagents, etc.) to (and through) sample container 110 and waste valve 120. Sample container 110 can include one or more substrates upon which the samples are provided. For example, in the case of a system to analyze a large number of different nucleic acid sequences, sample container 110 can include one or more substrates on which nucleic acids to be sequenced are bound, attached or associated. The substrate can include any inert substrate or matrix to which nucleic acids can be attached, such as for example glass surfaces, plastic surfaces, latex, dextran, polystyrene surfaces, polypropylene surfaces, polyacrylamide gels, gold surfaces, and silicon wafers. In some applications, the substrate is within a channel or other area at a plurality of locations formed in a matrix or array across the sample container 110. System 100 may also include a temperature station actuator 130 and heater/cooler 135 that can optionally regulate the temperature of conditions of the fluids within the sample container 110.

In particular implementations, the sample container 110 may be implemented as a patterned flow cell including a translucent cover plate, a substrate, and a liquid contained therebetween, and a biological sample may be located at an inside surface of the translucent cover plate or an inside surface of the substrate. The flow cell may include a large number (e.g., thousands, millions, or billions) of wells (also referred to as nanowells) or regions that are patterned into a defined array (e.g., a hexagonal array, rectangular array, etc.) into the substrate. Each region may form a cluster (e.g., a monoclonal cluster) of a biological sample such as DNA, RNA, or another genomic material which may be sequenced, for example, using sequencing by synthesis. The flow cell may be further divided into a number of spaced apart lanes (e.g., eight lanes), each lane including a hexagonal array of clusters.

Sample container 110 can be mounted on a sample stage 170 to provide movement and alignment of the sample container 110 relative to the objective lens 142. The sample stage can have one or more actuators to allow it to move in any of three dimensions. For example, in terms of the Cartesian coordinate system, actuators can be provided to allow the stage to move in the X, Y and Z directions relative to the objective lens. This can allow one or more sample locations on sample container 110 to be positioned in optical alignment with objective lens 142. Movement of sample stage 170 relative to objective lens 142 can be achieved by moving the sample stage itself, the objective lens, some other component of the imaging system, or any combination of the foregoing. Further implementations may also include moving the entire imaging system over a stationary sample. Alternatively, sample container 110 may be fixed during imaging.

In some implementations, a focus (z-axis) component 175 may be included to control positioning of the optical components relative to the sample container 110 in the focus direction (typically referred to as the z axis, or z direction). Focus component 175 can include one or more actuators physically coupled to the optical stage or the sample stage, or both, to move sample container 110 on sample stage 170 relative to the optical components (e.g., the objective lens 142) to provide proper focusing for the imaging operation. For example, the actuator may be physically coupled to the respective stage such as, for example, by mechanical, magnetic, fluidic or other attachment or contact directly or indirectly to or with the stage. The one or more actuators can be configured to move the stage in the z-direction while maintaining the sample stage in the same plane (e.g., maintaining a level or horizontal attitude, perpendicular to the optical axis). The one or more actuators can also be configured to tilt the stage. This can be done, for example, so that sample container 110 can be leveled dynamically to account for any slope in its surfaces.

The structured light emanating from a test sample at a sample location being imaged can be directed through dichroic mirror 160 to one or more detectors of camera system 140. In some implementations, a filter switching assembly 165 with one or more emission filters may be included, where the one or more emission filters can be used to pass through particular emission wavelengths and block (or reflect) other emission wavelengths. For example, the one or more emission filters may be used to switch between different channels of the imaging system. In a particular implementation, the emission filters may be implemented as dichroic mirrors that direct emission light of different wavelengths to different image sensors of camera system 140.

Camera system 140 can include one or more image sensors to monitor and track the imaging (e.g., sequencing) of sample container 110. Camera system 140 can be implemented, for example, as a charge-coupled device (CCD) image sensor camera, but other image sensor technologies (e.g., active pixel sensor) can be used.

Output data (e.g., images) from camera system 140 may be communicated to a real-time SIM imaging component 191 that may be implemented as a software application that, as further described below, may reconstruct the images captured during each imaging cycle to create an image having a higher spatial resolution. The reconstructed images may take into account changes in structure illumination parameters that are predicted over time. In addition, SIM imaging component 191 may be used to track predicted SIM parameters and/or make predictions of SIM parameters given prior estimated and/or predicted SIM parameters.

A controller 195 can be provided to control the operation of structured illumination imaging system 100, including synchronizing the various optical components of system 100. The controller can be implemented to control aspects of system operation such as, for example, configuration of light structuring optical assembly 155 (e.g., selection and/or linear translation of diffraction gratings), movement of tube lens 156, focusing, stage movement, and imaging operations. The controller may be also be implemented to control hardware elements of the system 100 to correct for changes in structured illumination parameters over time. For example, the controller may be configured to transmit control signals to motors or other devices controlling a configuration of light structuring optical assembly 155, motion stage 170, or some other element of system 100 to correct or compensate for changes in structured illumination phase, frequency, and/or orientation over time. In implementations, these signals may be transmitted in accordance with structured illumination parameters predicted using SIM imaging component 191. In some implementations, controller 195 may include a memory for storing predicted and or estimated structured illumination parameters corresponding to different times and/or sample positions.

In various implementations, the controller 195 can be implemented using hardware, algorithms (e.g., machine executable instructions), or a combination of the foregoing. For example, in some implementations the controller can include one or more CPUs, GPUs, or processors with associated memory. As another example, the controller can comprise hardware or other circuitry to control the operation, such as a computer processor and a non-transitory computer readable medium with machine-readable instructions stored thereon. For example, this circuitry can include one or more of the following: field programmable gate array (FPGA), application specific integrated circuit (ASIC), programmable logic device (PLD), complex programmable logic device (CPLD), a programmable logic array (PLA), programmable array logic (PAL) and other similar processing device or circuitry. As yet another example, the controller can comprise a combination of this circuitry with one or more processors.

FIG. 3 is an optical diagram illustrating an example optical configuration of a two-arm SIM imaging system 200 that may implement structured illumination parameter prediction in accordance with some implementations described herein. The first arm of system 200 includes a light emitter 210A, a first optical collimator 220A to collimate light output by light emitter 210A, a diffraction grating 230A in a first orientation with respect to the optical axis, a rotating mirror 240A, and a second optical collimator 250A. The second arm of system 200 includes a light emitter 210B, a first optical collimator 220B to collimate light output by light emitter 210B, a diffraction grating 230B in a second orientation with respect to the optical axis, a rotating mirror 240B, and a second optical collimator 250B. Although diffraction gratings are illustrated in this example, in other implementations, other beam splitting elements such as a beam splitter cube or plate may be used to split light received at each arm of SIM imaging system 200.

Each light emitter 210A-210B may be an incoherent light emitter (e.g., emit light beams output by one or more excitation diodes), or a coherent light emitter such as emitter of light output by one or more lasers or laser diodes. In the example of system 200, each light emitter 210A-210B is an optical fiber that outputs an optical beam that is collimated by a respective collimator 220A-220B.

In some implementations, each optical fiber may be optically coupled to a corresponding light source (not shown) such as a laser. During imaging, each optical fiber may be switched on or off using a high-speed shutter (not shown) positioned in the optical path between the fiber and the light source, or by pulsing the fiber's corresponding light source at a predetermined frequency during imaging. In some implementations, each optical fiber may be optically coupled to the same light source. In such implementations, a beam splitter or other suitable optical element may be used to guide light from the light source into each of the optical fibers. In such examples, each optical fiber may be switched on or off using a high-speed shutter (not shown) positioned in the optical path between the fiber and beam splitter.

In example SIM imaging system 200, the first arm includes a fixed vertical grating 230A to project a structured illumination pattern or a grating pattern in a first orientation (e.g., a vertical fringe pattern) onto the sample, and the second arm includes a fixed horizontal grating 230B to project a structured illumination pattern or a grating pattern in a second orientation (e.g., a horizontal fringe pattern) onto the sample 271. The gratings of SIM imaging system 200 do not need to be mechanically rotated or translated, which may provide improved system speed, reliability, and repeatability.

In alternative implementations, gratings 230A and 230B may be mounted on respective linear motion stages that may be translated to change the optical path length (and thus the phase) of light emitted by gratings 230A and 230B. The axis of motion of linear motion of the stages may be perpendicular or otherwise offset from the orientation of their respective grating to realize translation of the grating's pattern along a sample 271.

Gratings 230A-230B may be transmissive diffraction gratings, including a plurality of diffracting elements (e.g., parallel slits or grooves) formed into a glass substrate or other suitable surface. The gratings may be implemented as phase gratings that provide a periodic variation of the refractive index of the grating material. The groove or feature spacing may be chosen to diffract light at suitable angles and tuned to the minimum resolvable feature size of the imaged samples for operation of SIM imaging system 200. In other implementations, the gratings may be reflective diffraction gratings.

In the example of SIM imaging system 200, the vertical and horizontal patterns are offset by about 90 degrees. In other implementations, other orientations of the gratings may be used to create an offset of about 90 degrees. For example, the gratings may be oriented such that they project images that are offset ±45 degrees from the x or y plane of sample 271. The configuration of example SIM imaging system 200 may be particularly advantageous in the case of a regularly patterned sample 271 with features on a rectangular grid, as structured resolution enhancement can be achieved using only two perpendicular gratings (e.g., vertical grating and horizontal grating).

Gratings 230A-230B, in the example of system 200, are configured to diffract the input beams into a number of orders (e.g., 0 order, ±1 orders, ±2 orders, etc.) of which the ±1 orders may be projected on the sample 271. As shown in this example, vertical grating 230A diffracts a collimated light beam into first order diffracted beams (±1 orders), spreading the first orders on the plane of the page, and horizontal grating 230B diffracts a collimated light beam into first order diffracted beams, spreading the orders above and below the plane of the page (i.e., in a plane perpendicular to the page). To improve efficiency of the system, the zeroth order beams and all other higher order beams (i.e., ±2 orders or higher) may be blocked (i.e., filtered out of the illumination pattern projected on the sample 271). For example, a beam blocking element (not shown) such as an order filter may be inserted into the optical path after each diffraction grating to block the 0-order beam and the higher order beams. In some implementations, diffraction gratings 230A-230B may configured to diffract the beams into only the first orders and the 0-order (undiffracted beam) may be blocked by some beam blocking element.

Each arm includes an optical phase modulator or phase shifter 240A-240B to phase shift the diffracted light output by each of gratings 230. For example, during structured imaging, the optical phase of each diffracted beam may be shifted by some fraction (e.g., ½, ⅓, ¼, etc.) of the pitch (X) of each fringe of the structured pattern. In the example of FIG. 3, phase modulators 240A and 240B are implemented as rotating windows that may use a galvanometer or other rotational actuator to rotate and modulate the optical pathlength of each diffracted beam. For example, window 240A may rotate about the vertical axis to shift the image projected by vertical grating 230A on sample 271 left or right, and window 240B may rotate about the horizontal axis to shift the image projected by horizontal grating 230B on sample 271 up or down.

In other implementations, other phase modulators that change the optical path length of the diffracted light (e.g. linear translation stages, wedges, etc.) may be used. Additionally, although optical phase modulators 240A-240B are illustrated as being placed after gratings 230A-230B, in other implementations they may be placed at other locations in the illumination system.

In alternative implementations, a single-phase modulator may be operated in two different directions for the different fringe patterns, or a single-phase modulator may use a single motion to adjust both path lengths. For example, a large, rotating optical window may be placed after mirror 260 with holes 261. In this case, the large window may be used in place of windows 240A and 240B to modulate the phases of both sets of diffracted beams output by the vertical and horizontal diffraction gratings. Instead of being parallel with respect to the optical axis of one of the gratings, the axis of rotation for the large rotating window may be offset 45 degrees (or some other angular offset) from the optical axis of each of the vertical and horizontal gratings to allow for phase shifting along both directions along one common axis of rotation of the large window. In some implementations, the large rotating window may be replaced by a wedged optic rotating about the nominal beam axis.

In example system 200, a mirror 260 with holes 261 combines the two arms into the optical path in a lossless manner (e.g., without significant loss of optical power, other than a small absorption in the reflective coating). Mirror 260 can be located such that the diffracted orders from each of the gratings are spatially resolved, and the unwanted orders can be blocked. Mirror 260 passes the first orders of light output by the first arm through holes 261. Mirror 260 reflects the first orders of light output by the second arm. As such, the structured illumination pattern may be switched from a vertical orientation (e.g., grating 230A) to a horizontal orientation (e.g., grating 230B) by turning each emitter on or off or by opening and closing an optical shutter that directs a light source's light through the fiber optic cable. In other implementations, the structured illumination pattern may be switched by using an optical switch to change the arm that illuminates the sample.

Also illustrated in example imaging system 200 are a tube lens 265, a semi-reflective mirror 280, objective 270, and camera 290. For example, tube lens 265 may be implemented to articulate along the z-axis to adjust the structured beam shape and path. Semi-reflective mirror 280 may be a dichroic mirror to reflect structured illumination light received from each arm down into objective 270 for projection onto sample 271, and to pass through light emitted by sample 271 (e.g., fluorescent light, which is emitted at different wavelengths than the excitation) onto camera 290.

Output data (e.g., images) from camera 290 may be communicated to a real-time SIM imaging component (not shown) that may be implemented as a software application that, as further described below, may reconstruct the images captured during each imaging cycle to create an image having a higher spatial resolution. The reconstructed images may take into account changes in structure illumination parameters that are predicted over time. In addition, the real-time SIM imaging component may be used to track predicted SIM parameters and/or make predictions of SIM parameters given prior estimated and/or predicted SIM parameters.

A controller (not shown) can be provided to control the operation of structured illumination imaging system 200, including synchronizing the various optical components of system 200. The controller can be implemented to control aspects of system operation such as, for example, configuration of each optical arm (e.g., turning on/off each optical arm during capture of phase images, actuation of phase modulators 240A-240B), movement of tube lens 265, stage movement (if any stage is used) of sample 271, and imaging operations. The controller may be also be implemented to control hardware elements of the system 200 to correct for changes in structured illumination parameters over time. For example, the controller may be configured to transmit control signals to devices (e.g., phase modulators 240A-240B) controlling a configuration of each optical arm or some other element of system 100 to correct or compensate for changes in structured illumination phase, frequency, and/or orientation over time. As another example, when gratings 230A-230B are mounted on linear motion stages (e.g., instead of using phase modulators 240A-240B), the controller may be configured to control the linear motion stages to correct or compensate for phase changes. In implementations, these signals may be transmitted in accordance with structured illumination parameters predicted using a SIM imaging component. In some implementations, the controller may include a memory for storing predicted and or estimated structured illumination parameters corresponding to different times and/or sample positions.

It should be noted that, for the sake of simplicity, optical components of SIM imaging system 200 may have been omitted from the foregoing discussion. Additionally, although system 200 is illustrated in this example as a single channel system, in other implementations, it may be implemented as a multi-channel system (e.g., by using two different cameras and light sources that emit in two different wavelengths).

Although system 200 illustrates a two-arm structured illumination imaging system that includes two gratings oriented at two different angles, it should be noted that in other implementations, the technology described herein may be implemented with systems using more than two arms. In the case of a regularly patterned sample with features on a rectangular grid, resolution enhancement can be achieved with only two perpendicular angles (e.g., vertical grating and horizontal grating) as described above. On the other hand, for image resolution enhancement in all directions for other samples (e.g., hexagonally patterned samples), three illumination peak angles may be used. For example, a three-arm system may include three light emitters and three fixed diffraction gratings (one per arm), where each diffraction grating is oriented around the optical axis of the system to project a respective pattern orientation on the sample (e.g., a 0° pattern, a 120° pattern, or a 240° pattern). In such systems, additional mirrors with holes may be used to combine the additional images of the additional gratings into the system in a lossless manner. Alternatively, such systems may utilize one or more polarizing beam splitters to combine the images of each of the gratings.

Figure 4A:
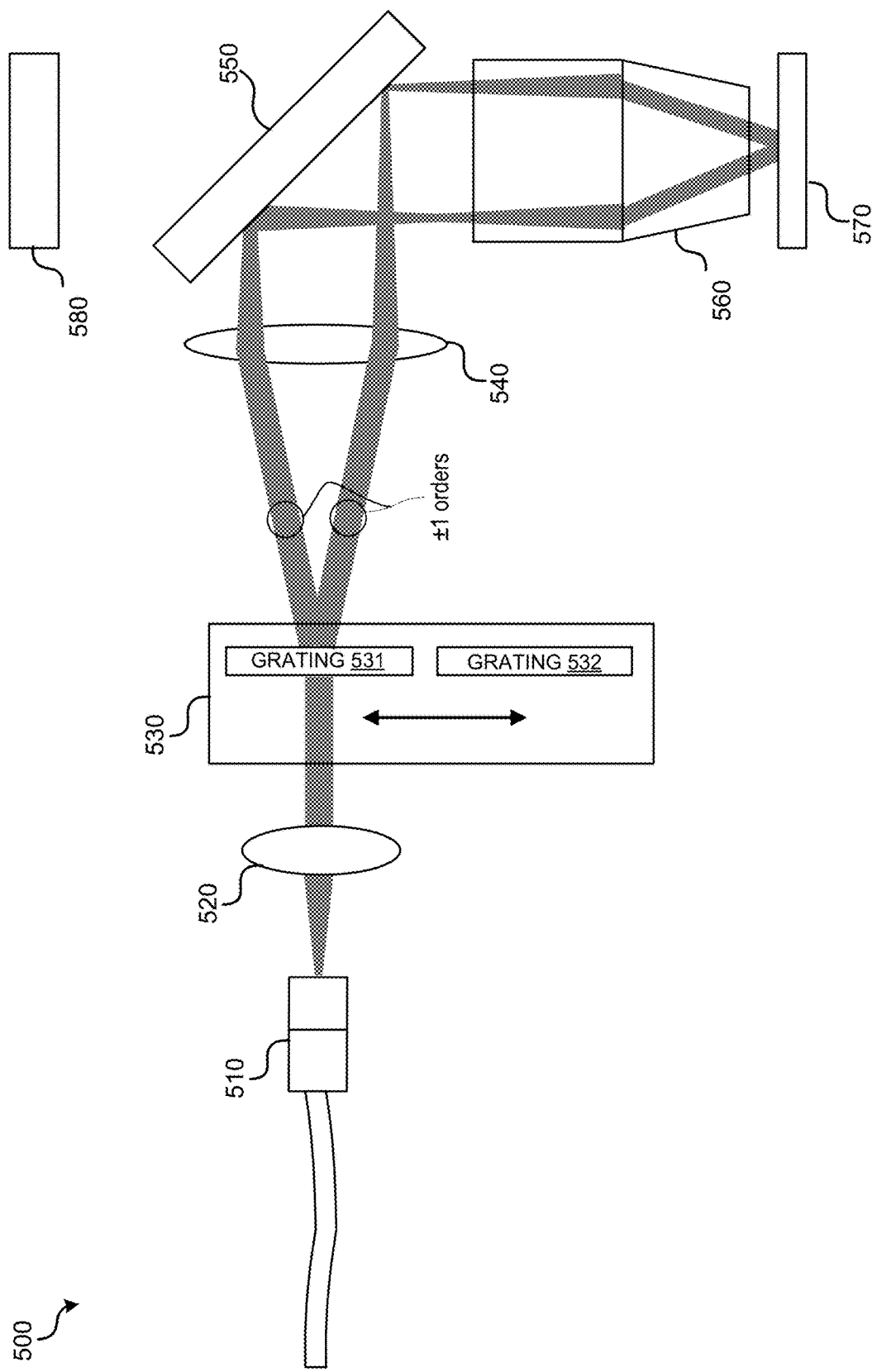
FIGS. 4A and 4B are example schematic diagrams illustrating optical configuration of a dual optical grating slide SIM imaging system.
Figure 4B:
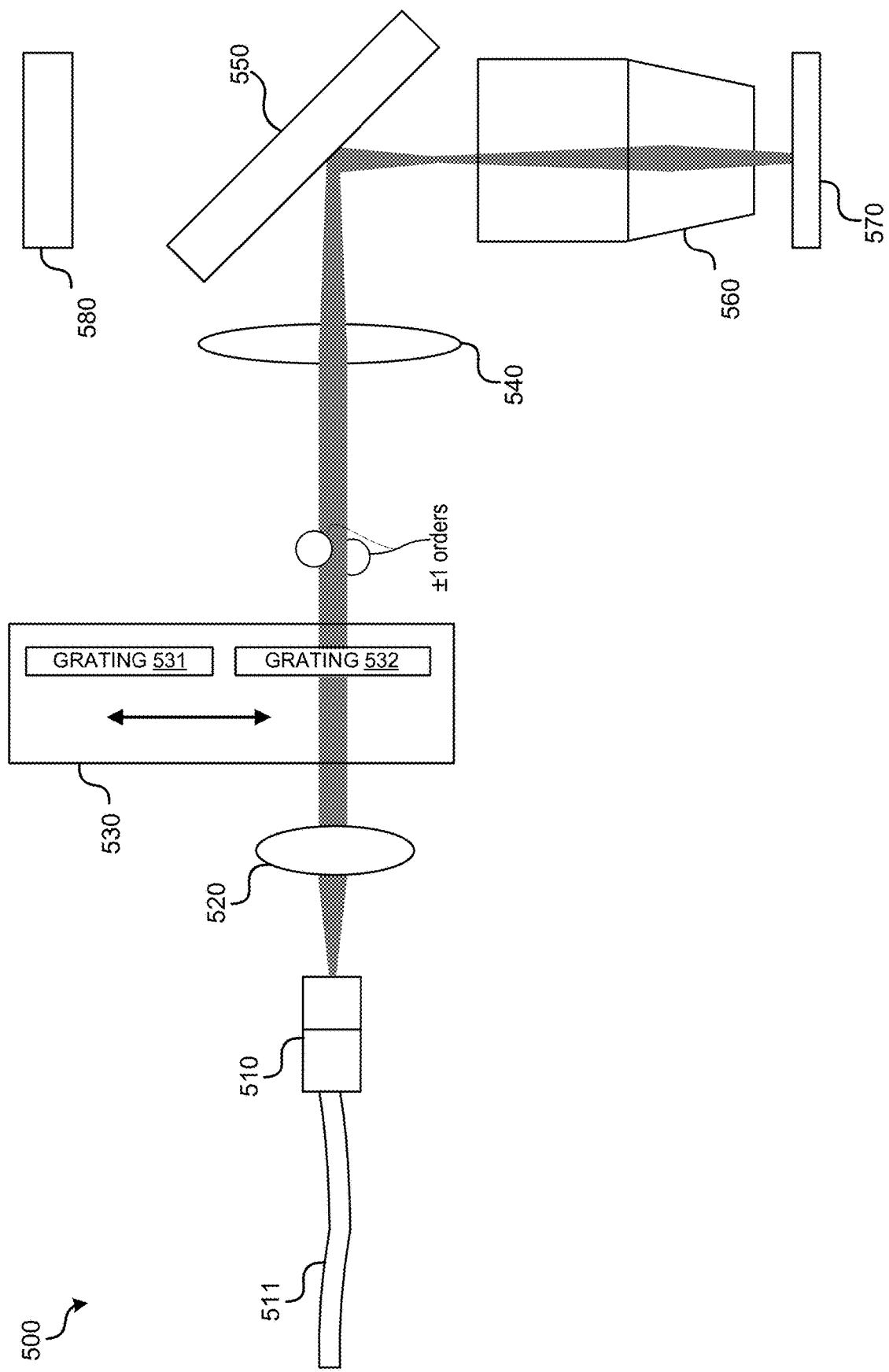

FIGS. 4A and 4B are schematic diagrams illustrating an example optical configuration of a dual optical grating slide SIM imaging system 500 that may implement structured illumination parameter prediction in accordance with some implementations described herein. In example system 500, all changes to the structured illumination pattern or the grating pattern projected on sample 570 (e.g., pattern phase shifts or rotations) may be made by linearly translating a motion stage 530 along a single axis of motion, to select a grating 531 or 532 (i.e., select grating orientation) or to phase shift one of gratings 531-532.

System 500 includes a light emitter 510 (e.g., optical fiber optically coupled to a light source), a first optical collimator 520 (e.g., collimation lens) to collimate light output by light emitter 510, a linear motion stage 530 mounted with a first diffraction grating 531 (e.g., horizontal grating) and a second diffraction grating 532 (e.g. vertical grating), a tube lens 540, a semi-reflective mirror 550 (e.g., dichroic mirror), an objective 560, a sample 570, and a camera 580. For simplicity, optical components of SIM imaging system 500 may be omitted from FIG. 4A. Additionally, although system 500 is illustrated in this example as a single channel system, in other implementations, it may be implemented as a multi-channel system (e.g., by using two different cameras and light sources that emit in two different wavelengths).

As illustrated by FIG. 4A, a grating 531 (e.g., a horizontal diffraction grating) may diffract a collimated light beam into first order diffracted light beams (on the plane of the page). As illustrated by FIG. 4B, a diffraction grating 532 (e.g., a vertical diffraction grating) may diffract a beam into first orders (above and below the plane of the page). In this configuration only a single optical arm having a single emitter 510 (e.g., optical fiber) and single linear motion stage is needed to image a sample 570, which may provide system advantages such as reducing the number of moving system parts to improve speed, complexity and cost. Additionally, in system 500, the absence of a polarizer may provide the previously mentioned advantage of high optical efficiency. The configuration of example SIM imaging system 200 may be particularly advantageous in the case of a regularly patterned sample 570 with features on a rectangular grid, as structured resolution enhancement can be achieved using only two perpendicular gratings (e.g., vertical grating and horizontal grating).

To improve efficiency of the system, the zeroth order beams and all other higher order diffraction beams (i.e., ±2 orders or higher) output by each grating may be blocked (i.e., filtered out of the illumination pattern projected on the sample 570). For example, a beam blocking element (not shown) such as an order filter may be inserted into the optical path after motion stage 530. In some implementations, diffraction gratings 531-532 may configured to diffract the beams into only the first orders and the zeroth order (undiffracted beam) may be blocked by some beam blocking element.

In the example of system 500, the two gratings may be arranged about ±45° from the axis of motion (or other some other angular offset from the axis of motion such as about +40°/−50°, about +30°/−60°, etc.) such that a phase shift may be realized for each grating 531 and 532 along a single axis of linear motion. In some implementations, the two gratings may be combined into one physical optical element. For example, one side of the physical optical element may have a structured illumination pattern or a grating pattern in a first orientation, and an adjacent side of the physical optical element may have a structured illumination pattern or a grating pattern in a second orientation orthogonal to the first orientation.

Single axis linear motion stage 530 may include one or more actuators to allow it to move along the X-axis relative to the sample plane, or along the Y-axis relative to the sample plane. During operation, linear motion stage 530 may provide sufficient travel (e.g., about 12-15 mm) and accuracy (e.g., about less than 0.5 micrometer repeatability) to cause accurate illumination patterns to be projected for efficient image reconstruction. In implementations where motion stage 530 is utilized in an automated imaging system such as a fluorescence microscope, it may be configured to provide a high speed of operation, minimal vibration generation and a long working lifetime. In implementations, linear motion stage 530 may include crossed roller bearings, a linear motor, a high-accuracy linear encoder, and/or other components. For example, motion stage 530 may be implemented as a high-precision stepper or piezo motion stage that may be translated using a controller.

Output data (e.g., images) from camera 580 may be communicated to a real-time SIM imaging component (not shown) that may be implemented as a software application that, as further described below, may reconstruct the images captured during each imaging cycle to create an image having a higher spatial resolution. The reconstructed images may take into account changes in structure illumination parameters that are predicted over time. In addition, the real-time SIM imaging component may be used to track predicted SIM parameters and/or make predictions of SIM parameters given prior estimated and/or predicted SIM parameters.

A controller (not shown) can be provided to control the operation of structured illumination imaging system 500, including synchronizing the various optical components of system 500. The controller can be implemented to control aspects of system operation such as, for example, translation of linear motion stage 530, movement of tube lens 540, stage movement (if any stage is used) of sample 570, and imaging operations. The controller may be also be implemented to control hardware elements of the system 500 to correct for changes in structured illumination parameters over time. For example, the controller may be configured to transmit control signals to devices (e.g., linear motion stage 530) to correct or compensate for changes in structured illumination phase, frequency, and/or orientation over time. In implementations, these signals may be transmitted in accordance with structured illumination parameters predicted using a SIM imaging component. In some implementations, the controller may include a memory for storing predicted and or estimated structured illumination parameters corresponding to different times and/or sample positions.

Although the example of FIGS. 4A-4B illustrates a dual optical grating slide imaging system that may implement structured illumination parameter prediction, structured illumination parameter prediction may be implemented in SIM imaging systems that use a linear motion actuator mounted with more than two diffraction gratings.

Projection Parameter Estimation

Figure 5A:
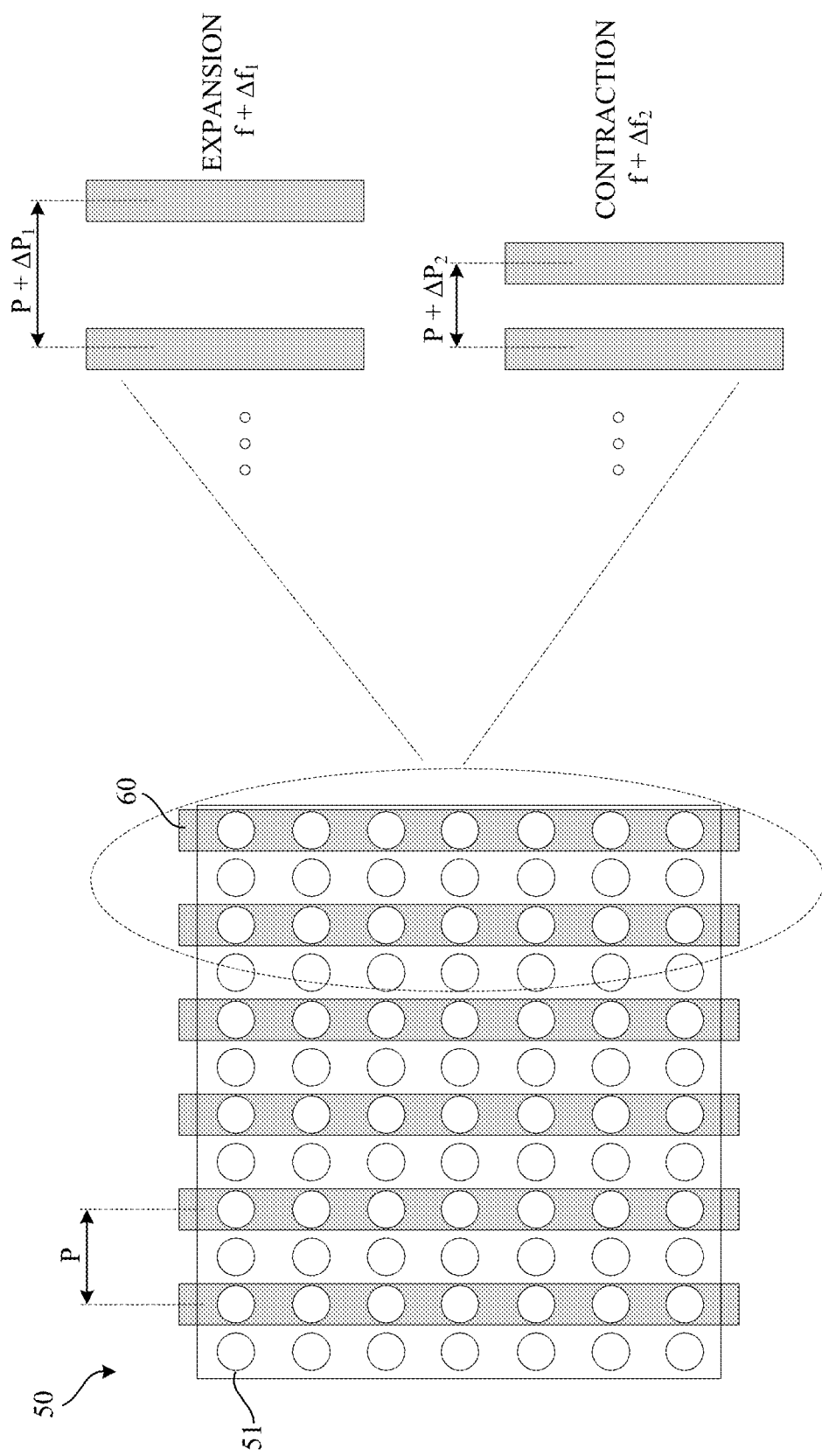
FIG. 5A illustrates undesired changes in spacing parameter that may occur in SIM imaging systems.
Figure 5B:
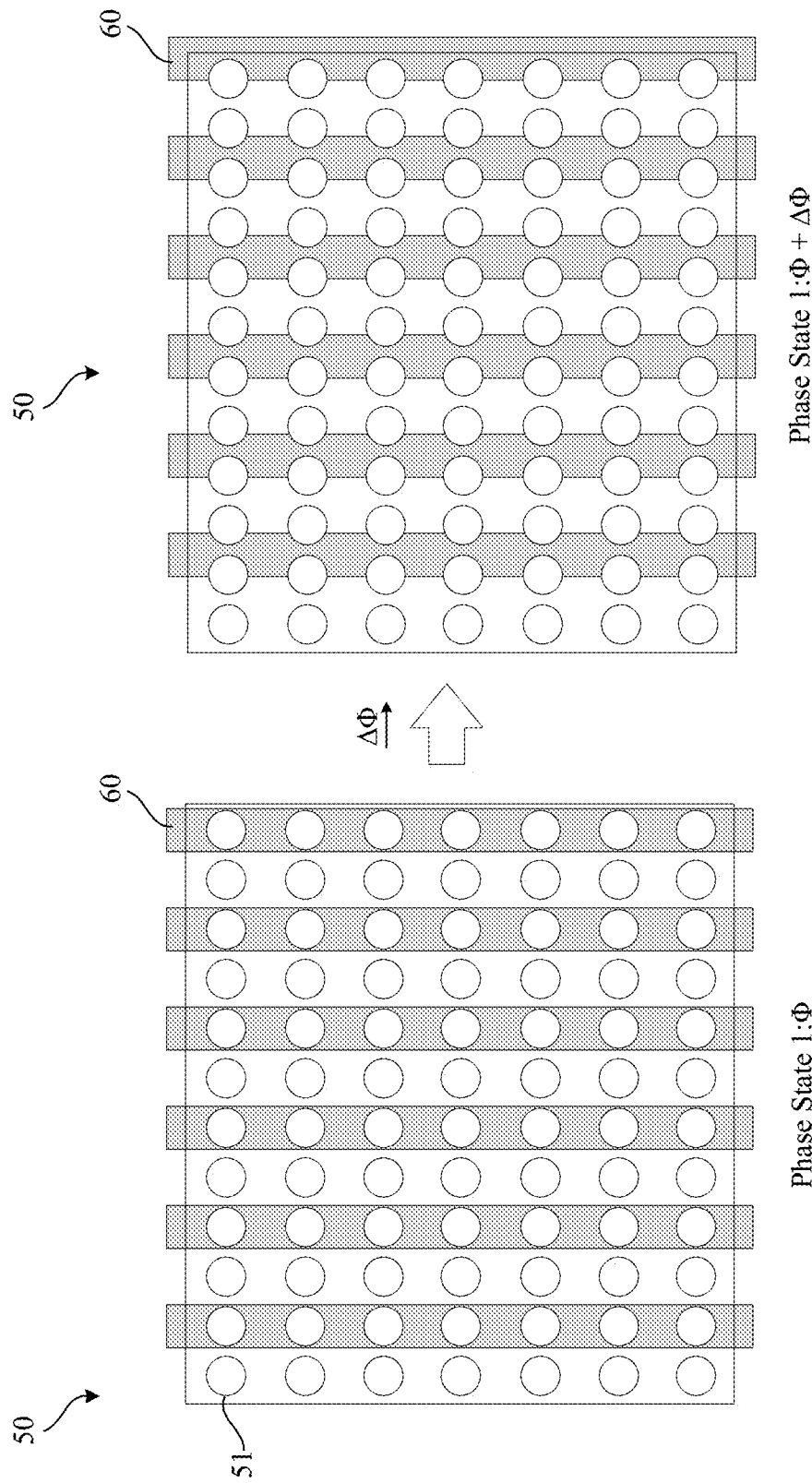
FIG. 5B illustrates undesired changes in phase parameter that may occur in SIM imaging systems.
Figure 5C:
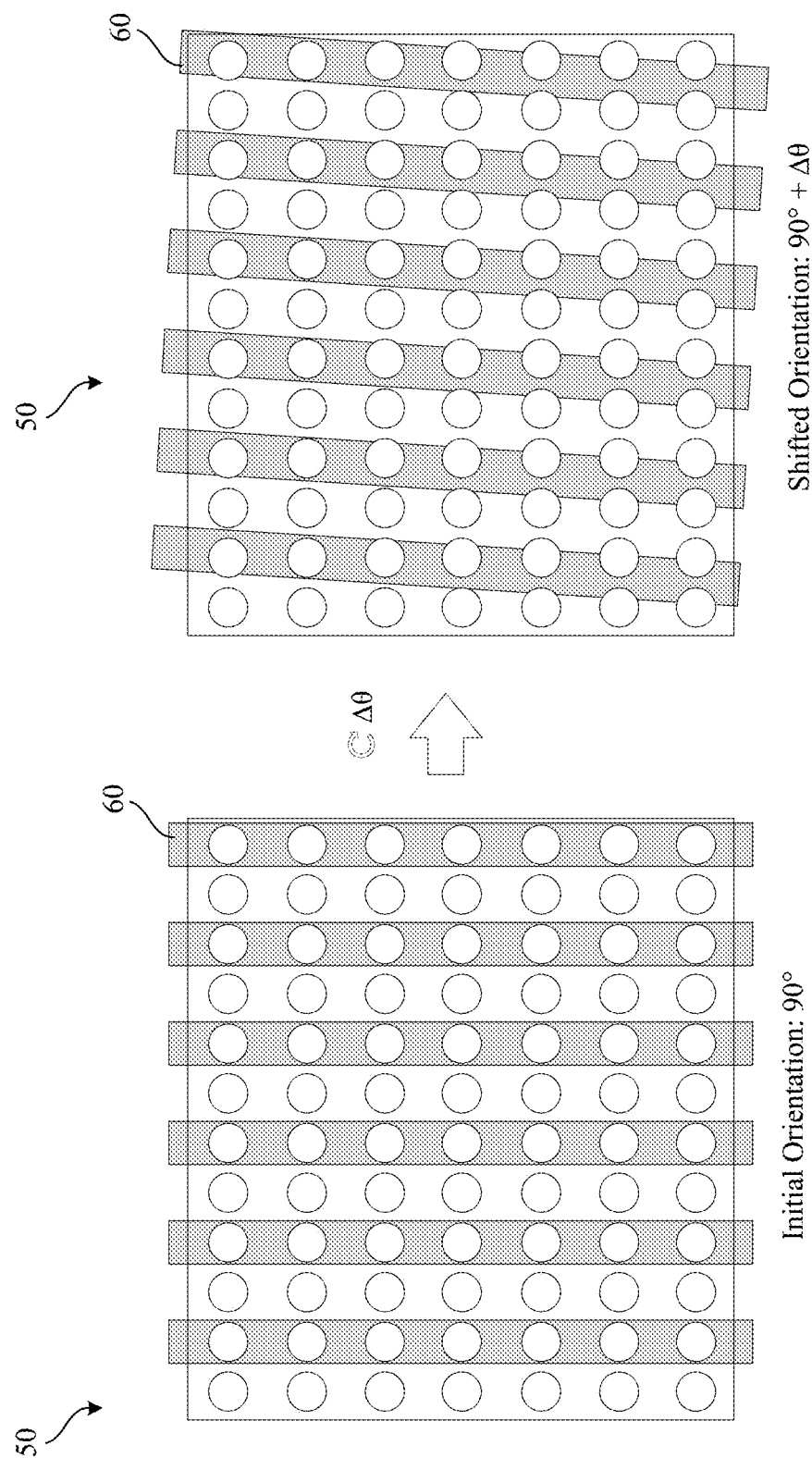
FIG. 5C illustrates undesired changes in angle of orientation parameter that may occur in SIM imaging systems.

Parameter estimation for SIM image processing may be needed to correct for undesired changes in structured illumination parameters over time. By way of example, FIGS. 5A-5C illustrate undesired changes in frequency or illumination peak spacing (FIG. 5A), phase or phase displacement (FIG. 5B), and orientation or illumination peak angle (FIG. 5C) that may occur over time in a SIM imaging system that projects a one-dimensional structured illumination pattern on a regularly patterned sample. In particular, FIG. 5A illustrates a sample 50 with features 51 illuminated by a one-dimensional structured illumination pattern having fringes 60, before and after frequency shifts. Before any frequency shifts, adjacent fringes 60 have a pitch or center-to-center-spacing of P corresponding to an initial frequency f. Over time, with temperature variations in the system, the pitch P may increase or decrease. For example, thermal expansion may cause the pitch P to increase to $P+\Delta P_1$, correspondingly decreasing the frequency f to $f-\Delta f_1$. Conversely, thermal contraction may cause the pitch P to decrease to $P-\Delta P_1$, correspondingly increasing the frequency f to $f+\Delta f_2$.

FIG. 5B illustrates the sample 50 illuminated by a one-dimensional structured illumination pattern having fringes 60, before and after changes in a phase. As shown, before phase drift, a first phase state $\Phi$ may correspond to fringes completely illuminating every second column of features 51 of sample 50. Over time, the position of the fringes 60 relative to the sample 50 may shift such that all phase images are offset by $\Delta\Phi$. For example, mechanical vibrations in the SIM imaging system (e.g., in an excitation beam path), imprecision in a translation stage used by a grating or sample stage, thermal variations, and/or other factors may cause an undesired drift in the phase. After the phase drifts by $\Delta\Phi$, the first phase state changes to $\Phi+\Delta\Phi$, and the fringes no longer are centered on every second column of features.

FIG. 5C illustrates the sample 50 illuminated by a one-dimensional structured illumination pattern having fringes 60, before and after changes in orientation. As shown, before a change in orientation, the orientation of the fringes relatively to sample 50 are completely vertical. Over the time, the orientation may change due to factors such as changes in the excitation beam path, movement of the sample, thermal variations, and/or other factors. After the orientation rotates by an angle $\Delta\theta$, the fringes are no longer completely vertical relative to the sample.

Parameter estimation during SIM imaging process to precisely account for changes in structured illumination parameters as described above helps ensure an artifact-free and accurate reconstruction of an image from a set of sampled images. However, such a process may be computationally expensive and is frequently performed after image acquisition. For time-critical SIM imaging systems that involve real-time processing and reconstruction of images, and thus real-time estimation of parameters such as frequency, phase, orientation, and modulation order, these computational requirements may result in a loss of data throughput (e.g., less data may be processed per unit of time). In such systems, the rate at which samples are imaged may exceed the rate at which structured illumination parameters may be directly estimated from the sampled images. As such, there is a need for a method of generating a parameter estimate with low complexity and low processing time.

To this end, implementations of the technology disclosed herein are directed to predicting structured illumination parameters for a particular point in time, space, and/or temperature using estimates of structured illumination parameters obtained from images captured by the structured illumination system. Particular implementations are directed to predicting structured illumination frequency, phase, orientation, and/or modulation order parameters.

In accordance with some implementations, a structured illumination parameter may be predicted for a given point in time, space, and/or temperature by interpolating estimates of the structured illumination parameter from image captures. For example, a first frequency may be estimated from a first sampled image, a second frequency may be estimated from a second sampled image, and a frequency corresponding to a point in time between the first captured image and the second captured image (e.g., a frequency for an image taken between the first and second images) may be predicted by interpolating using at least a determined rate of change of the frequency between the first captured image and the second captured image.

In accordance with some implementations, a structured illumination parameter may be predicted for a given point in time, space, and/or temperature by extrapolation using estimates of a structured illumination parameter obtained from two image captures. For example, a first orientation may be estimated from a first sampled image, a second orientation may be estimated from a second sampled image, and an orientation corresponding to a point in time after the first and second captured images (e.g., an orientation for a third image taken after the first and second images) may be predicted by extrapolation using at least a determined rate of change of the orientation from the first captured image to the second captured image. As a second example, a first orientation may be estimated from a first sampled image, a second orientation may be estimated from a second sampled image, and an orientation corresponding to a point in time after the first and second captured images (e.g., an orientation for a third image taken after the first and second images) may be predicted by holding the value from the second captured image.

In implementations, estimated and predicted structured illumination parameters may be used to narrow a search space for other structured illumination parameters that are predicted. For example, given an estimated value of a structured illumination parameter for a first point in time, space, and/or temperature, a value of the structured illumination parameter for second point in time, space, and/or temperature that is near the first point in time, space, and/or temperature may be predicted taking into account the predicted or estimated value at the first point in time, space, and/or temperature.

In implementations, estimated and predicted structured illumination parameters may be stored in a memory of the structured illumination system for later use by the system. For instance, predicted and estimated parameters may be stored in a history file such as a lookup table. Predicted parameters that are stored in memory may be determined from estimated parameters, or they may be set based on the physical characteristics of the structured illumination system. For example, the nominal grid spacing of the structured illumination system may be stored. The stored parameters may thereafter be referenced to perform operations such as: calibrated image reconstruction, providing feedback to a hardware component to correct for changes in structured illumination parameters, and narrowing the search space when predicting additional structured illumination parameters.

Illumination Fringe Patterns

Figure 6:
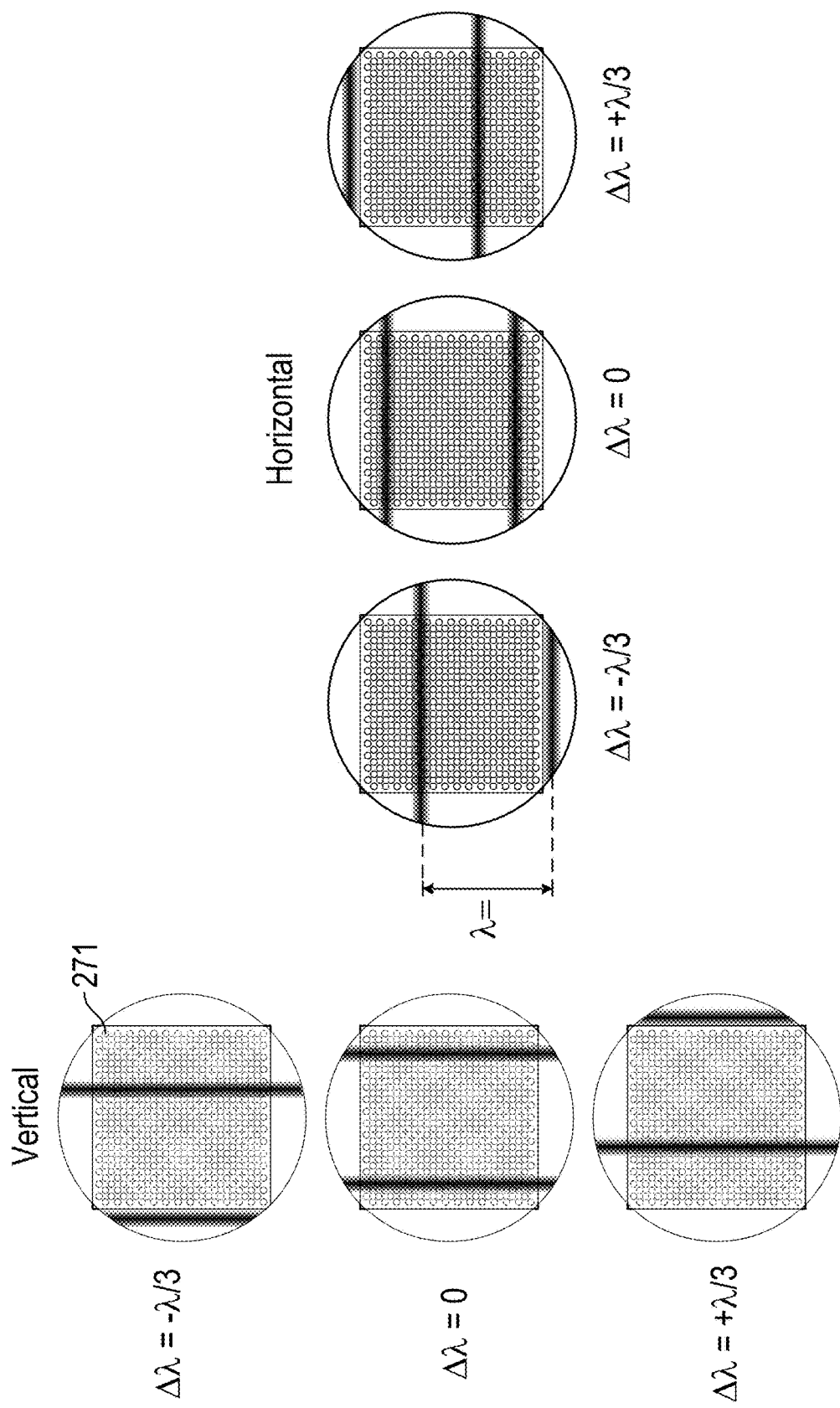
FIG. 6 illustrates simplified illumination fringe patterns that may be projected onto the plane of a sample by vertical and horizontal gratings of SIM imaging system.

FIG. 6 illustrates simplified illumination fringe patterns that may be projected onto the plane of a sample 271 by a vertical grating 230A and horizontal grating 230B of SIM imaging system 200 during one imaging cycle to use structured light to create a high-resolution image. In this example, three phase images with a vertical illumination orientation may be captured using vertical grating 230A, and three phase images with a horizontal illumination orientation may be captured using horizontal grating 230B. For each orientation, projected fringes may be phase shifted in position in steps of ⅓λ (e.g., by setting phase modulator 230A or 230B to three different positions) to capture three phase images of the orientation pattern.

During capture of each phase image, any light emitted by the sample may be captured by camera 290. For instance, fluorescent dyes situated at different features of the sample 271 may fluoresce and the resultant light may be collected by the objective lens 270 and directed to an image sensor of camera 290 to detect the florescence. The captured six images may be used to image an entire sample or a location of a larger sample.

Once all images have been captured for the imaging cycle (in this example, six images), a high-resolution image may be constructed from the captured images. For example, a high-resolution image may be reconstructed from the six images shown in FIG. 6. Suitable algorithms may be used to combine these various images to synthesize a single image of the sample with significantly better spatial resolution than any of the individual component images.

During construction of the high-resolution image, undesired shifts or changes in structured illumination parameters (e.g., angle, spacing and phase), may be algorithmically compensated for using structured illumination parameters predicted in accordance with the disclosure (e.g., predicted changes in angle, spacing or phase). For example, offsets in the phases, angle, and/or spacing of the vertical illumination images and/or the horizontal illumination images may be compensated for.

In some implementations, undesired shifts or changes in structured illumination parameters may be compensated for prior to image capture by controlling one or more hardware elements of system 200 to compensate for those changes in the SIM imaging system. For example, prior to an imaging sequence and/or in between capture of images of an imaging sequence, phase drift may be compensated for each optical arm by adjusting a phase shifting element (e.g., rotating mirror, linear actuator, etc.). In some implementations, a combination of hardware and algorithmic compensation may be implemented.

FIG. 6 illustrates an implementation which patterned flow cell contains nanowells that are patterned symmetrically. In some implementations, the nanowells can be patterned asymmetrically, for example, the nanowell can be shaped or configured to form an elongated structure. The elongated structure refers to a shape where the dimension along a first axis is greater than the dimensions along a second axis. Asymmetrically shaped nanowells can be elliptical, rectangular, etc. In such implementations, the sample can be resolved along the direction or axis of the longer side and SIM is used to increase resolution along the shorter side. If the shorter side of nanowells is along x-axis and longer side is along y-axis, the pitch Px of asymmetrically patterned flow cell is narrow or tight, entailing an increase in resolution, while along the y-axis, the pitch Py is larger. Accordingly, resolution is increased along x-axis and only three images are captured in order to adequately resolve a sample contained within the nanowells of flow cell.

Figure 7:
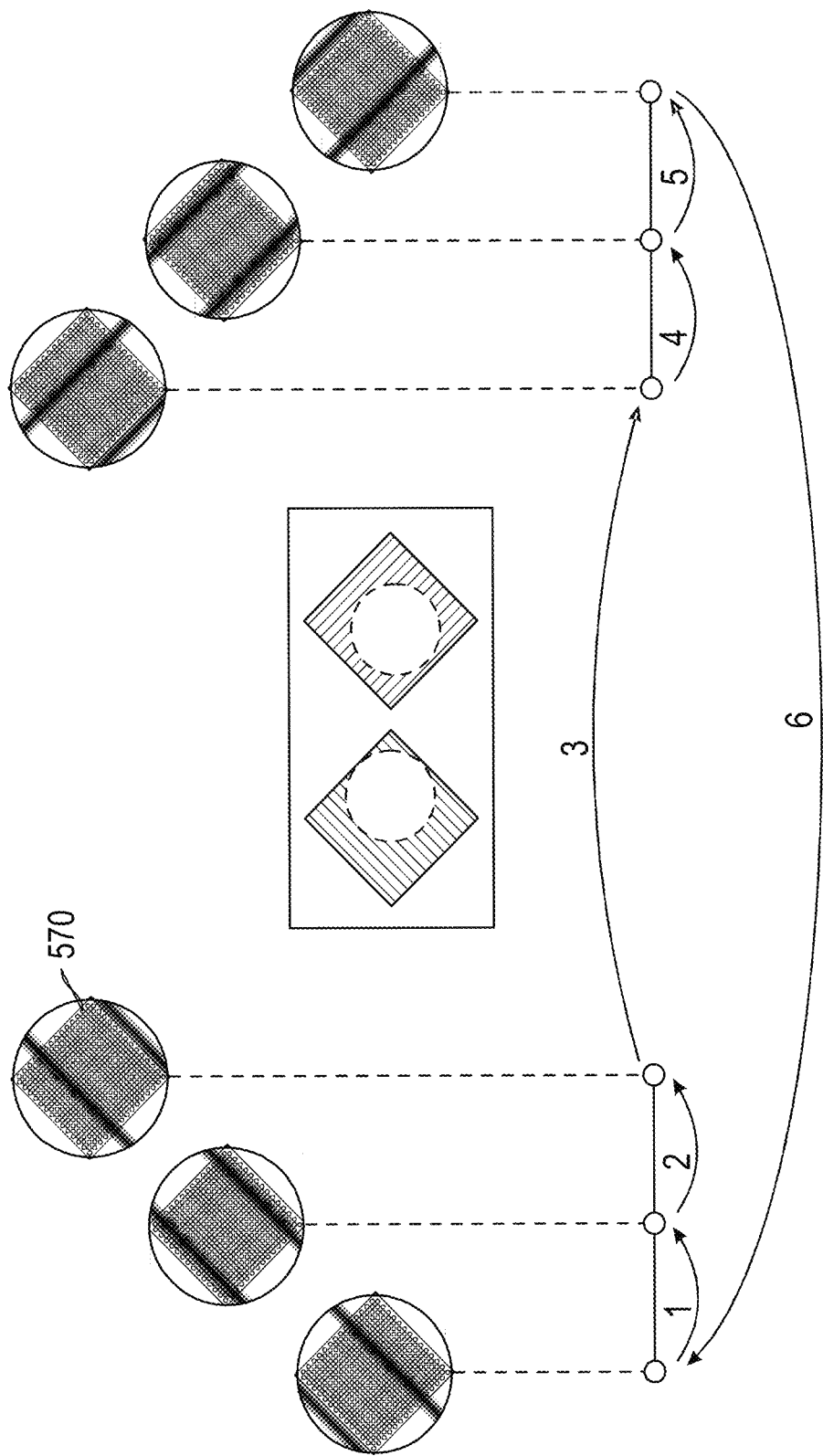
FIG. 7 illustrates simplified illumination fringe patterns that may be projected onto the plane by a first and a second gratings of a dual optical grating slide SIM imaging system.

FIG. 7 illustrates simplified illumination fringe patterns that may be projected onto the plane of a sample 570 by a first diffraction grating and a second diffraction grating of a dual optical grating slide SIM imaging system 500 during image capture for a structured illumination imaging cycle. For example, a SIM imaging system 500 may use a first diffraction grating 531 and second diffraction grating 532 to generate the illumination patterns shown in FIG. 7. As illustrated in the example of FIG. 7, the two gratings project perpendicular fringe patterns on the surface of sample 570 and are arranged about ±45° from the axis of motion of linear motion stage 530.

For example, a first grating (e.g., grating 531), may project first-order illumination fringes on sample 570. Any light emitted by the sample may be captured by camera 580 and a first phase image of the first pattern (e.g., +45° pattern) may be captured to create a first phase image. To capture additional phase shifted images, the pattern projected by the grating may be phase shifted by translating the linear motion stage. These phase shift motions are illustrated as steps 1 and 2 in FIG. 7. The phase shift motions may provide small (e.g., about 3 to 5 micrometers or smaller) moves of the gratings to slightly shift the fringe pattern projected on the grating.

Following capture of all phase shifted images for a diffraction grating, system 500 may switch diffraction gratings by translating the linear motion stage 530 to optically couple another diffraction grating to the light source of the imaging system (e.g., transition from FIG. 4A to 4B). This motion is illustrated as step 3 in the example of FIG. 7. In the case of diffraction grating changes, the linear motion stage may provide a relatively large translation (e.g., on the order of 12-15 mm).

A series of phase images may then be captured for the next grating. For instance, as illustrated by FIG. 7, a second diffraction grating may project first-order illumination fringes on the sample, and the projected fringes may be shifted in position by translating the linear motion stage 530 to capture three phase images of the grating's pattern (e.g., steps 4 and 5 of FIG. 7).

Once all images have been captured for the imaging cycle (in this example, six images), a high-resolution image may be constructed from the captured images. For example, a high-resolution image may be reconstructed from the six images shown in FIG. 7. Suitable algorithms may be used to combine these various images to synthesize a single image of the sample with significantly better spatial resolution than any of the individual component images.

During construction of the high-resolution image, undesired shifts or changes in structured illumination parameters (e.g., angle, spacing and phase), may be algorithmically compensated for using structured illumination parameters estimated in accordance with the disclosure (e.g., predicted changes in angle, spacing or phase). For example, offsets in the phases, angle, and/or spacing of the vertical illumination images and/or the horizontal illumination images may be compensated for. In one implementation, one or more of the offsets in phases, angle and/or spacing of the images can be calculated periodically such as in the first cycle of a sequencing run. The frequency of these estimations can be increased or decreased based on the environmental factors that impact the stability of the process.

In some implementations, undesired shifts or changes in structured illumination parameters may be compensated for prior to image capture by controlling one or more hardware elements of system 500 to compensate for those changes in the SIM imaging system. For example, prior to an imaging sequence and/or in between capture of images of an imaging sequence, phase drift may be compensated for by translating linear motion stage 530. In some implementations, a combination of hardware and algorithmic compensation may be implemented.

In accordance with implementations described herein, structured illumination parameters may be predicted for a particular point in time using estimates of structured illumination parameters obtained from images captured before and/or after that point in time. For example, computational resource limitations may limit the rate at which a SIM imaging system (e.g., system 100, 200, or 500) may directly estimate structured illumination parameters such as phase, frequency, and/or orientation from captured images. In some cases, a SIM imaging system may directly estimate or measure a structured illumination parameter every phase image, in which case it may not be necessary to predict structured illumination parameters. However, in other cases, a SIM imaging system may only be able to directly estimate or measure a structured illumination parameter for some phase images of an imaging cycle, once per imaging cycle, or even less frequently (e.g., every 3, 5, 10, 50, or 100 imaging cycles). In such cases, to keep up with the image sampling rate of the system, it may be advantageous to leverage a direct estimate of the structured illumination parameter that was obtained for a particular point in time and/or space to make predictions about the structured illumination parameter at other points in time and/or space.

To mathematically illustrate one example of this principal, correlation against a reference is one way to estimate structured illumination parameters.

$$\text{Correlation Output} = \Sigma_x c(x) h(x-f) \tag{1}$$

where h(x) is a reference which may either be known or derived from image data, c(x) is derived from image data which is correlated to the reference, and f is a value to be estimated (in this example, frequency). It should be noted that other alternative estimation techniques may be utilized in accordance with the disclosure.

In the example of Equation (1), one correlation output may be generated for each of a number of hypothetical values of f. The parameter estimate f may be obtained as the value off which maximizes the magnitude of the correlation. However, in many cases, a large number of hypothetical values off may need to be attempted in order to maximize the correlation output. The large search space may increase the computational requirements, and as a result, may cause reduced system throughput (i.e., less data processed per unit of time).

Optical Sensing (Especially Lens) Distortion

In the following two sections we present techniques to estimate parameters for SIM image reconstruction. Some of the techniques disclosed compensate for fringe peak lines that are distorted or bent due lens imperfections. Pattern lines that are supposed to be parallel begin that way near the center of the image but tend to converge or become non-parallel near the edge of the lens. This impacts illumination peak angle or orientation, illumination peak spacing, and phase offset. In FIG. 8A, we illustrate dividing an image tile into overlapping regions referred to as subtiles or subwindows or subfields. The subtiles are small enough that parameters can be set that will give satisfactory reconstruction for a whole subtile. The parameter estimation can be performed in two steps. First, parameter estimation can be performed for a near-center subtile of the image. Then, parameter estimation can be performed for other subtiles and compared to the near-center subtile to determine distortions and corrections for the distortions, relative to parameters for the near-center subtile.

To illustrate an implementation of these techniques, we present example pseudocode for parameter estimation in a "subtile angle and spacing mapping" algorithm (also referred to as Algorithm 2A), and "subtile phase mapping" algorithm (also referred to as Algorithm 2B). We also present an example pseudocode to determine distortions and corrections for the distortions in estimated parameters for non-center subtiles when compared with near-center subtiles in "final distortion calibration algorithm" (also referred to as Algorithm 1).

Figure 8B:
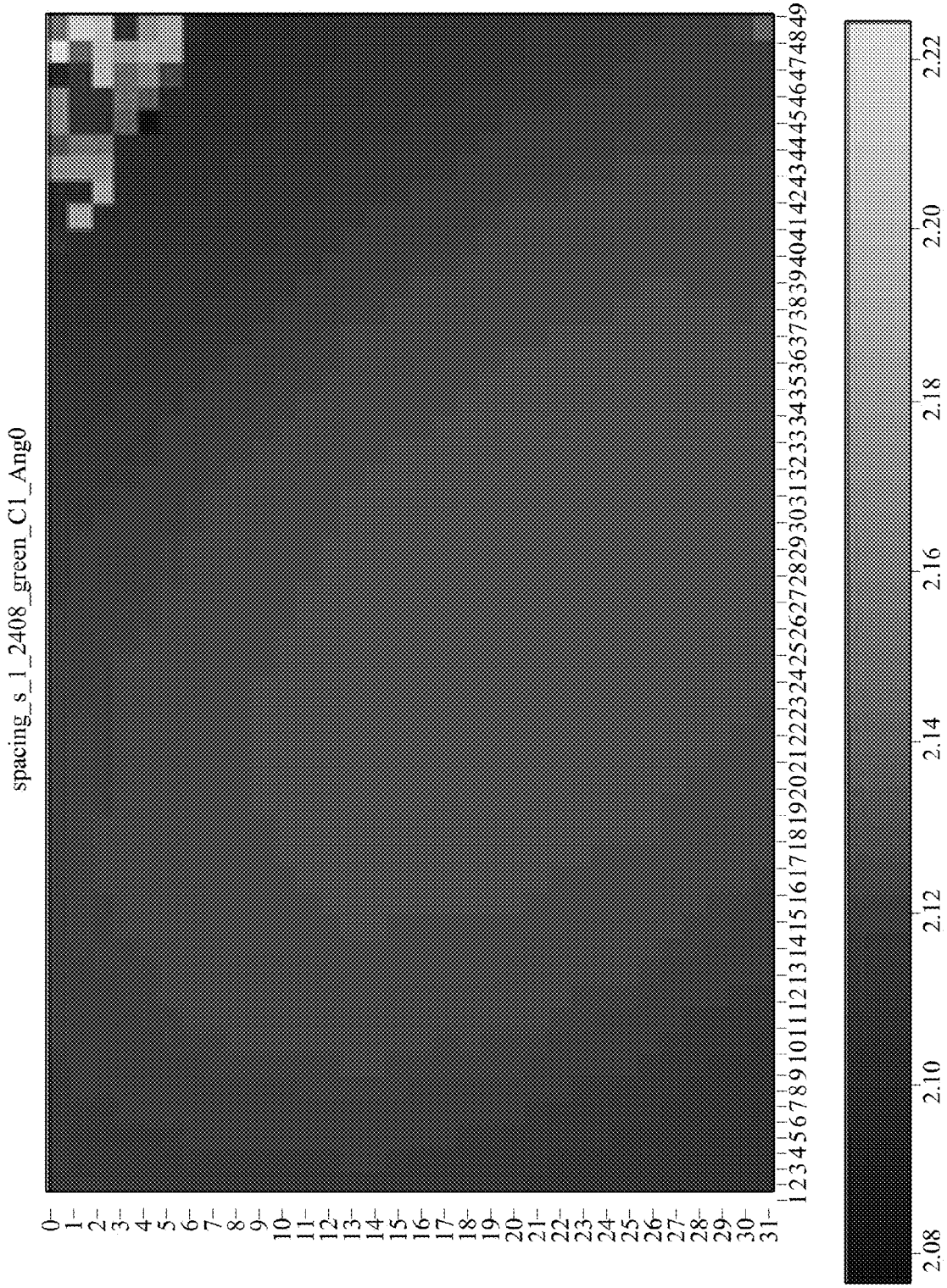
FIGS. 8B and 8C illustrate spacing between nominally parallel lines.
Figure 8C:
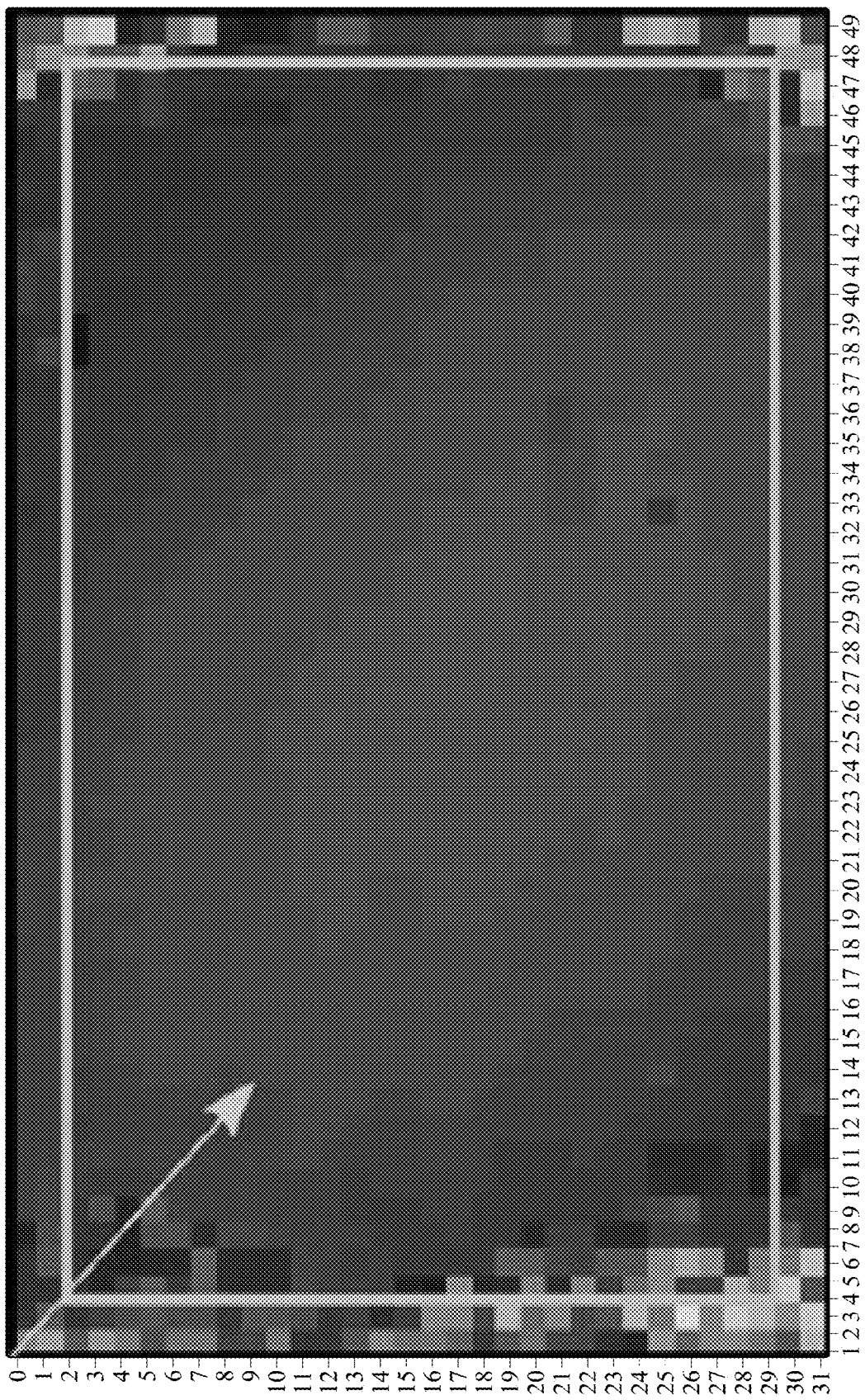

FIGS. 8A to 8C illustrate physical aspects of the full field of view (FOV). In one implementation, the rectangular sensor is used that is 5472 pixels by 3694 pixels. Of course, a square sensor or a different size of sensor could be used, for example, 5472×5472 pixels, or 4800×4800 pixels. When a rectangular sensor is used, distortion is greatest closest to the edge of the lens. A lens often is round, so a rectangular sensor does not come as close to the edge of the lens on the long side as it does on the short side.

FIG. 8A presents two illustrations that show fringe spacing distortion across the full field of view (FOV). The FIG. 801 on the left is a simplified depiction 801 of bending parallel lines due to distortion of a lens that magnifies. The lines depicted are intended to be parallel in the image plane. Viewed through a lens, they appear to converge at right and left ends, relative to spacing in the center. The FIG. 805 on the right is another exaggerated example. In this figure the fringe lines are oriented diagonally between top left and bottom right corners. The fringe spacing is exaggerated to make it easier to see. The fringe lines converge at the top left and bottom right corners, relative to the center. For a particular manufacturer's lens, the fringe pattern can be non-uniform.

FIGS. 8B and 8C depict measurements of spacing in an image between nominally parallel fringe peaks in the image plane, for green and blue laser illumination. The color scale indicates a variation in spacing between 2.08 and 2.22 (sensor pixels). In both drawings, the color scale indicates that the center spacing between parallel lines is approximately 2.14. Irregularity under green wavelength illumination is seen in the top right-hand corner of FIG. 8B. More substantial irregularity under blue wavelength illumination is seen in FIG. 8C, along the right and left edges. In these figures, the fringe pattern is a series of parallel lines, from top left to bottom right of the figures. Thus, the spacing is measured normal to the general direction of arrow in FIG. 8C. These figures motivate correction of distortions caused by the lens. Since lenses are individually manufactured and mounted, calibration and correction of individual systems after assembly is desirable.

The fringe pattern is a series of parallel lines at an angle of 45°, from bottom left to top right of the figure. The spacing between the parallel lines increases in the center region as illustrated by a lighter shade of gray. As we move away from the center region to top right or bottom left regions, the spacing distortion between the fringe lines decreases. The major axes of the three contour lines are approximately normal to the direction of the fringe lines. The spacing distortion decreases as we move out from region in the center contour line.

Figure 8D:
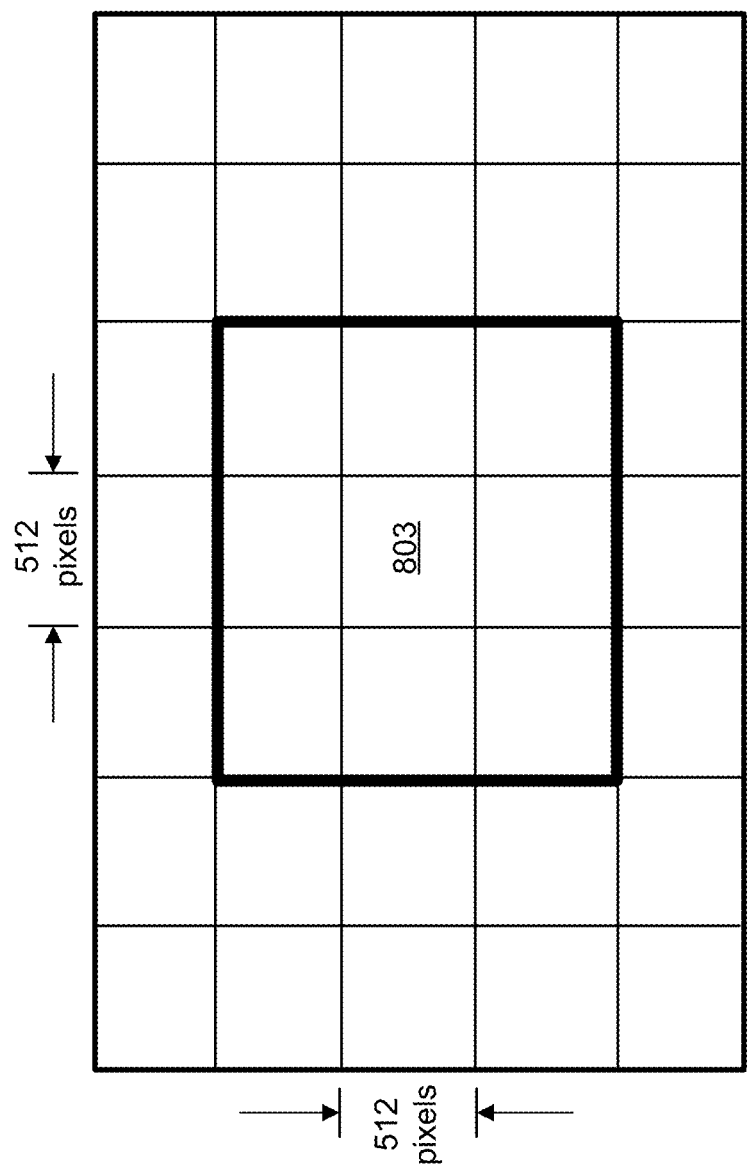
FIG. 8D shows an example of subtiles or subfields of a full field of view (FOV) image.

FIG. 8D illustrates subtiles or subfields of the full field of view (FOV) in an image tile. In this figure, the subtile illustrated is 512 pixels by 512 pixels. These subtiles may subdivide the field of vision, shown, or may overlap. Subtiles may be larger or smaller. For instance, 400×400 and 1024×1024 pixel subtiles have been shown to be workable. The figure illustrates 5×7 subtiles. The larger sensor called out above may have 8×11 subtiles. Other configurations of subtiles such as 3×3, 5×5, 5×7, 9×9, 9×16 can be used. Larger sensors can be divided into more subtiles. The subtiles can overlap by at least 2 pixels of the optical sensor. Larger and smaller number of pixels can be used for overlapping between subtiles. For example, for a 512-pixel wide subtile, up to a 256-pixel overlap can be used, and for a 1024-pixel wide subtile, up to a 256-pixel overlap can be used. Consistent with FIGS. 8B and 8C, there are several candidate near-center subtiles 803, all in the sweet spot of the lens, including a center subtile in an odd×odd subtile array. As used herein, a near-center subtile either includes a center pixel of the sensor or abuts a subtile that includes the center pixel. In some optical systems that are flat and have small error, a subtile further from the ones adjoining the center subtile can be used as a reference without impacting the overall distortion compensation.

The technology disclosed includes mapping distortion measured over substantially the full field of view captured by the sensor. Three parameters on which enhanced resolution SIM reconstruction from regularly structured illumination depend include fringe spacing, fringe angle, and phase displacement of the fringe pattern. These variables are also referred to as spacing, angle and phase offset of the structured illumination or grating pattern. The spacing and angle deviations from the center tile value can be fit across the full field of view using polynomial surfaces. Both quadratic and cubic surfaces have been investigated. Higher order polynomials also could be used.

Both the fringe spacing and fringe angle across the image tile can be fit by quadratic surfaces. Sensitivity analysis shows that quadratic surfaces fit very nearly as well as cubic surfaces. A quadratic surface is fit to the equation:

$$f(x,y) = c0 + (c1*x) + (c2*y) + (c3*x*y) + (c4*x^2) + (c5*y^2) \qquad (2)$$

In later cycles of the imaging, we can characterize the contraction or expansion of the spacing from center subtile due to temperature changes and apply the same deviation correction to the rest of the image. Depending on the contraction and expansion of near center subtile, the deviation correction can be scaled and translated accordingly. We have observed the relative deviations in subtiles are constant with respect to the center or the near center subtile that is used as a reference.

Figure 9:
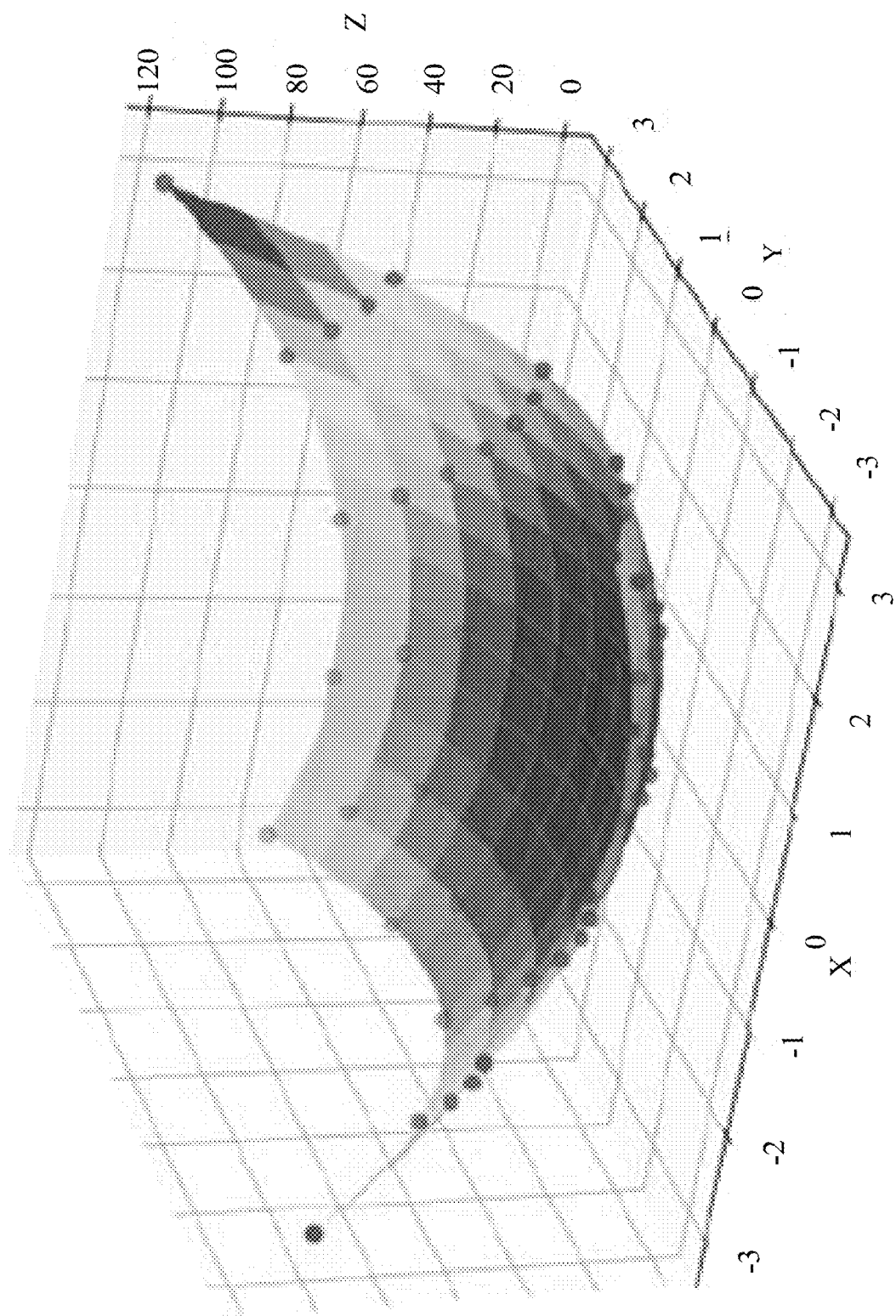
FIG. 9 generally depicts a color-coded surface that nicely fits observed data points indicated in red.

FIG. 9 depicts a color-coded surface that was fitted to measured data points indicated in red. As this surface is three-dimensional, reference to the color version of the figure is recommended to understand the contours. The USPTO, at time of filing, saves the color version to the supplemental content tab of the PAIR online system, where it becomes publicly available in due course.

Figure 10A:
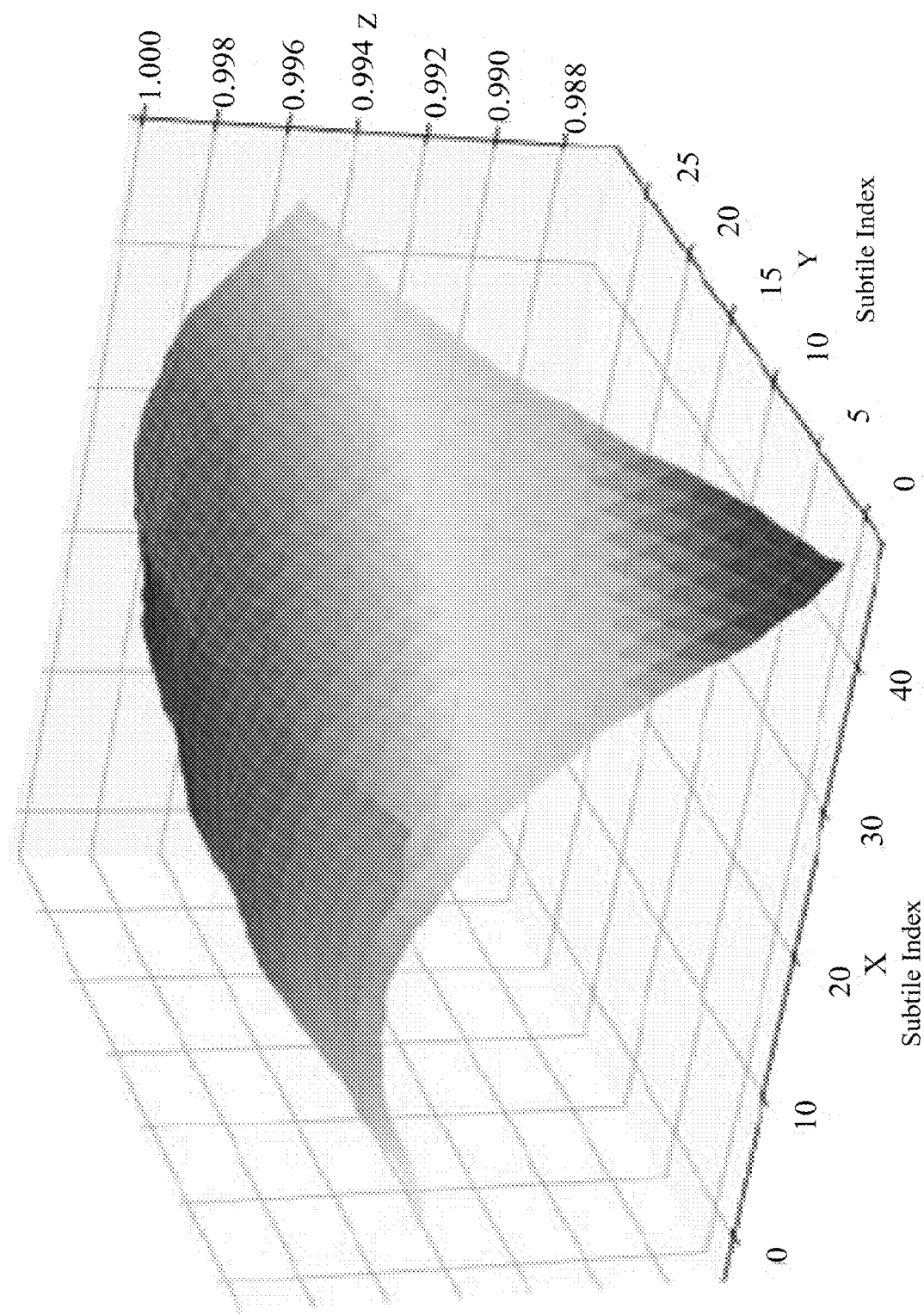
FIGS. 10A and 10B illustrate inverted bowl shape of measured spacing relative to spacing in a near-center subfield.
Figure 10B:
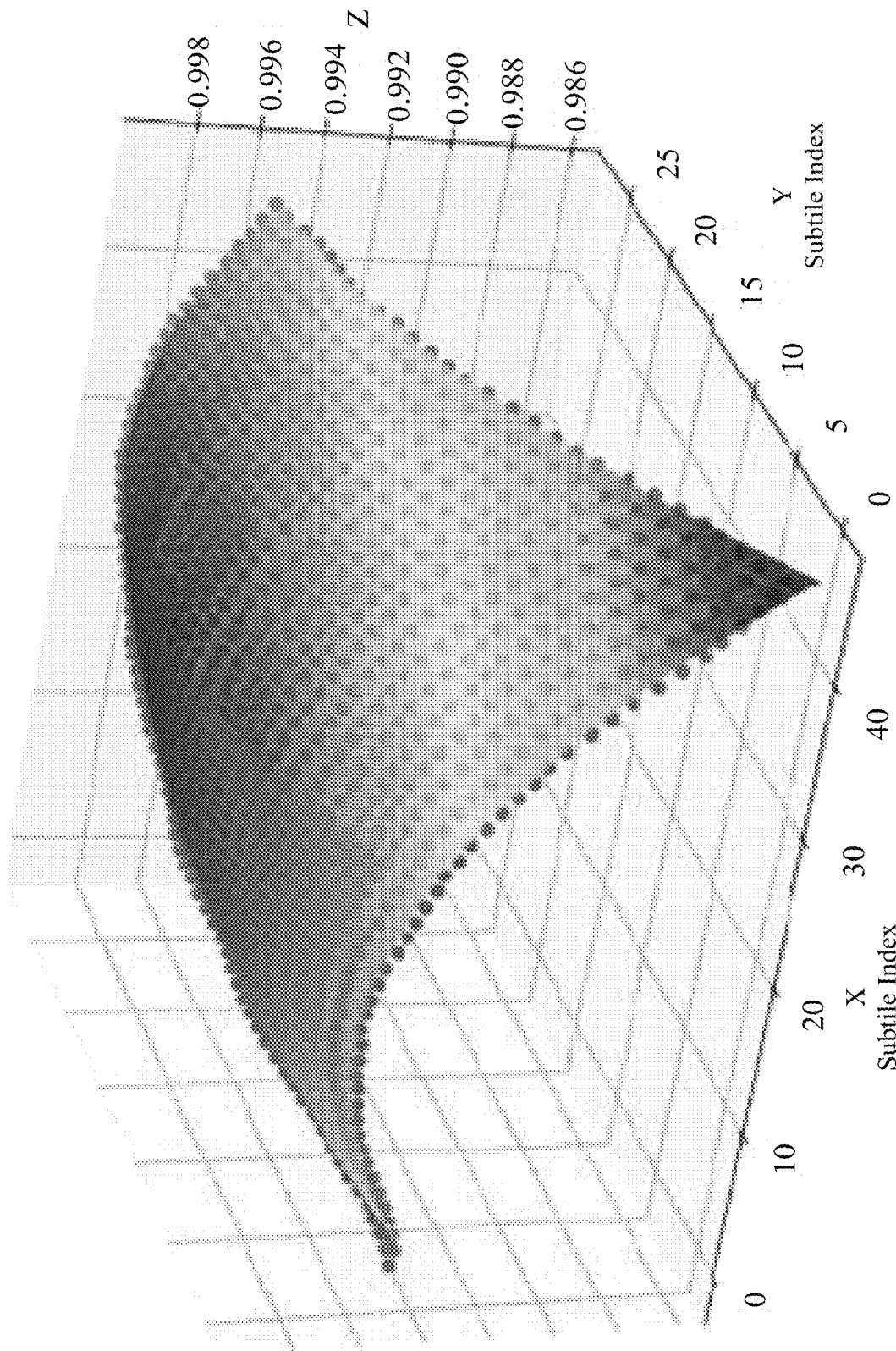
Figure 12A:
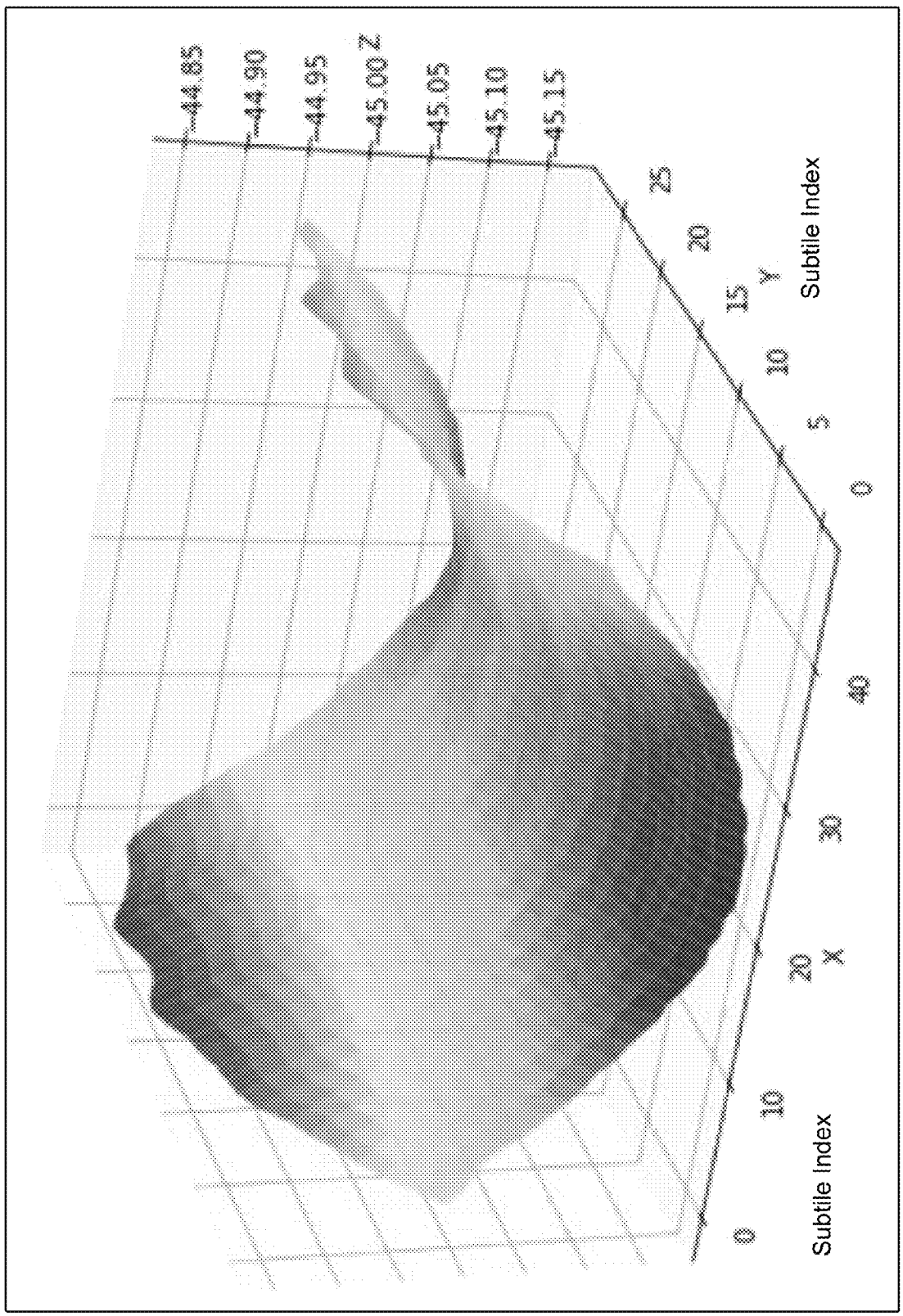
FIG. 12A illustrates measured data points not smoothed by curve fitting.
Figure 12B:
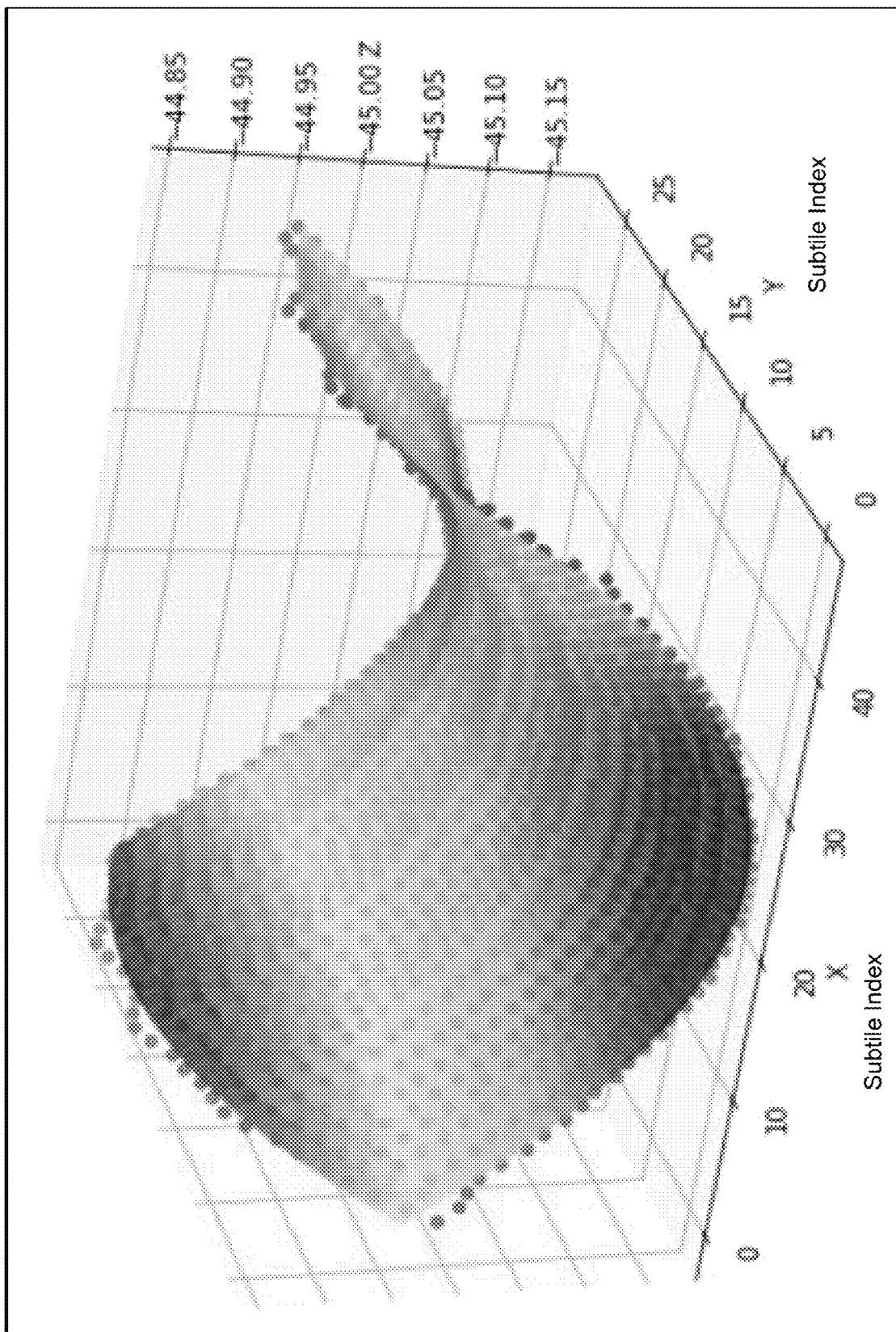
FIG. 12B illustrates actual data that are compared to a quadratically fitted surface.

In practice, it has been observed that spacing distortion across the field of view can be represented as a bowl or inverted bowl shape while angle distortion characteristically takes on the saddle shape. FIGS. 10A and 10B illustrate the inverted bowl shape of measured spacing, relative to spacing in a near-center subtile. FIGS. 12A and 12B illustrate the saddle shape of measured angles, relative to a fringe pattern angle in the near-center subtile.

In FIGS. 10A and 10B, the x-axis is along the length of the sensor. The y-axis is along the width of the sensor. The labels on x-axis and y-axis are subtile indices. The vertical axis spacing is normalized to 1.000 spacing on the z-axis between regularly spaced fringes viewed in the near-center subtile. FIG. 10A depicts measured data points, not smoothed by curve fitting. It shows approximately 1.2 percent variation in observed fringe spacing between measurements in the center and the lower right portions of the sensor. In FIG. 10B, the actual data points, depicted in blue, are compared to a quadratically fitted surface. In the following section, we present measuring spacing and angle distortions across the full FOV as compared with near-center subtile.

Calibration of Spacing and Angle Distortion

In this section, we further describe techniques to calibrate a full field of view (FOV) over a sensor applied to capture of structured illumination and to provide fit a function to non-linear effects caused by lens distortion. Structured illumination involves projecting a regularly spaced and angled pattern onto an image plane. An image tile is captured of the projected structured illumination pattern. A near-center subtile is selected from the full field of view. Pattern spacing and angle over the subtile are measured, including variation within the subtile. We further determine the spacing and pattern angle across other subtiles over the full field of view. We express the spacing and pattern angle across the full field of view relative to the spacing and pattern angle in the near-center subtile. We repeatedly fit the polynomial surfaces to the spacing and the pattern angle over substantially the full field of view.

Figure 11A:
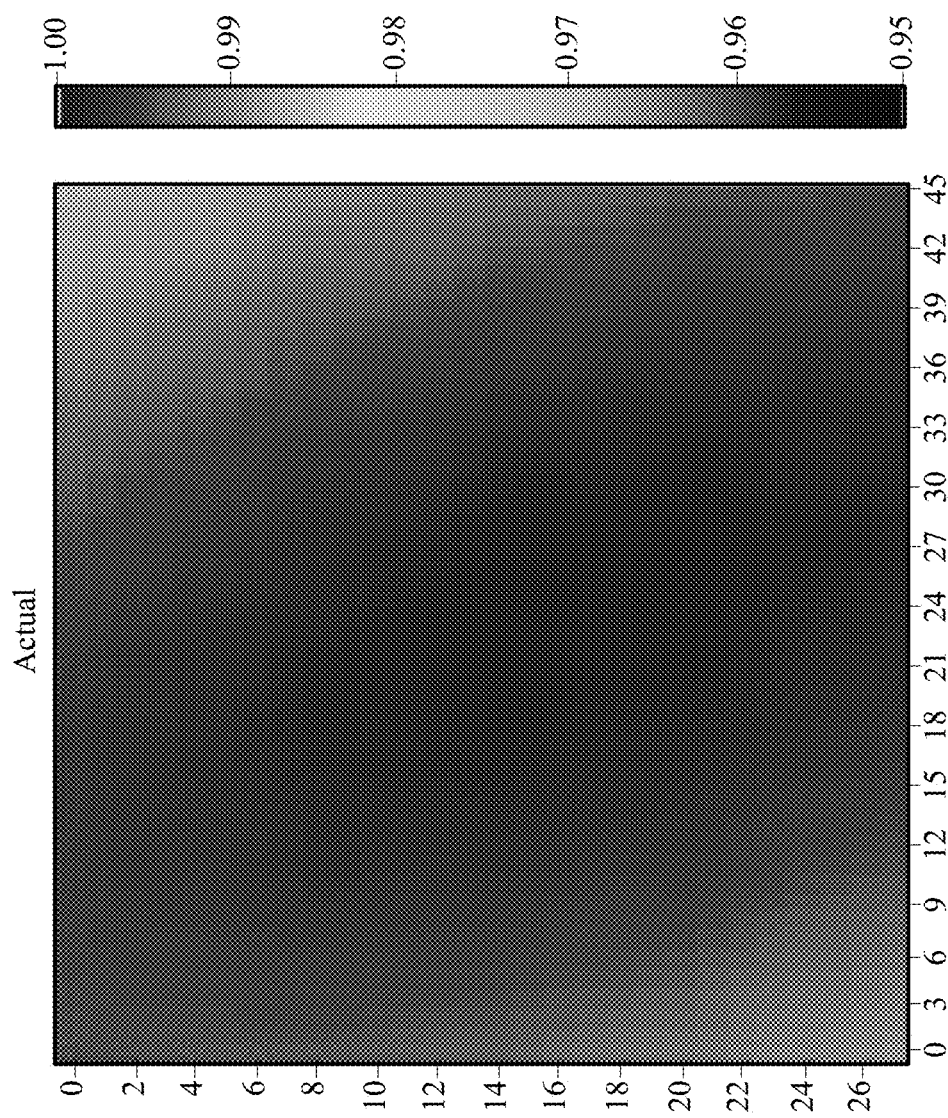
FIGS. 11A, 11B, and 11C compare measured spacing distortion with quadratic and cubic surface fits.
Figure 11B:
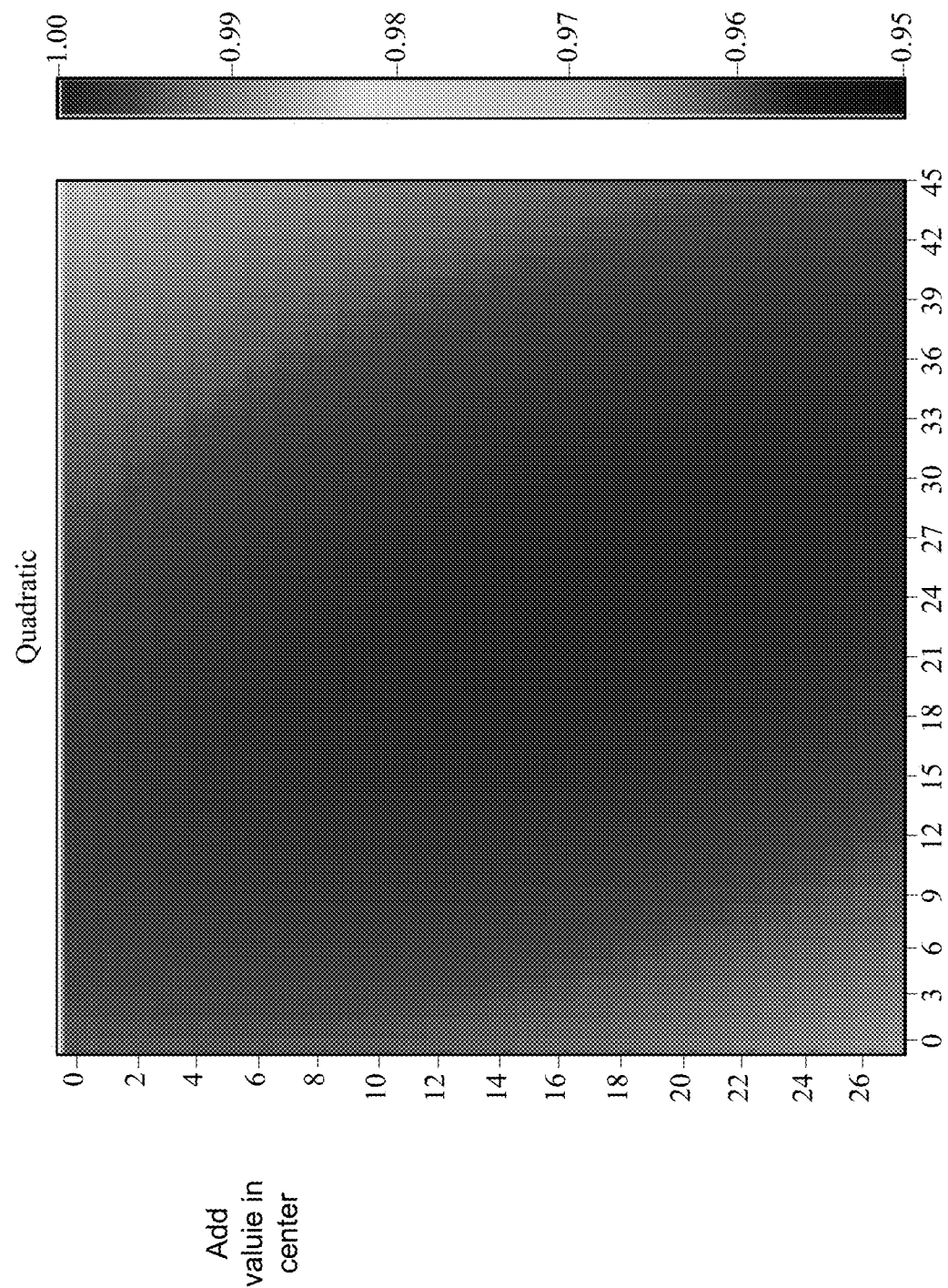
Figure 11C:
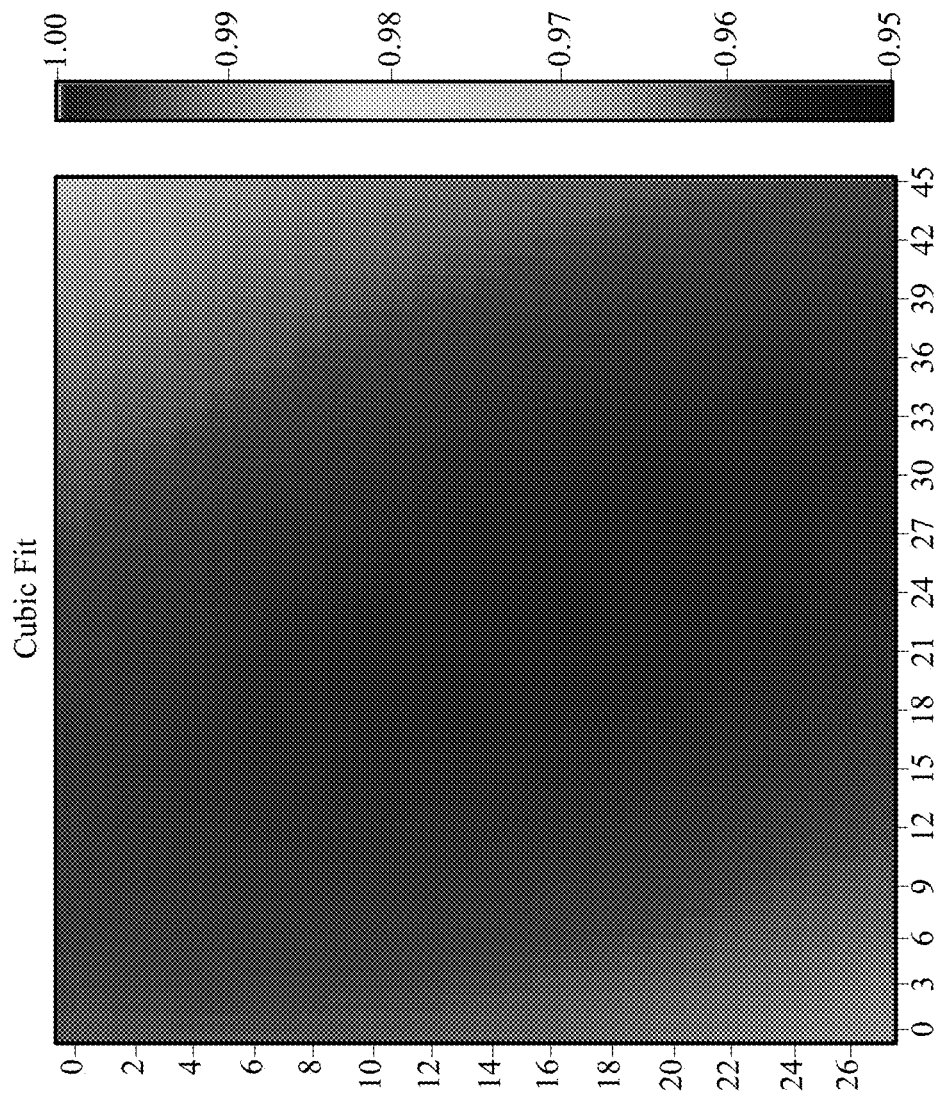

FIGS. 11A, 11B and 11C compare measured spacing distortion with quadratic and cubic surface fits. Color variation is subtle in the three figures, because there is less than 2% variation in spacing over the field of view in all three figures. Visual analysis of these figures and calculation of fitting errors suggest that a quadratic polynomial provides a sufficiently good fit for spacing distortion. The spirit and teaching of this disclosure cover higher order polynomials and alternative fitting schemes that may produce marginally better or worse results than a quadratic polynomial.

FIGS. 12A and 12B share the x and y axes configuration with the FIGS. 10A and 10B. The vertical axis in these figures indicates an angle of orientation of fringes observed over the field of view. Nominally, the angle might have been intended to be 45°. The range of measured angles is from 44.85 to 45.15 degrees, which is a variation of 0.6%. FIG. 12A depicts measured data points, not smoothed by curve fitting. In FIG. 12B, the actual data points, depicted in blue, are compared to a quadratically fitted surface.

FIGS. 13A to 13E and 14B to 14H illustrate how cropping along the sensor border can improve curve fitting for spacing and fringe angle over the sensor. The x and y axes of graphs in these figures represent pixels positions along the length and width of the sensor. Referring to FIG. 8C, cropping is indicated by a border near edges of the sensor. The figure illustrates that this cropping or shrinkage removes the distortion near the edges of the image captured by the sensor. The following figures illustrate how this shrinking of the image enables a good fit of the FOV data to the surface model. Shrink factor or a unit of shrinkage can be equal to shrinking the image by one sliding window stride. A stride value can be chosen to match the size of subtiles or chosen empirically based on number of pixels at the edges of the sensor that can cause distortion. For example, if the stride value is chosen as 200 pixels then one unit of shrinkage can remove the outer 200 pixels of image data that are of poor data quality on all sides of the image. Stride values smaller than 200 pixels such as 25, 50 or 100 pixels or larger than 200 pixels such as 225, 250, or 300 pixels can be used.

Figure 13A:
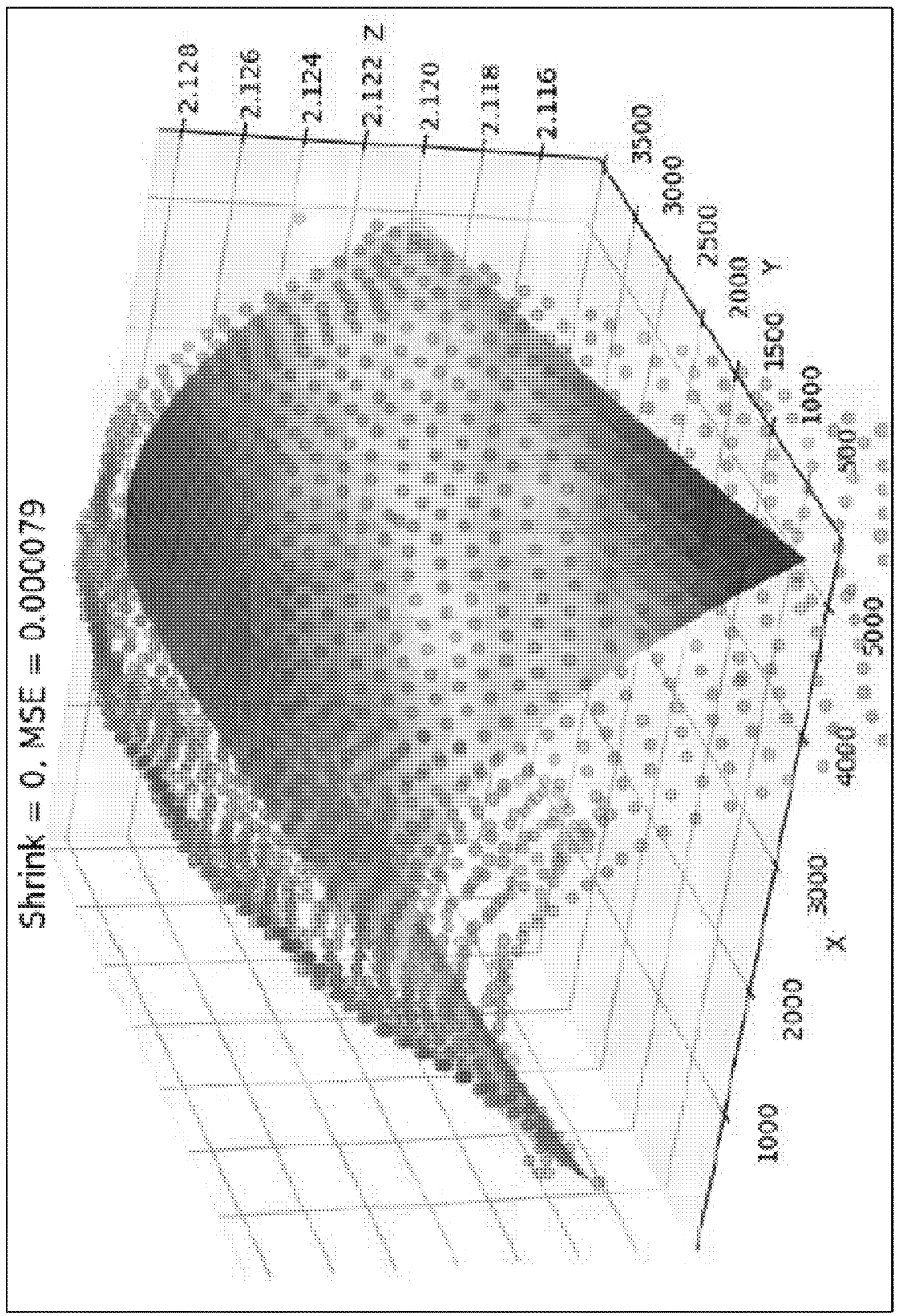
FIGS. 13A to 13E illustrate improvement in curve fitting by cropping along the sensor border.
Figure 13B:
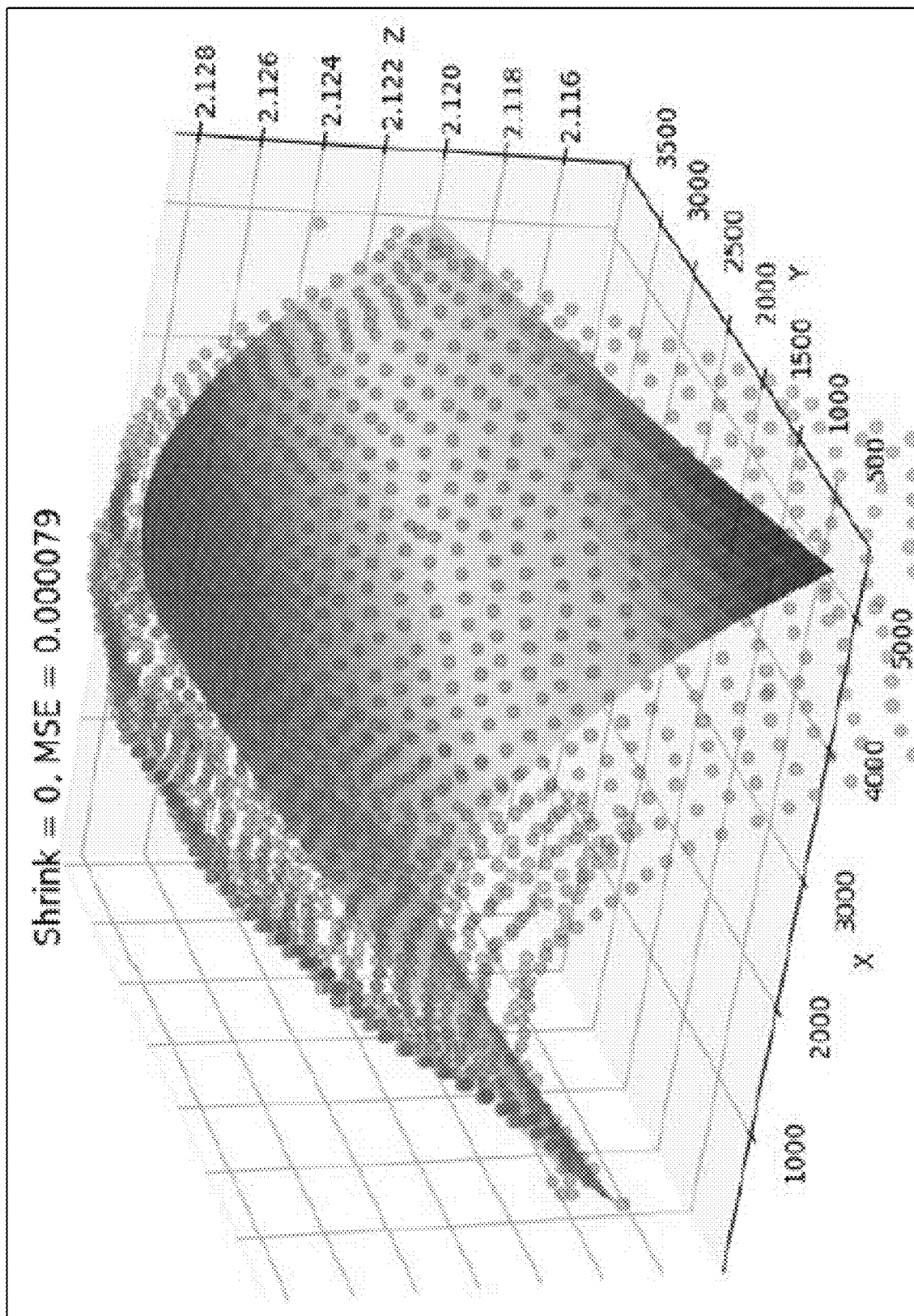
Figure 13C:
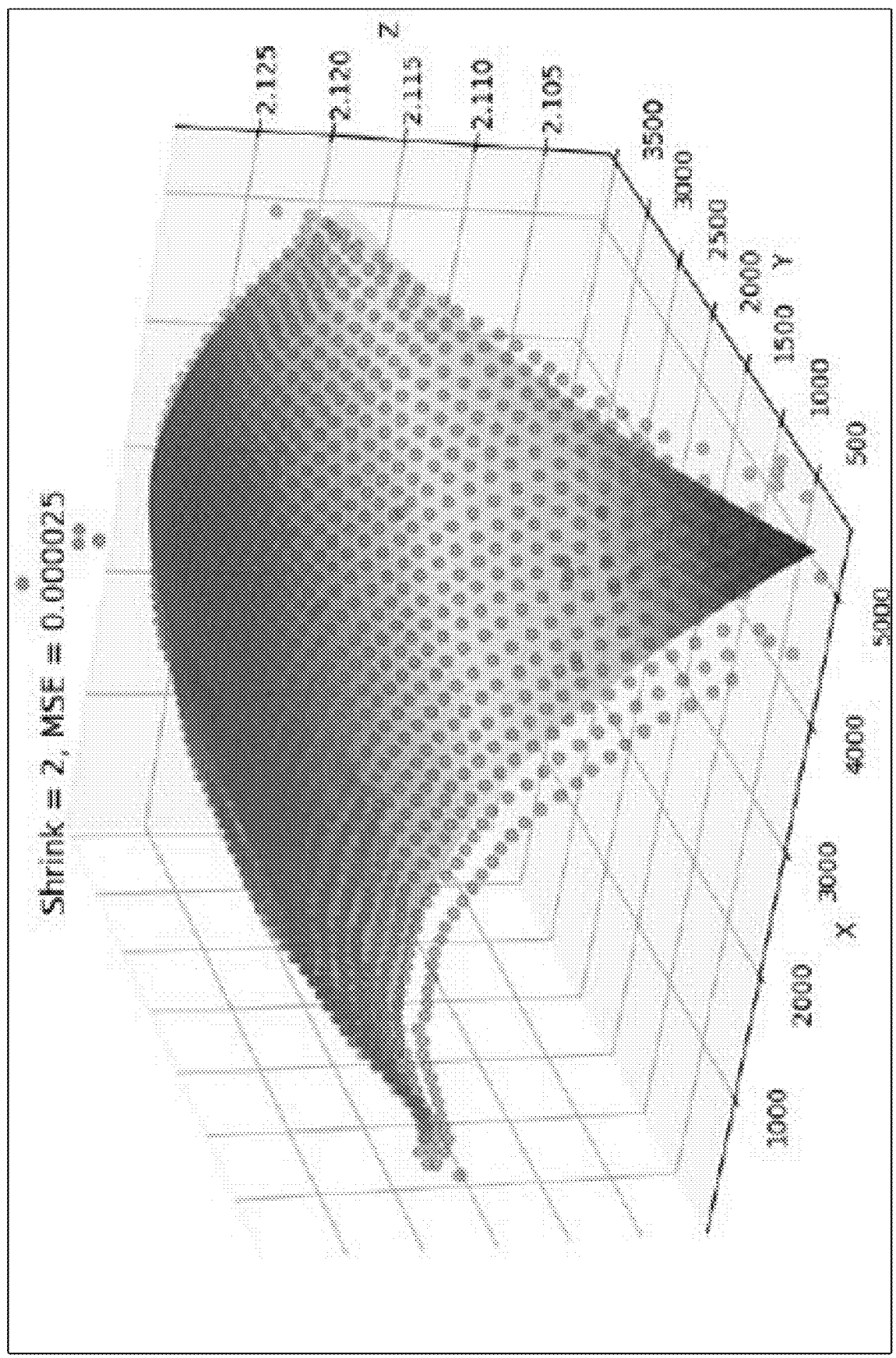
Figure 13D:
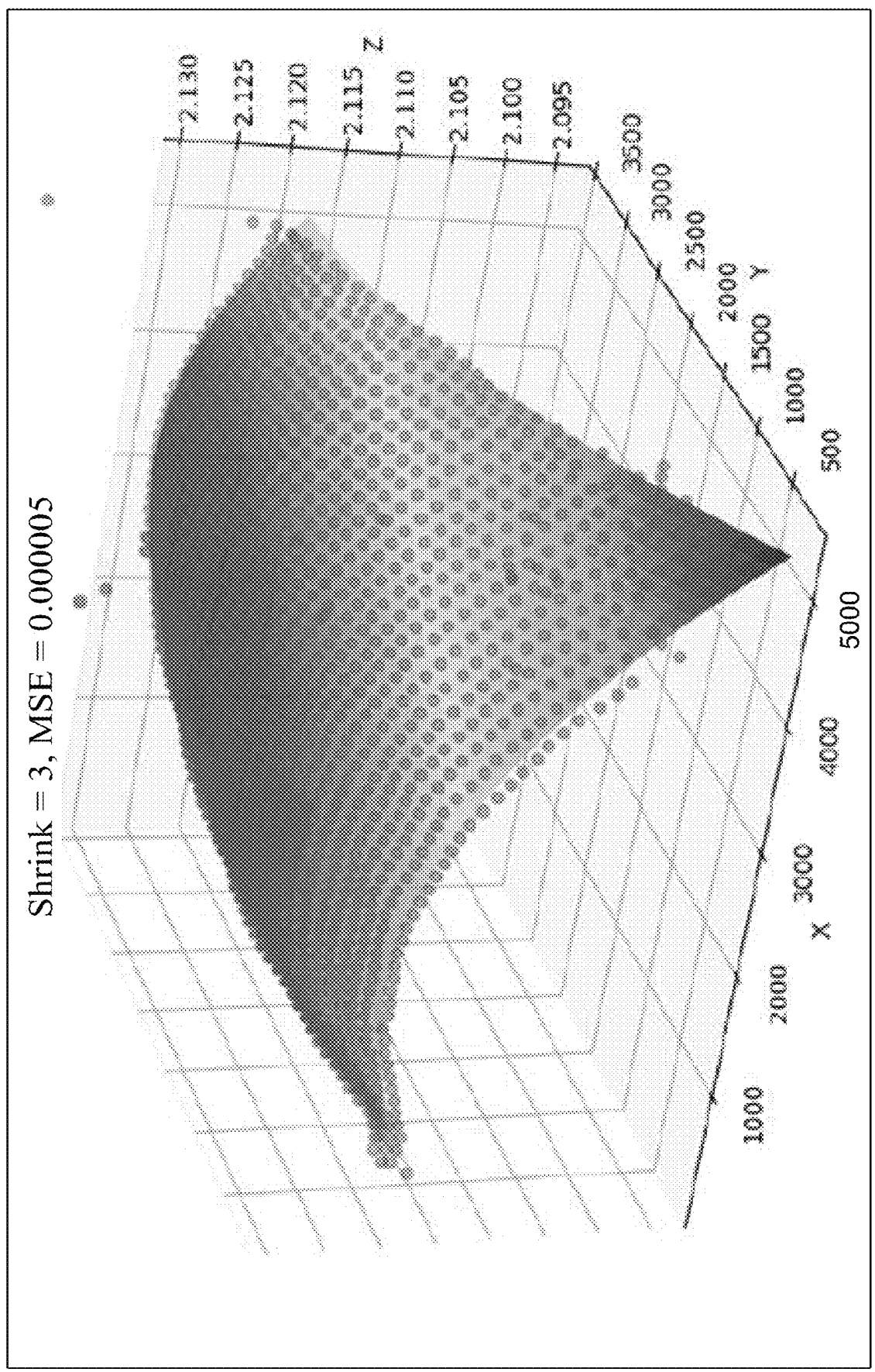
Figure 13E:
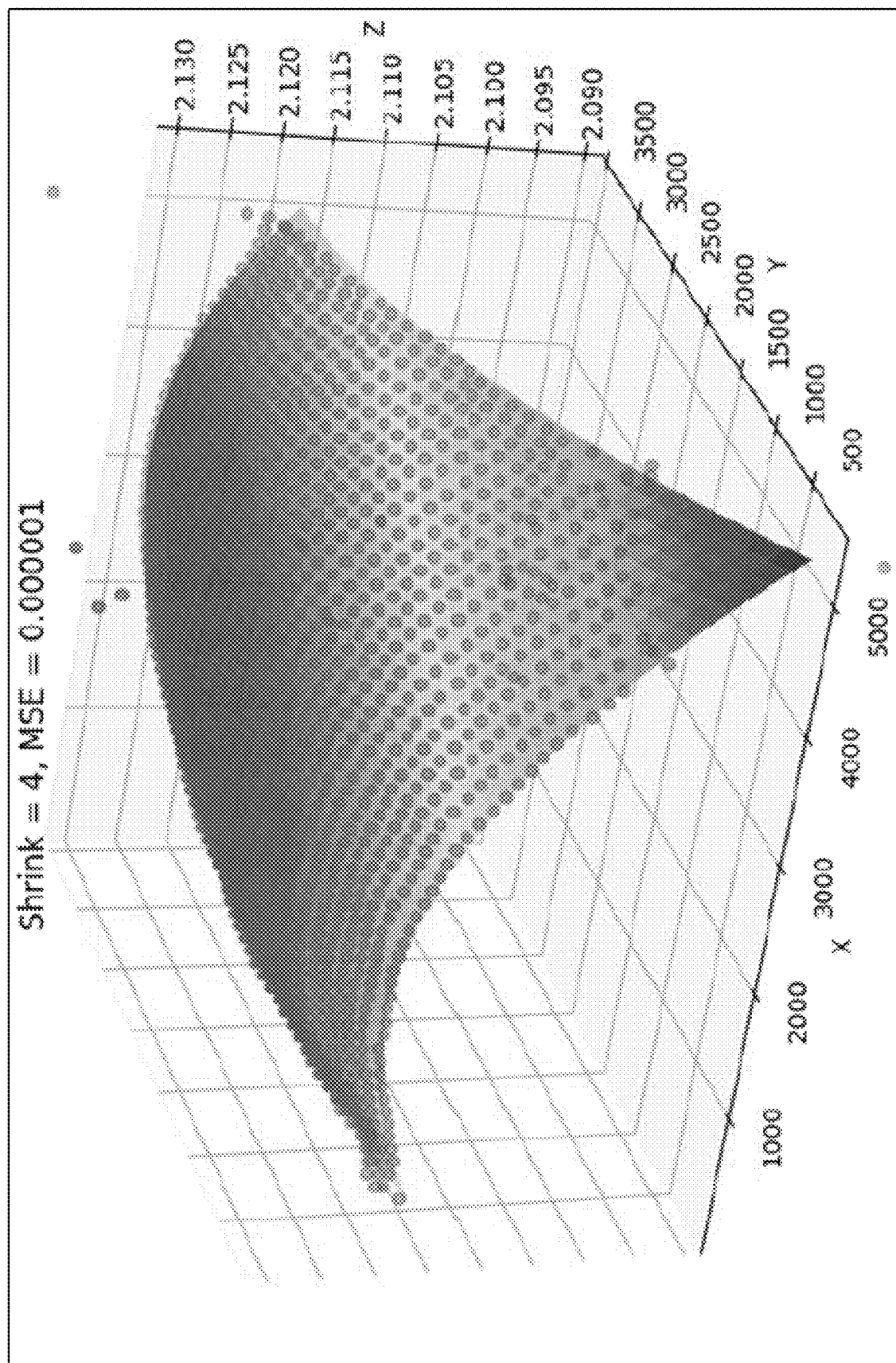

FIG. 13A shows the quadratic model surface for spacing distortion fit to the image data for full field of view (FOV), without cropping, in blue dots. No shrinking factor is applied to this full FOV image data i.e., the shrink factor is zero. As illustrated in FIG. 13A, the full FOV data does not provide a good fit for the model. As the shrink factor is increased incrementally from 1 to 4 (FIGS. 13B to 13E), the fit between the model and the uncropped data points improves. As cropping eliminates outlying data points, the scale along z-axis shrinks, indicating less variation among subtiles. Referring back to FIG. 8C, one sees that the outlier data points are along the edges of sensor, where cropping is applied. In FIG. 13C, many more outlying blue data points are apparent than in 13D-E. In FIG. 13E, the MSE has dropped to 0.000001 and the z-scale has stretched a little lower than in FIG. 13D.

Figure 14A:
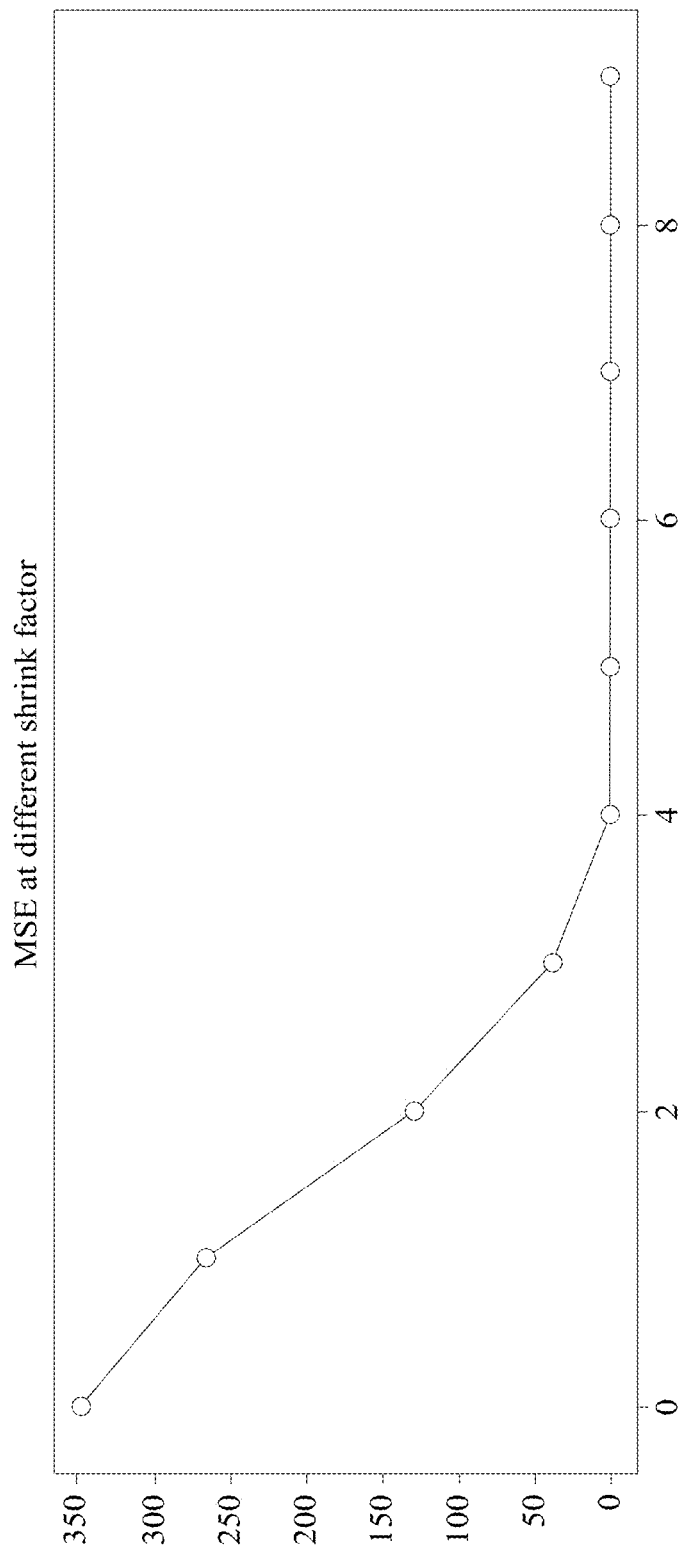
FIG. 14A graphically illustrates reduction in mean squared error (MSE) at different shrink factors.
Figure 14B:
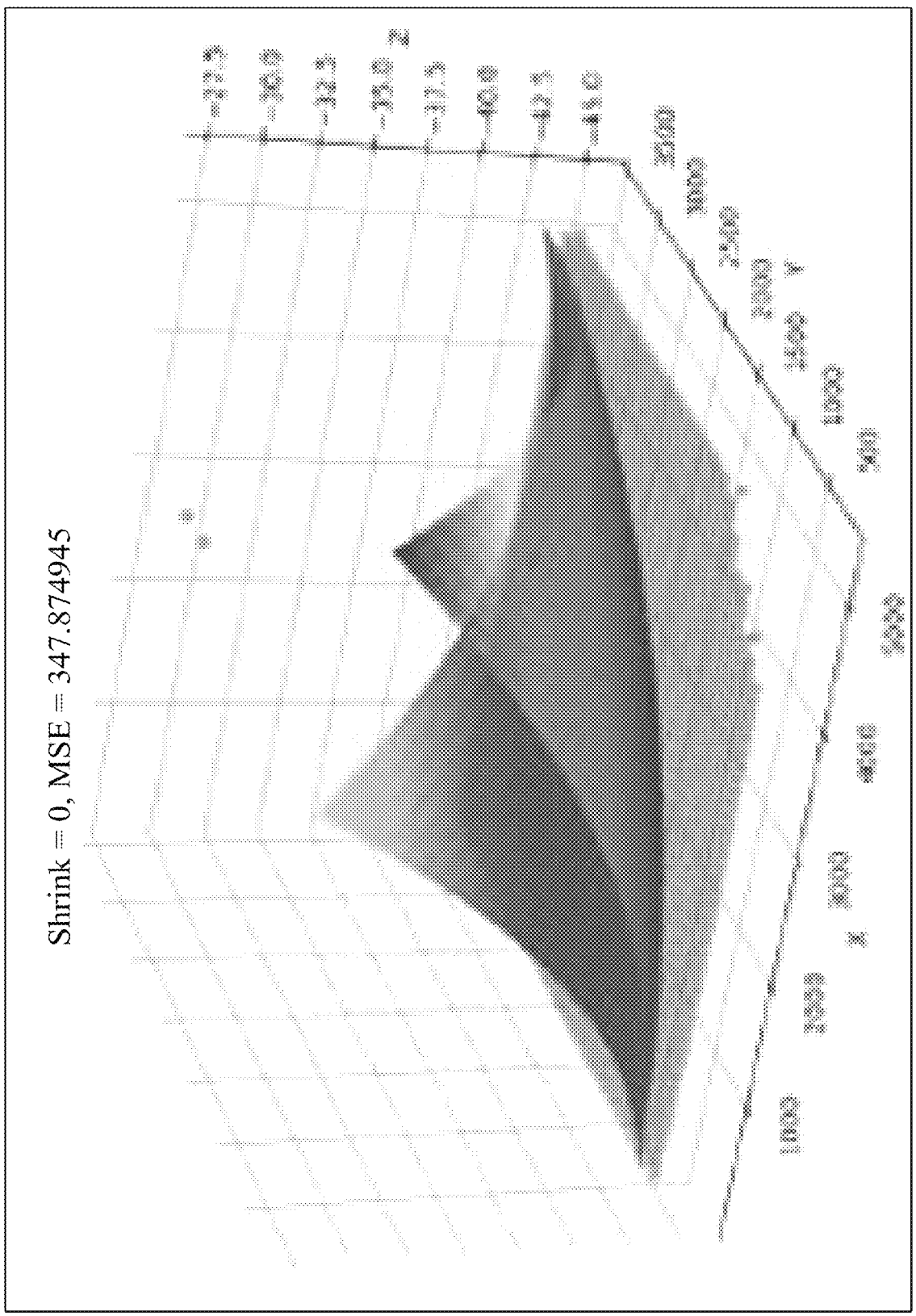
FIGS. 14B to 14G illustrate improvement in quadratic fit for angle distortion model by incrementally increasing the shrink factor applied to the full FOV image data.
Figure 14C:
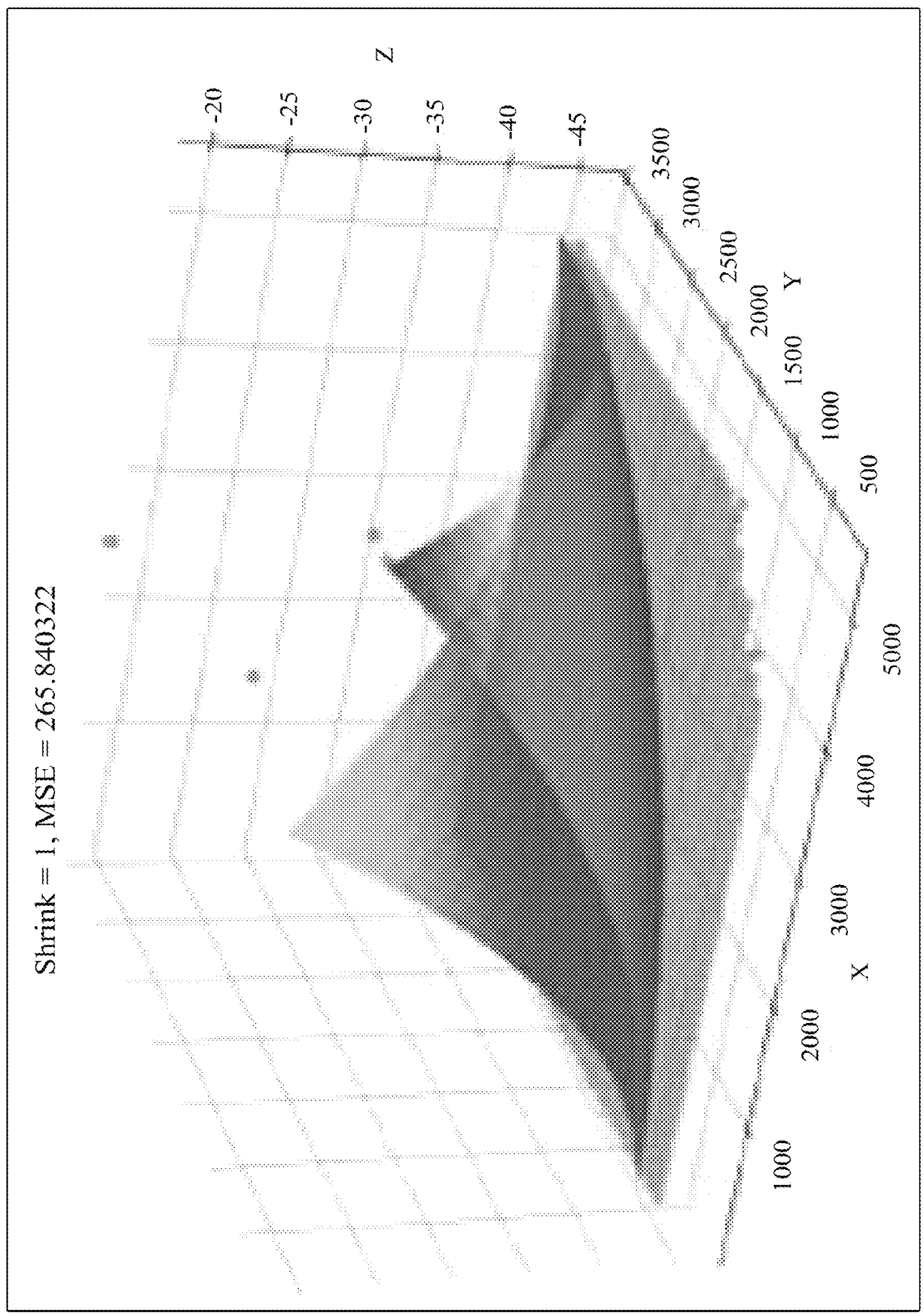
Figure 14D:
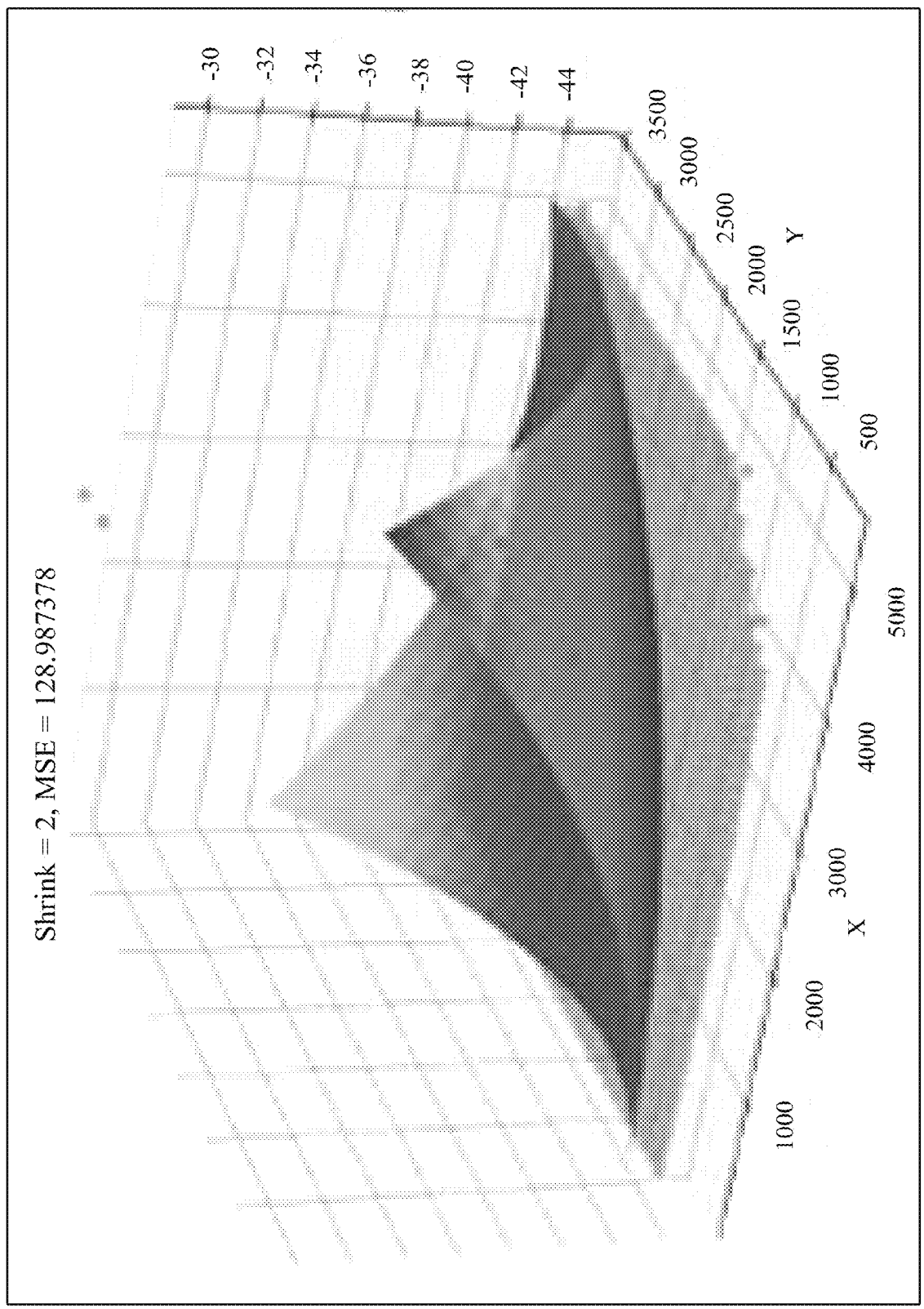
Figure 14E:
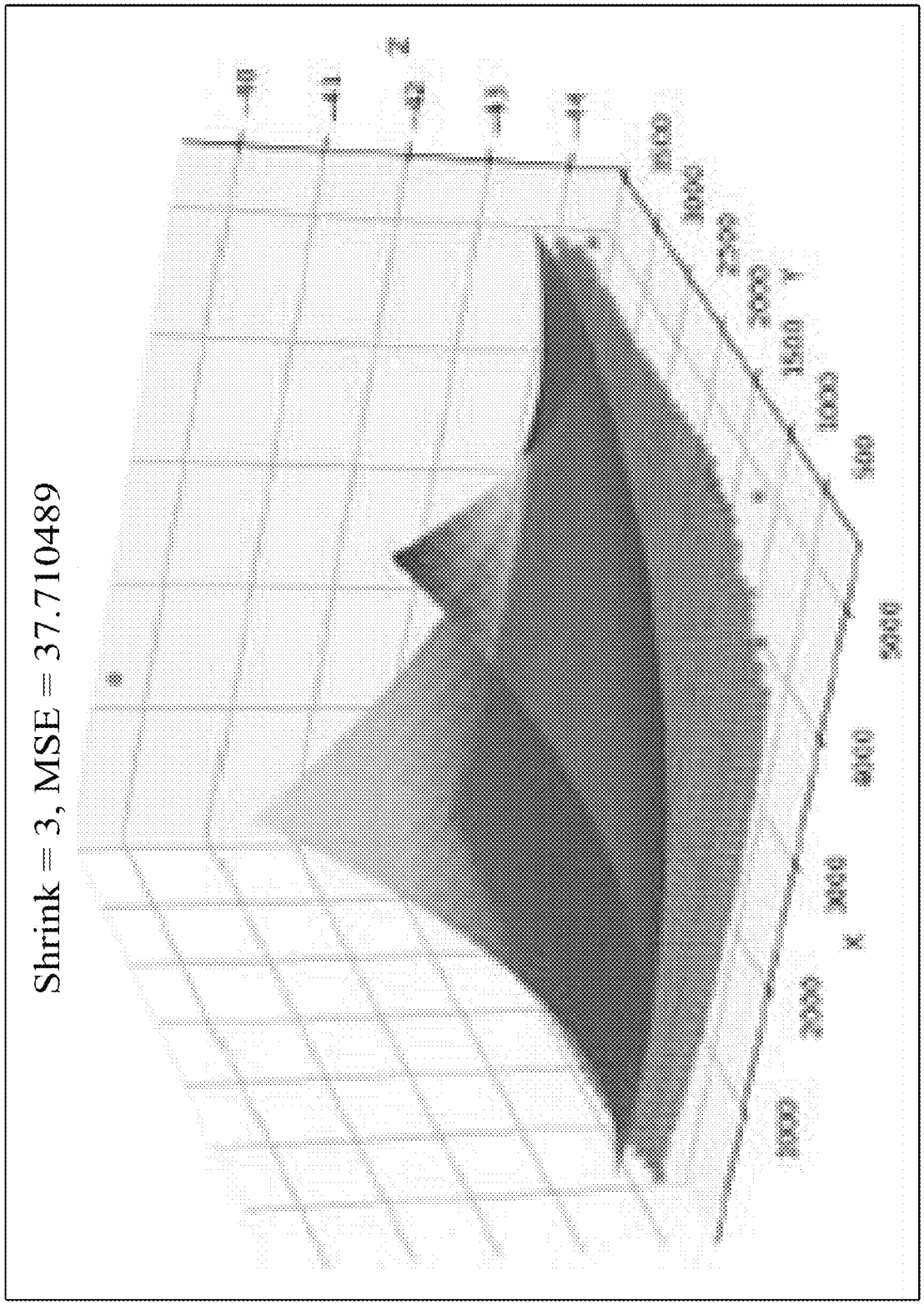
Figure 14F:
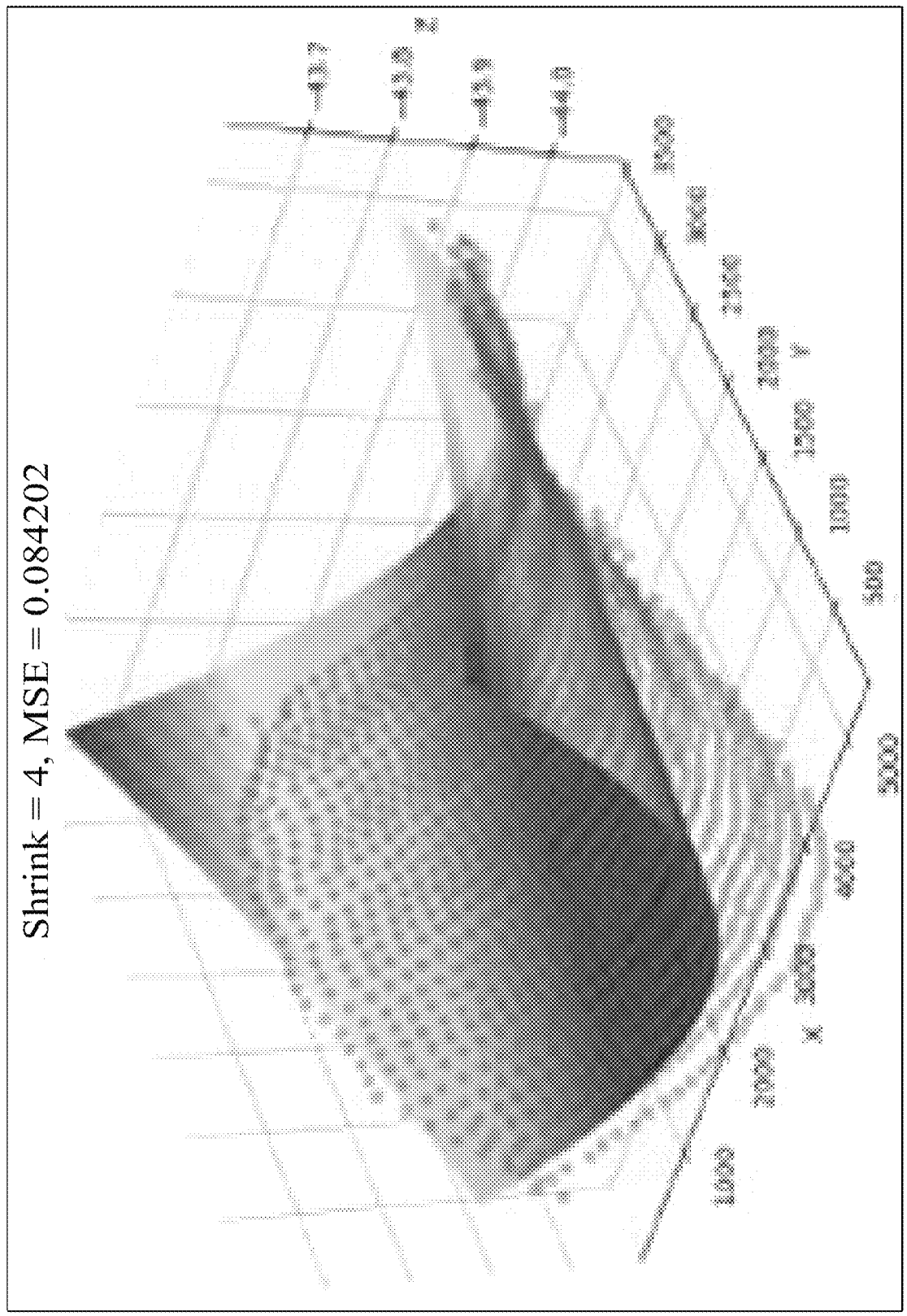
Figure 14G:
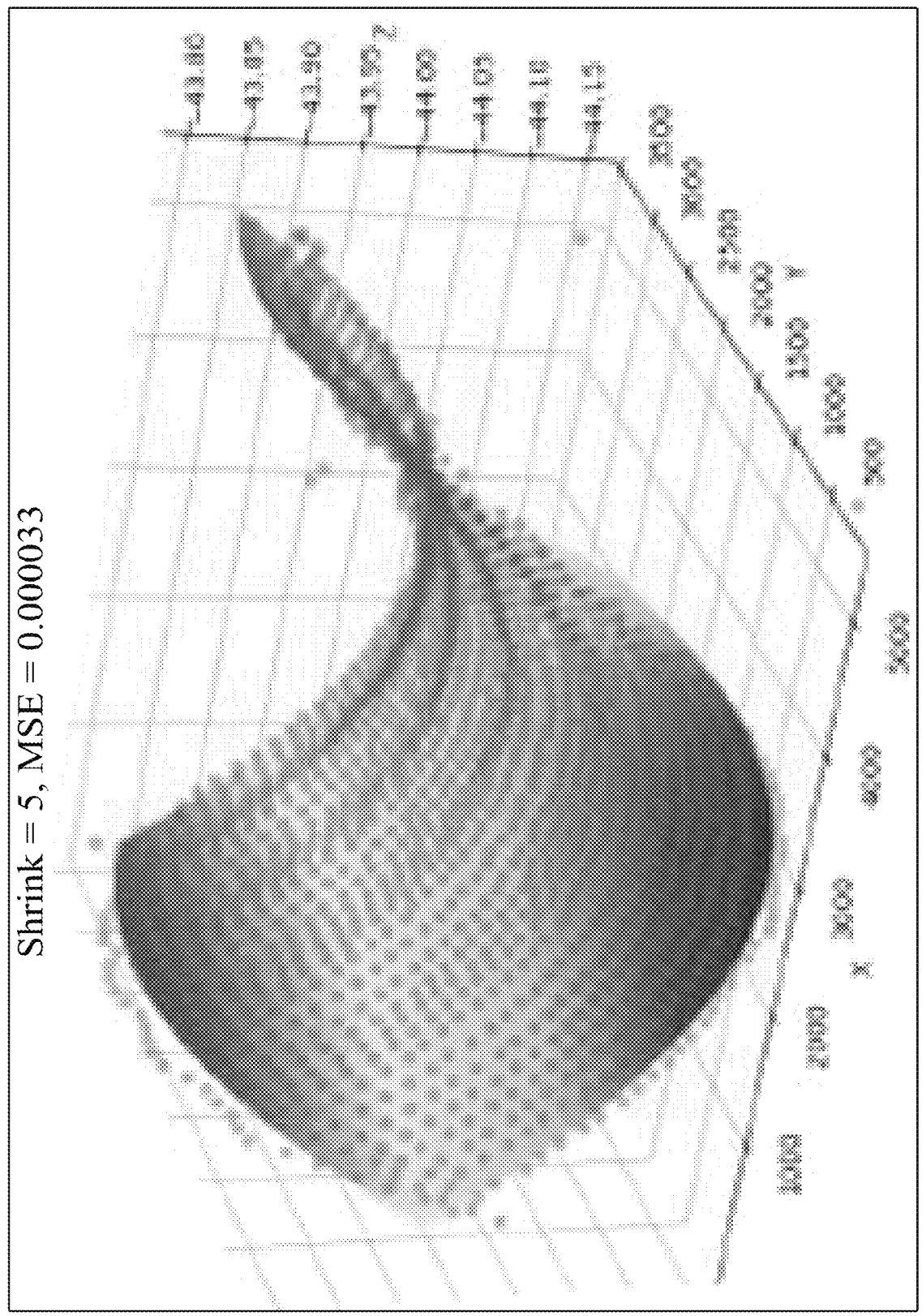
Figure 14H:
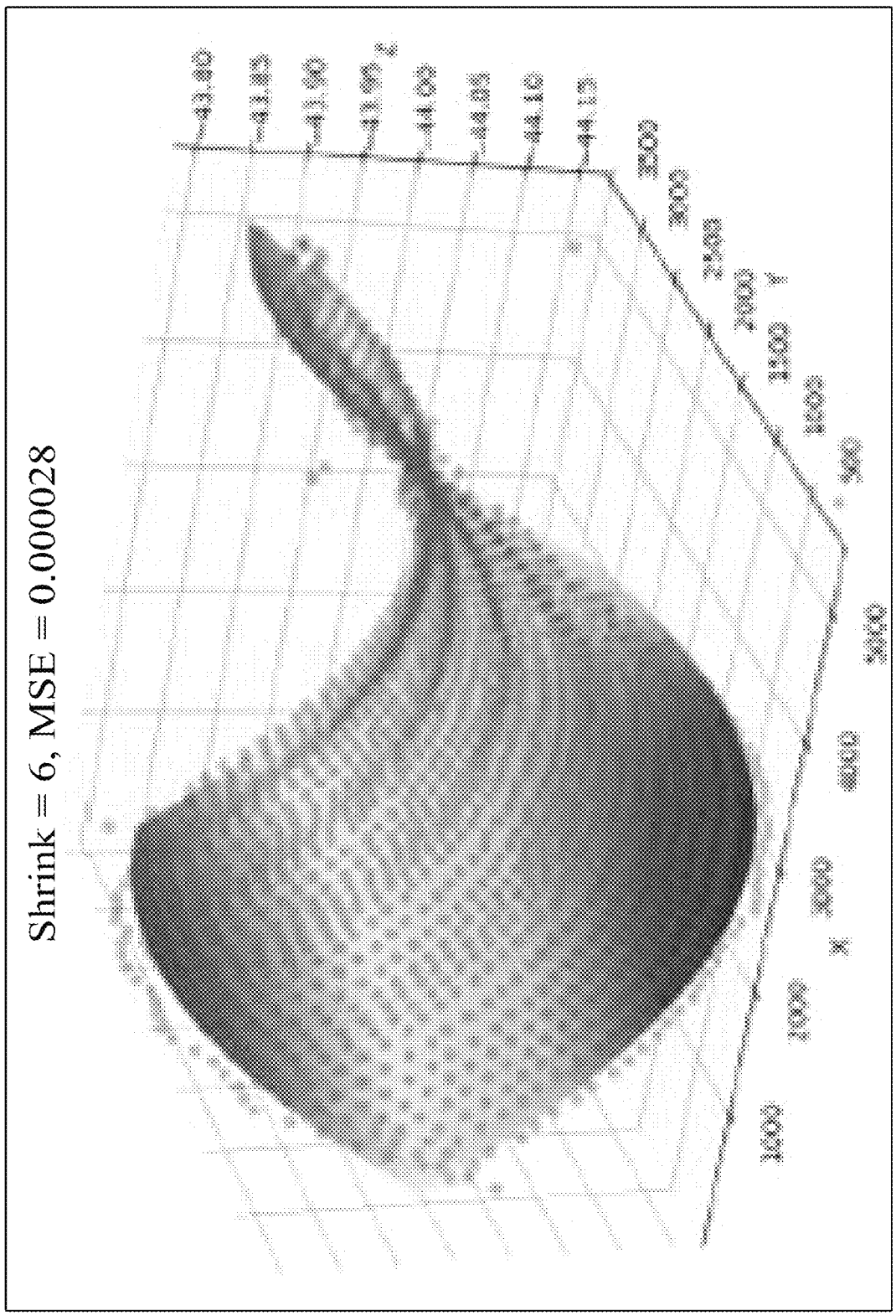
FIG. 14H is a graphical plot illustrating marginal improvement in quadratic surface fit when the value of shrink factor is six.

FIGS. 14B to 14H illustrate improvement in quadratic surface fit for angle distortion by incrementally increasing the shrink factor applied to the full FOV image data. As the shrink factor increases, the scale along the z-axis again shrinks, bringing the body of data points close to the fitted surface. The exclusion of outlying, distorted values on the edges of the sensor greatly improves the surface fit. In FIGS. 14B-E, the distortion is evident from the plane blue data points below the fitted surface. When the shrink factor is increased from "1" (FIG. 14C) to "3" (FIG. 14E), the scale along the z-axis shrinks in half from [−45, −20] to [−44, −40]. In FIG. 14F, cropping finally appears to bring the data points and the fitted surface closer together. In FIG. 14F the MSE drops to 0.000033. The quadratic surface model for angle distortion now fits matches the measure data shown as blue dots. In FIG. 14H, increasing the shrink factor is "6", produces a marginal improvement. From the figures, a shrink factor of "4" or more appears to be in order. A threshold based on percentage or absolute MSE improvement can be used to select a shrink factor or the impact of shrink factors on resolving power can be determined. Selection of a shrink factor can be automated using a ratioing or thresholding approach.

Characterizing the imaging system by fitting distortion surfaces can be performed before and/or during operation of the instrument. by occasionally re-estimating the spacing and pattern angle in the near-center subtile and using the extrapolation factors to determine the spacing and the pattern angle across the full field of view. The extrapolation factors can be applied without estimating spacing and pattern angle beyond the near-center subtile. The subtiles of the full field of view can overlap. During calibration, the spacing and the pattern angle are calculated independently for the overlapping subtiles. This approach can use two angles of orientation for the structured illumination pattern such that the two angles are substantially aligned with opposing corners of a rectangular or quadrilateral pattern of nanowells.

Thus, the technology disclosed includes calibrating and re-calibrating an instrument to characterized variation among subtiles of a tile. Characteristic distortion of spacing and angles can be captured in a way that greatly reduces the need to parameter estimation during instrument operation. The characterization/calibration can be enhanced by cropping away pixels at the edge of a sensor that are so distorted as not to fit a mapping surface, cropping away pixels that interfere with fitting.

Application of Calibrated Spacing and Angle

The technology disclosed can efficiently reconstruct an enhanced image across substantially a full field of view. For this purpose, we divide the full field of view into at least nine subtiles or subfields for independent reconstruction on a subtile basis. We can estimate or access already estimated spacing parameters and pattern angle parameters from viewing a regularly spaced and angled structured illumination pattern for a near-center subtile. We apply extrapolation factors to extend the near-center subtile parameters to other subtiles across the field of view. We use the near-center subtile estimated parameters and the other subtiles' extrapolated parameters to perform enhanced image reconstruction from multiple images. The multiple images are viewed at multiple pattern angles and periodically displaced pattern phases of respective pattern angles by applying structured illumination microscopy (SIM) analysis to the multiple images. In one implementation, the technology described above can further estimate the periodically displaced pattern of phases of the respective pattern angles. The technology described above can be extended to stitching together the subtiles, by identifying a regular pattern of noise along stitching borders, and mitigating the noise.

Figure 15A:
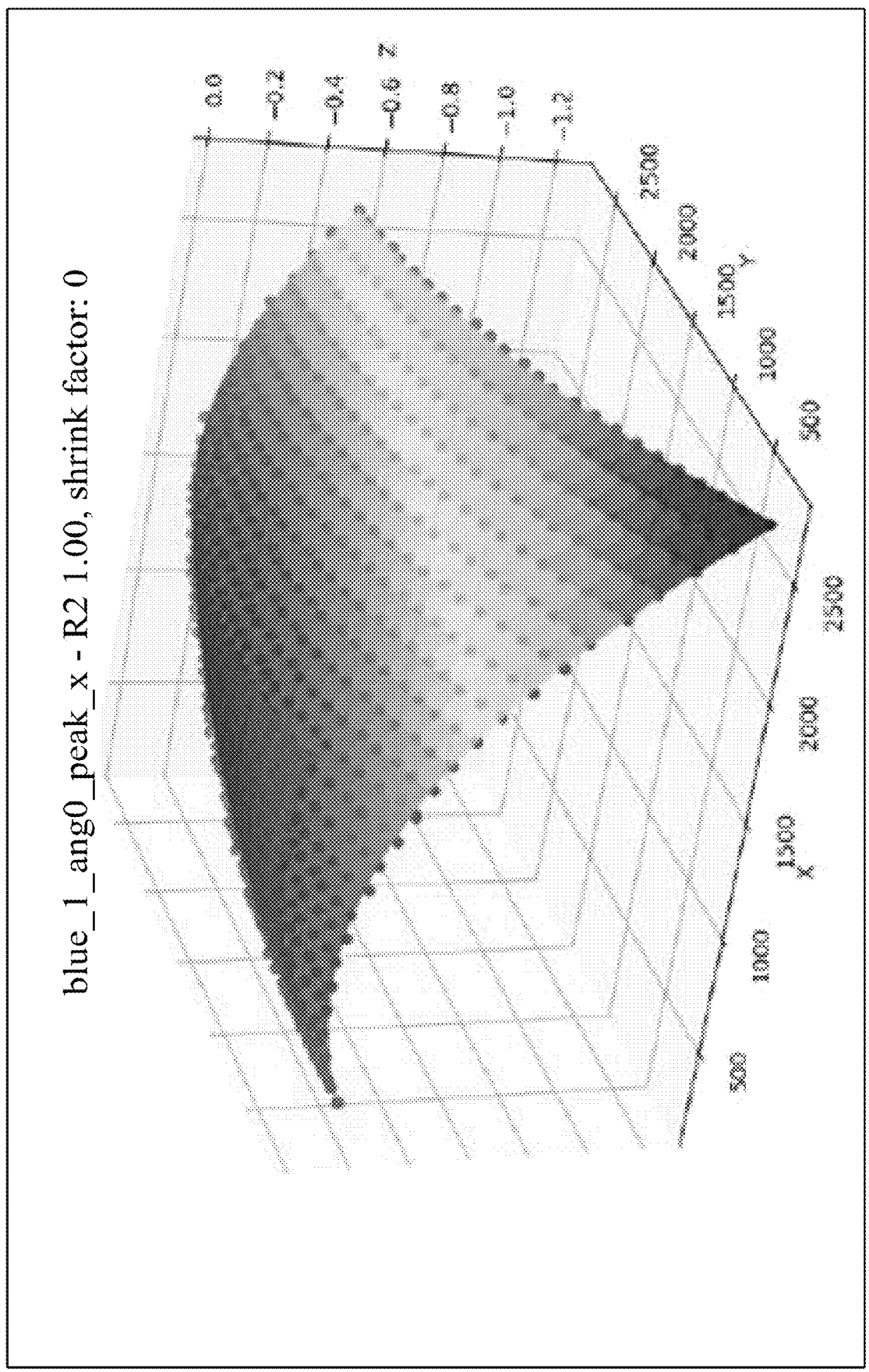
FIGS. 15A and 15B illustrate a quadratic fit of a response surface obtained by fitting the fringe spacing distortion (A) and the fringe angle distortion (B) across the full FOV image data.
Figure 15B:
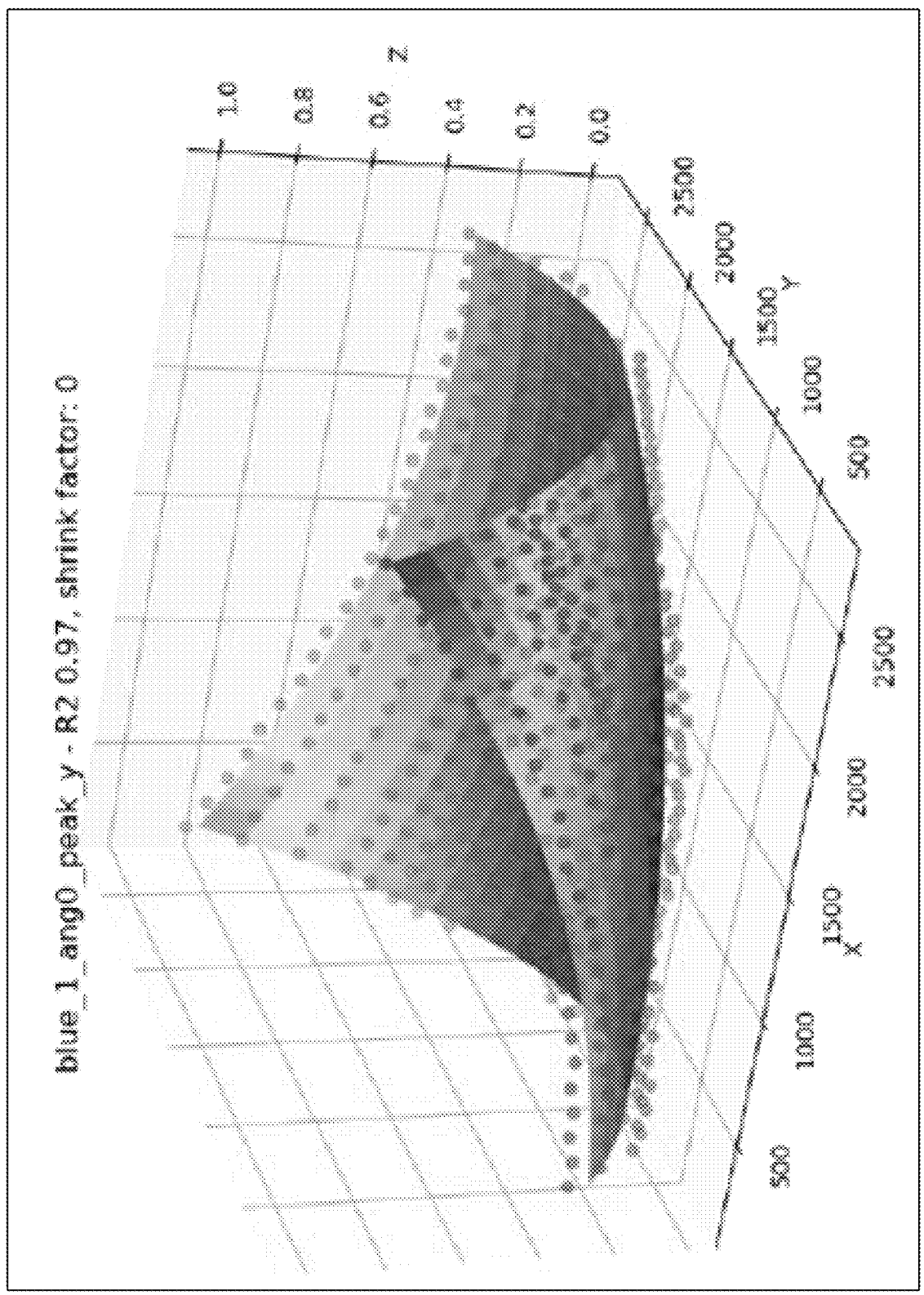

FIGS. 15A and 15B are examples of distortion models fitted from real data collected from sequencing instruments. FIG. 15A illustrates quadratic fit response surface obtained by fitting the fringe spacing distortion across the full field of view (FOV). FIG. 15B illustrates quadratic fit response surface obtained by fitting the fringe angle distortion across the FOV.

Estimation of Phase Displacement

Phase displacement is the remaining, third input parameter for SIM image reconstruction. This section adapts existing techniques to estimate the phase displacement. The technology disclosed performs estimation on subtiles, so we further present a technique to establish a common frame of reference for estimated phase displacement across subtiles, with respect to the full FOV tile. One implementation of phase estimation adapts the technique proposed by Wicker et al. 2013, in their paper titled, "Phase optimisation for structured illumination microscopy", section 3. Equations from Lal et al. 2015 titled, "Structured illumination microscopy image reconstruction algorithm," and from Wicker et. al. 2013 help explain Wicker phase estimation.

Equation (3) below, taken from Lal et al. 2015 separates three bands of frequency components: $\tilde{S}(k)\tilde{H}(k)$; $\tilde{S}(k-p_\theta)\tilde{H}(k)$; $\tilde{S}(k+p_\theta)\tilde{H}(k)$, from acquired images $\tilde{D}_{\theta,\phi_1}(k)$, $\tilde{D}_{\theta,\phi_2}(k)$, $\tilde{D}_{\theta,\phi_3}(k)$. The mixing matrix uses estimates of the phases $\phi_1$, $\phi_2$, and $\phi_3$ of images captured using a sinusoidal illumination intensity pattern $I_{\theta,\phi}(r)$, corresponding to a pattern angle or orientation $\theta$. Wicker et. al. 2013 refer to phase for $n^{th}$ image at an orientation as $\phi_n$. If phases are not known with sufficient precision, the unmixing or band separation process will imperfectly separate the spatial frequency components from the observed images $\tilde{D}_{\theta,\phi_1}(k)$, $\tilde{D}_{\theta,\phi_2}(k)$, $\tilde{D}_{\theta,\phi_3}(k)$ in frequency domain. Practically, the three spatial frequency components $\tilde{S}(k)\tilde{H}(k)$; $\tilde{S}(k-p_\theta)\tilde{H}(k)$; $\tilde{S}(k+p_\theta)\tilde{H}(k)$ will contain more or less residual information from other components, as represented by the noise term.

$$\begin{bmatrix} \tilde{D}_{\theta,\phi_1}(k) \\ \tilde{D}_{\theta,\phi_2}(k) \\ \tilde{D}_{\theta,\phi_3}(k) \end{bmatrix} = \frac{I_o}{2} M \begin{bmatrix} \tilde{S}(k)\tilde{H}(k) \\ \tilde{S}(k-p_\theta)\tilde{H}(k) \\ \tilde{S}(k+p_\theta)\tilde{H}(k) \end{bmatrix} + \begin{bmatrix} \tilde{N}_{\theta,\phi_1}(k) \\ \tilde{N}_{\theta,\phi_2}(k) \\ \tilde{N}_{\theta,\phi_3}(k) \end{bmatrix} \quad (3)$$

where $M = \begin{bmatrix} 1 & -\frac{m}{2}e^{-i\phi_1} & -\frac{m}{2}e^{+i\phi_1} \\ 1 & -\frac{m}{2}e^{-i\phi_2} & -\frac{m}{2}e^{+i\phi_2} \\ 1 & -\frac{m}{2}e^{-i\phi_3} & -\frac{m}{2}e^{+i\phi_3} \end{bmatrix}$ This formulation with three components follows from the Fourier transform for sine or cosine illumination. A different illumination function would change the equations.

Precise knowledge of the illuminating sinusoidal intensity pattern phases is therefore important. As it is not always possible to precisely control these phases in experimental setup, it is desirable to determine the illumination pattern phases from the acquired image data. Wicker et. al. 2013 present a phase estimation technique for SIM data acquired using coherent sinusoidal illumination at a selected frequency. Coherent illumination produces good pattern contrast from fine gratings with a very small illumination peak spacing 's', which enhances the reconstructed resolution. We retrieve illumination pattern phase of the $n^{th}$ image using the illumination pattern's peak frequency. The illumination pattern's peak frequency is also referred to as Fourier peak.

Equation (4) below from Wicker et. al. 2013 presents a generalized form of equation (3) with acquired images $\tilde{D}_n(\vec{k})$ over frequencies $\vec{k}$ in the frequency domain. Each image comprises of three components that are referred to as $\tilde{C}_{-1}(\vec{k})$, $\tilde{C}_0(\vec{k})$, $\tilde{C}_{+1}(\vec{k})$ superimposed with different phases. Note that these three components are the same three components as $\tilde{S}(k)\tilde{H}(k)$; $\tilde{S}(k-p_\theta)\tilde{H}(k)$; $\tilde{S}(k+p_\theta)\tilde{H}(k)$ in equation (4).

$$\tilde{D}_n(\vec{k}) = e^{-i\phi_n}\tilde{C}_{-1}(\vec{k}) + \tilde{C}_0(\vec{k}) + e^{i\phi_n}\tilde{C}_{+1}(\vec{k}) = \frac{c}{2}e^{-i\phi_n}\tilde{S}(\vec{k}+\vec{p})\tilde{h}(\vec{k}) + \tilde{S}(\vec{k})\tilde{h}(\vec{k}) + \frac{c}{2}e^{i\phi_n}\tilde{S}(\vec{k}-\vec{p})\tilde{h}(\vec{k}) \quad (4)$$

Note that 'c' in equation (4) is referred to as contrast of the illumination pattern. In the absence of noise, 'c' is the same as the modulation factor 'm' in mixing matrix M in equation (3). To determine $\phi_n$, the frequency $\vec{k}$ in equation (4) is replaced with $\vec{p}$ which is peak frequency of illumination pattern, resulting in equation (5).

$$\phi_n \approx \arg\{\tilde{D}_n(\vec{p})\} = \arg\left\{\frac{c}{2}e^{-i\phi_n}\tilde{S}(2\vec{p})\tilde{h}(\vec{p}) + \tilde{S}(\vec{p})\tilde{h}(\vec{p}) = \frac{c}{2}e^{i\phi_n}\tilde{S}(0)\tilde{h}(\vec{p})\right\} \quad (5)$$

Equation (5) shows that pattern phase $\phi_n$ is approximately equal to the phase of the acquired image $\tilde{D}_n(\vec{p})$ over frequency $\vec{p}$. This approximate estimation of the pattern phase $\phi_n$ yields good results when three guidelines are followed. First, the contrast c of the illumination pattern should to be sufficiently large. Second, the sample power spectrum should decrease sufficiently fast with growing frequency. When these two guidelines are followed, equation (5) is dominated by the last term and therefore, can be simplified to:

$$\phi_n \approx \arg\{e^{i\phi_n}\tilde{S}(0)\tilde{h}(\vec{p})\} \quad (6)$$

For any real valued sample, the center frequency $\tilde{S}(0)$ will be real valued. Further, if the point spread function (PSF)

h($\vec{r}$) is real and symmetrical, the optical transfer function (OTF) $\tilde{h}(\vec{k})$ will be real. An OTF is a convolution of the point spread function (PSF). A point spread function is the spatial domain version of the optical transfer function of the imaging system. The name "point spread function" indicates that all physical optical systems blur (spread) a point of light to some degree, with the amount of blurring being determined by the quality of the optical components. The resolution of the imaging system is limited by the size of the PSF. For asymmetrical PSFs the phases of the OTFs, have to be taken into account.

Third, the OTF at the pattern frequency $\tilde{h}(\vec{p})$ should be sufficiently large to overcome noise. If the OTF is too small, noise in the acquired image can significantly alter the phase measured at $\vec{p}$. This phase estimation method cannot be used for pattern frequencies $\vec{p}$ outside for the support of the detection OTF. For such frequencies, $\tilde{h}(\vec{p})=0$.

An optical system's OTF can be determined experimentally. For example, Lal et al. 2015 compute the OTF by obtaining several images of samples with sparsely distributed 100 nm fluorescent microspheres. Intensity distribution corresponding to more than 100 microspheres were then super-imposed and averaged to obtain an approximation for the system PSF. Fourier transform of this PSF provides an estimate of system OTF. With this background, we can apply the phase estimation technique described to subtiles.

Translating Subtile Phases to a Common Frame of Reference

It is useful to estimate phase displacement of tiles relative to the full field of view (FOV), so that measurement of phase in one subtile can be extrapolated to other subtiles across the tile. The illumination peak angle and illumination peak spacing for the full FOV can be estimated from the illumination peak angle and illumination peak spacing of the subtile using the quadratic models presented above. The phase displacement is less regular because it depends pixel geometry of subtiles, which can produce an irregular step function, instead of a smooth function. Each phase estimate has a "frame of reference" anchored to the top-left corner of the image being used to estimate the phase. As a result, when we want to correct for phase differences geometrically across the image, the phases estimated from each subtile need to be compared to a reference phase (from the center estimation subwindow or subtile) in a common frame of reference. We translate the phase estimate of each subtile to the same geometric location to achieve the common frame of reference. Translating the phase requires an accurate estimate of the fringe angle and spacing for each subtile. The fringe angle and spacing can be obtained from quadratic surface distortion models that were calibrated as a result of the distortion calibration process.

Figure 16A:
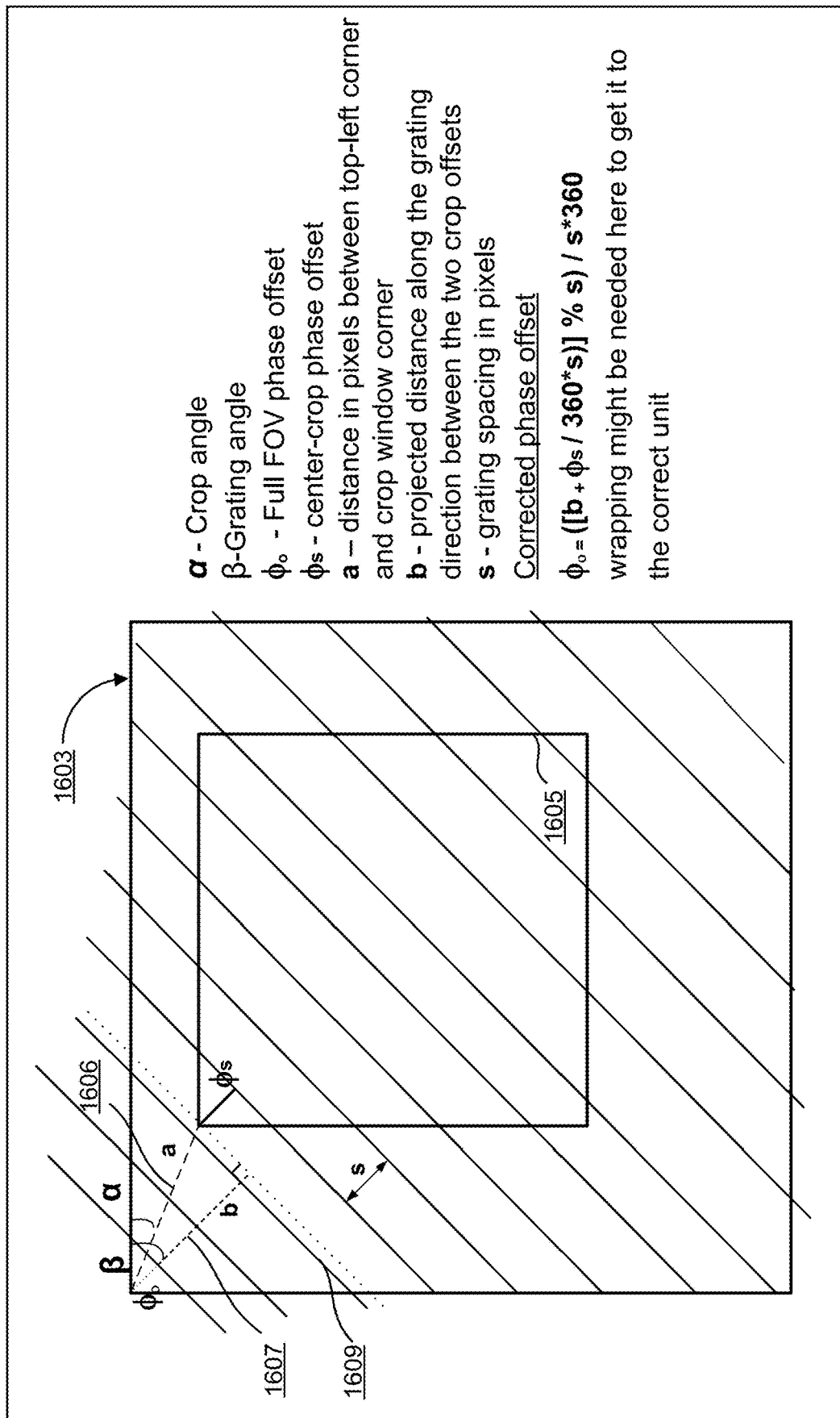
FIG. 16A illustrates translation of subtile phase offset from subtile coordinate system to full FOV image coordinate system.

We represent phase estimates using a common frame of reference across subtiles of the full FOV image. Subtile coordinate spaces are mapped to a the full FOV coordinate space. In this section, we illustrate translation of point coordinates from one space to another. FIG. 16A illustrates a general setup of a subtile window in a full FOV image window and relevant variables and a corrected phase offset formula that translates coordinates between local and global references. FIG. 16A shows a boundary 1603 representing the full field of view which contains a subtile shown by a boundary 1605. The crop angle α is defined by a line 1606 joining the top left corner of the full FOV window 1603 and the top left corner of the subtile window 1605. The length of the line 1606 is measured in pixels and is labeled "a".

An illumination peak angle β is formed between the top border of the sensor, window 1603, and a line 1607 perpendicular to a fringe peak line 1609 at the top left corner of subtile window 1605. This fringe peak line will be parallel to actual fringe peaks and likely to be offset from the peaks. The length of the line 1607 from the top left corner of 1603 to 1609 is a projected distance "b". The phase difference φ between top left corners of the tile 1603 and the subtile 1605 is a function of spacing s and distance b. In formula (7), the illumination peak spacing is represented as "s" in pixels and the phase in degrees:

$$\phi_o = ([b+(\phi_s/360*s)]\% \ s)/s*360 \tag{7}$$

This formula, derived and explained below, can be applied to translate a phase offset from subtile coordinates to full FOV coordinates. Translation between coordinate systems is illustrated in two examples that follow.

In SIM reconstruction a one-dimensional (1D) grating can be described by an intensity function such as:

$$I(x) = M\sin\left(\frac{2\pi}{s}\langle u, x\rangle + \phi\right) \tag{8}$$

where the parameters have the following meaning:
M is the modulation depth
s is the illumination phase spacing $$u = \begin{pmatrix} \cos\beta \\ \sin\beta \end{pmatrix}$$

is a unit vector
β is the illumination peak angle
The bold-faced x, u in the equation represent vectors: x is a vector in the image space representing a position in the image space at which the intensity is determined; u is a unit vector. The intensity values of the sinusoidal illumination are positive, in a scaled range from a +M (bright) to −M (dark).

Once the phase displacement difference between subtiles has been characterized, only the phase displacement at the near-center subtiles needs to be estimated, because phase displacements of the other subtiles can be extrapolated from the near-center subtile.

The following calculations are related to the estimation of the phase offset φ. Rather than estimating the phase offset using the data of an entire image (full FOV), it is possible to use the data from only a subtile of the image. The phase offset of the subtile is related to, but not identical to, the phase offset of the full FOV. In order to recover the phase offset of the full FOV from the subtile phase offset, it is necessary to characterize how the phase offset transforms under a spatial translation. The following mathematical model presents this spatial translation from subtile to full FOV.

Derivation of Coordinate Transformation

Figure 16B:
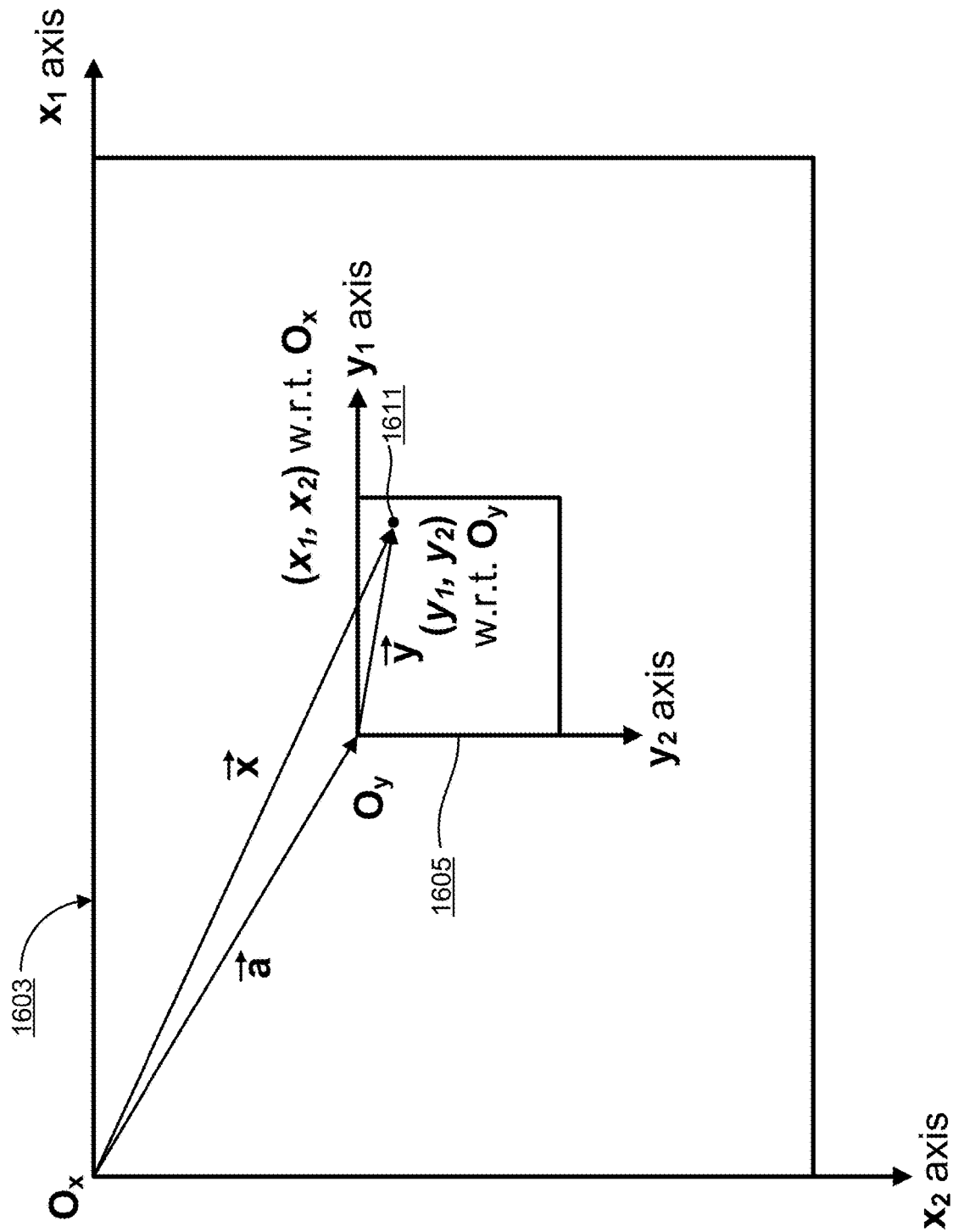
FIG. 16B illustrates position of a point in a subtile with respect to subtile coordinate system and full FOV image coordinate system.

Consider the function below that generates grating lines at an orientation as shown in FIG. 16A. The two-dimensional (2D) space of the full FOV is represented by coordinates space $O_x$ having coordinates $(x_1, x_2)$ as shown in FIG. 16B. We represent a point 1611 by a position $(x_1, x_2)$ with respect to $O_x$. A function $f(x_1, x_2)$ can be defined below as shown in equation (9). This function can be used to generate the illumination pattern lines at an orientation as shown in FIG. 16A.

$$f(x_1, x_2) = \sin\left(\frac{x_1 - x_2}{\sqrt{2}}\right) \quad (9)$$

The one-dimensional periodicity of the above function $f$ is represented by function in equation (10). Referring to FIG. 16A, this function represents the repetition of the illumination pattern lines as we move along the line 1607 in FIG. 16A which is perpendicular to the illumination pattern lines. This function can determine the spacing "s" between the two lines by determining the position at which a particular intensity value is repeated. Equation (10) shows periodicity of the intensity of the illumination pattern. In Equation (10), the line normal to intensity peaks is at a 45 degree angle extending down and to the right from the top left corner, so intensity at the point ($x_1$, $x_2$) is repeated at a successive point ($x_1+\sqrt{2}\pi$, $x_2-\sqrt{2}\pi$) down and to the right along the line 1607.

$$f(x_1+\sqrt{2}\pi, x_2-\sqrt{2}\pi) = f(x_1, x_2) \quad (10)$$

The illumination peak spacing "s" defined by the above function is shown in equation (11). For convenience, the coordinate system can be scaled to match the spacing of the illumination pattern, as shown in Equation (11).

$$s = \|(\sqrt{2}\pi, -\sqrt{2}\pi)\| = 2\pi \quad (11)$$

The illumination peak angle is defined by equation (12). The illumination peak angle is formed between the top border (horizontal line) of the full FOV and a line perpendicular to the illumination pattern lines as shown in FIG. 16A. Equation (12) shows this angle is −45 degrees for the structured illumination pattern generated by the 1D periodicity function in equation (9).

$$\beta = \arctan\left(\frac{\sqrt{2}\pi}{-\sqrt{2}\pi}\right) = \arctan(-1) = -\frac{\pi}{4} \quad (12)$$

The zero set of the pattern lines formed by the periodicity function presented in equation (9) is a union of lines and is represented by equation (13).

$$Z(f) = \bigcup_{n \in \mathbb{Z}} L_n \quad (13)$$

$$L_n = \{x \in \mathbb{R}^2 : x_2 = 2 + 2\sqrt{2}\pi n\}$$

The zero set includes the structured illumination pattern lines spaced at a distance "s" from each other. The pattern lines are formed by the points at which value of the 1D function $f(x_1, x_2)$ in equation (9) is zero. A unit vector that is orthogonal to the grating is defined by equation (14).

$$u = (\cos\beta, \sin\beta) = \left(\frac{1}{\sqrt{2}}, -\frac{1}{\sqrt{2}}\right) \quad (14)$$

We now present two examples of translating the phase offset of a subtile from the subtile coordinate space $O_y$ defined by the coordinates ($y_1$, $y_2$) to the full FOV coordinate space $O_x$. FIG. 16B illustrates a point 1611 which can be represented in the subtile coordinates by a vector $\vec{y}$ originating from the top left corner of the subtile window 1605. The same point 1611 can be represented in the full FOV coordinates by a vector $\vec{x}$ originating from the top left window 1603 for the full FOV image. A vector $\vec{a}$ connects the top left corner of the full FOV image window 1603 to the subtile window 1605 as shown in FIG. 16B. In the following sections we present examples to the position of the point 1611 can be translated from one coordinate system to another coordinate system.

First Example

Let a=(a, −a)∈$\mathbb{R}^2$, represent the upper left corner of the subtile 1605 in FIG. 16B. It means that the top left corner of the subtile 1605 is displaced from the top left corner of the full FOV window 1603 by a distance 'a' along horizontal axis $x_1$ and by a distance '−a' along the vertical axis $x_2$. We now translate a point ($x_1$, $x_2$) in the full FOV coordinate space $O_x$ to a point ($y_1$, $y_2$) in the subtile coordinate space $O_y$. Consider the change of coordinates given as:

$$(y_1, y_2) = T(x_1, x_2) = (x_1 - a, x_2 + a) \quad (15)$$

We can now represent the 1D periodicity function of equation (10) in the subtile coordinate space Oy as:

$$g(y_1, y_2) = f(T^{-1}(y_1, y_2)) = f(y_1 + a, y_2 - a) = \sin\left(\frac{y_1 - y_2}{\sqrt{2}} + \sqrt{2}\,a\right) \quad (16)$$

We can see that the phase offset introduced by the change of coordinates is given as:

$$\phi_a = \sqrt{2}\,a = \|a\| \quad (17)$$

Second Example

Now let us consider another position of the subtile with respect to the top left corner of the full FOV window. Let a=(2a, −a)∈$\mathbb{R}^2$, in this case the change of coordinates given as:

$$(y_1, y_2) = T(x_1, x_2) = (x_1 - 2a, x_2 + a) \quad (18)$$

The 1D periodicity function of equation (10) can now be represented in the subtile coordinate space Oy as:

$$g(y_1, y_2) = \quad (19)$$
$$f(T^{-1}(y_1, y_2)) = f(y_1 + 2a, y_2 - a) = \sin\left(\frac{y_1 - y_2}{\sqrt{2}} + \frac{3a}{\sqrt{2}}\right)$$

In this case, the phase offset introduced by the change of coordinates is given as:

$$\phi_a = \frac{3a}{\sqrt{2}} = \langle u, a\rangle \quad (20)$$

whereas $\langle u, a\rangle$ represents dot product of vector u with vector a. The dot product is defined as the sum of the corresponding components of the two vectors.

General Case

Theorem 1.

Let s>0, $\phi_0 \in \mathbb{R}$, and let u∈$\mathbb{R}^2$ be a unit vector. Consider the function $$f(x) = \sin\left(\frac{2\pi}{s}\langle u, x\rangle + \phi_0\right) \quad (21)$$

a) The grating spacing of $f$ is $s$.
b) For any $a \in \mathbb{R}^2$ there exists $\phi_a \in \mathbb{R}$ such that $$f(x-a) = \sin\left(\frac{2\pi}{s}\langle u, x\rangle + \phi_a\right) \quad (22)$$

Equation (21) illustrates the periodicity function with respect to the full FOV coordinate space Ox and has a phase offset $\phi_0$. Equation (22) shows the periodicity function for the subtile coordinate space and has a phase offset $\phi_0$.
c) Any Such $\phi_a$ Satisfies the Equation $$\phi_0 \equiv \frac{2\pi}{s}\langle u, a\rangle + \phi_a \mod 2\pi. \quad (23)$$

Proof (a) The illumination peak spacing is the length of a fundamental period for $f$. The vector $su$ is a period of length $s$, since $$f(x+su) = \sin\left(\frac{2\pi}{s}\langle u, x+su\rangle + \phi_0\right) \quad (24)$$

$$f(x+su) = \sin\left(\frac{2\pi}{s}\langle u, x\rangle + 2\pi\langle u, u\rangle + \phi_0\right) \quad (25)$$

$$f(x+su) = f(x) \quad (26)$$

Any smaller period would imply a period of less than $2\pi$ for sin.
(b) One solution is $$\phi_a = -\frac{2\pi}{s}\langle u, a\rangle + \phi_0 \quad (27)$$

because $$f(x-a) = \sin\left(\frac{2\pi}{s}\langle u, x-a\rangle + \phi_0\right) \quad (28)$$

$$f(x-a) = \sin\left(\frac{2\pi}{s}\langle u, x\rangle - \frac{2\pi}{s}\langle u, a\rangle + \phi_0\right) \quad (29)$$

c) If $\sin(t-a) = \sin(t-b)$ for all $t \in \mathbb{R}$ then $a \equiv b \mod 2\pi$ (30)

The relationships derived above can be used to translate the phase displacement estimated in a first coordinate space to a second coordinate space, such as between a subtile and a full FOV image tile. This is useful, because phase displacement is also subject to distortion between the near-center subtile and the rim of a lens. In the following section, we present a phase bias look up table that can capture the relationship between phase displacement values for non-center subtiles with respect to center subtiles.

Estimation of Phase Bias

The technology disclosed includes estimating phase for each subtile and then translating the phase offset to the full FOV coordinates, so that estimated phase displacement values are represented in a common frame of reference. We store the difference between the phase displacement values for the non-center subtiles and the near-center subtile in a phase bias or phase difference lookup table for each angle of the illumination pattern. In some cases, impact of environmental factors can increase instability of the system. In such cases, the phase bias lookup table is generated more frequently to compensate for increased system instability. For example, the phase bias table can be generated in first cycle of every sequencing run. The frequency of generation of phase bias lookup table can be increased or decreased according to the stability of the system.

Figure 17:
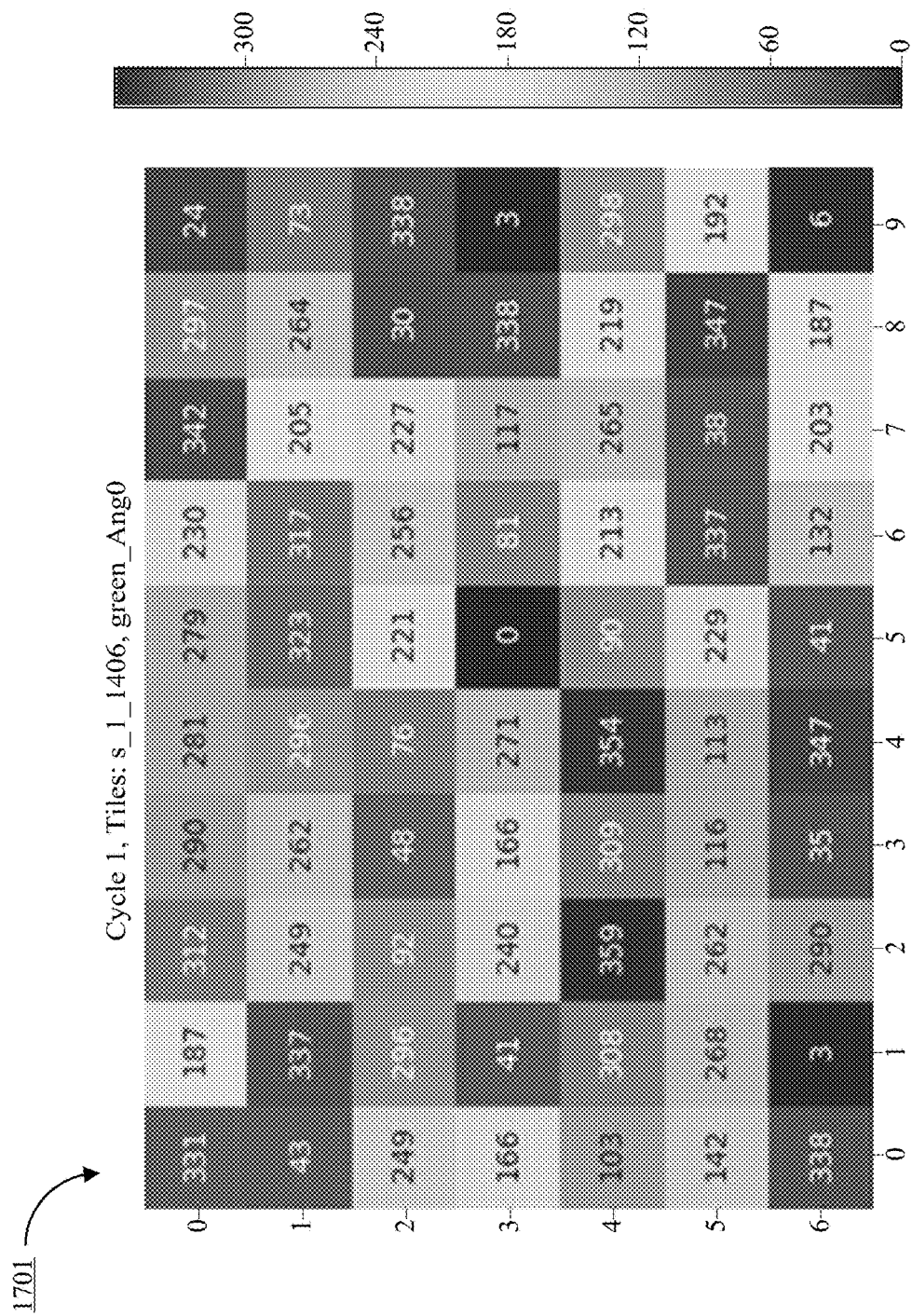
FIG. 17 is an example phase bias lookup table for subtiles in the full FOV image.

FIG. 17 presents an example phase bias lookup table 1701 with color coding of phase differences from a near-center subtile at 3, 5, which has a zero value. The lookup table 1701 contains the same number of cells as the number of subtiles in the full FOV image data, 7×9 in subtiles in this example. The position of the cell in the table 1701 can correspond to position of the subtile in the full FOV image data. The phase lookup table stores the differences in phase between each of the subtile relative to the center window (3, 5) estimated phase. The example table contains phase bias for one angle of the structured illumination. A similar phase bias table will be stored for each angle of the structured illumination pattern. The phase values are sensitive to cumulative errors in estimated values of other parameters (angle and spacing). Note that the phase values are wrapped from 0 degree to 360 degrees. The phase of the center subtile is shown as 0 degree in the example table. The color coding indicates the degree of differences in the phases of a subtiles corresponding to the center subtile. Estimating the phase bias requires fringe angle, spacing, phase of the center subtile or subwindow, and the distortion model (which we assume is not changing). In the following sections, we present example algorithms for estimating angle, spacing, and phase parameters.

In the above sections, we have described techniques for estimating parameters for subtiles in the full FOV image. In pseudocode that follows, we further illustrate estimating the angle, spacing, and phase parameters for subtiles. An example pseudocode for estimating angle and spacing parameters is presented below and is referred to as "subtile angle and spacing mapping" (also referred to as Algorithm 2A). We use a quadratic or cubic polynomial fit to estimate distortion coefficients for angle and spacing parameters for subtiles. An example pseudocode implementing the phase estimation technique is presented below and is referred to as "subtile phase mapping" algorithm (also referred to as Algorithm 2B). Estimates of the phase offsets can be stored in a phase bias look-up table for each angle or orientation of the illumination pattern. In one implementation, a separate lookup table can be used for each sequencing tile on the flowcell to account for minute differences in flowcell orientation, surface defects and other non-idealities that can skew the estimated results. The pseudocode for an example algorithm for final distortion calibration is presented last and is referred to as "final distortion calibration with quadratic fit and look up table" (also referred to as Algorithm 1 and Algorithm 2C).

Algorithm 1: Final Distortion Calibration with Quadratic Fit

In the first pseudocode, we can apply cropping to remove distortions near the edges of the image. This enables a good fit of the full FOV data to the quadratic surface models for angle and spacing estimations during calibration/characterization.

Input: Collection of Images, e.g. for 2 Angles and 3 Phases Per Angle
Output: Distortion Model Coefficients
Algorithm:
1. Build the following images/filters (sized to match the subregion)
   a. OTF
2. Divide the image into equally sized, but overlapping subregions, e.g. 512×512 using a sliding window method
3. Estimate parameters at the center of the image using, e.g. 512×512 window (see subtile angle and spacing mapping algorithm and subtile phase mapping algorithm below)

a. Estimate illumination peak angle and spacing for each angle
b. Estimate modulation for each angle
c. Estimate phase for each image
4. For each subregion
    a. Perform step 3 parameter estimation
    b. Save subtile center x,y coordinate, fringe angle (per angle), spacing (per angle) and phase 0 (per angle) of the wicker phase estimate into arrays (2d arrays)
5. For fringe spacing and angle
    a. Subtract the table value in step 4 by the center window estimated values from step 3.
    b. Perform optimal shrinkage estimation of the quadratic surface
        i. Fit a quadratic surface via least squares regression to the functional form $f(x,y)=a +b*x^2+c*y^2+d*xy+e*x+f*y$ for each array (call this Z, for example, fringe spacing from angle 0) in Step 4 (using the same input array X, and Y, which correspond to the subregion center x,y coordinates).
        ii. Evaluate the $R^2$ coefficient of determination from step i.
        iii. Shrink the X,Y, Z array (removing the outer edge elements), and repeat step (i) until N number of shrinks have been performed (N=3-5 and is a tunable parameter)
        iv. As the array is shrunk towards the center portion of the data, the fit quality is expected to improve, we select the coefficients at the elbow point (minimize shrink amounts while also maximizing $R^2$) where the model fit is sufficiently good (current criteria is defined as less than 5% relative improvement in $R^2$ value.
        Other acceptance criteria that could be used here include:
            The improvement to mean squared error of fit (the next iteration of mean squared error is smaller than the current iteration of mean squared error by some pre-defined threshold
            The improvement to the maximum fitted error of the quadratic surface (each successive iteration should reduce this error and increase the fit, if we detect that the successive improvements are plateauing
            Regularized measure of error, such as MAE (mean absolute error) instead of MSE (mean squared error), using similar improvement thresholding as the previous two criteria.
6. The optimal coefficients from step 5 are the output of the final distortion calibration algorithm.

Algorithm 2A: Subtile Angle and Spacing Mapping

Pseudocode for an implementation of illumination peak angle and spacing estimation for subtiles, used in steps 3-4 above and during operation, follows:

Input: Collection of images for the same angle such that the phases of each image evenly spread out from 0 to 360 degrees
Output:
    1. Location of peak in Fourier space (or Spacing and angle of grating)
    2. Modulation of the Fourier peak
    3. Phase offset of first image
Algorithm:
    1. Fast Fourier Transform of each image
    2. Perform band separation
    3. Take two component images:
        a. The 0 (wide field) and +1 (high-resolution part)
        b. Mask out all Fourier components of each image that do no overlap (also known as common region)
    c. Mask out low frequency components around DC and around estimated fringe peak
    d. Apply inverted OTF
    4. Repeat for finer and finer grid around start point
        a. For each point in a 10×10 grid evenly sampling some range
            i. Apply phase shift to one of the two images phases
            ii. Multiply the one image with the conjugate of the other
            iii. Sum the result
            iv. Normalize with respect to the sum of the wide field masked Fourier image
            v. Save the shift the provides the maximum of the absolute value of the normalized complex correlation
                1. The absolute value of this number is the modulation
                2. The angle of this complex number is the phase offset Algorithm 2B: Subtile Phase Mapping Pseudocode for an example implementation of phase shift estimation for subtiles follows. The technology disclosed can use most recent best estimates of spacing and angle parameter values for this mapping. The system can also obtain estimated spacing and angle parameter values using the distortion model and the center subwindow or subtile parameters.

Input:
    1. Collection of images for a single angle
    2. Illumination peak spacing and angle estimated from previously described algorithm
Output: Phase offset for each image in collection
Algorithm:
    1. Perform Fast Fourier Transform (FFT) of each image
    2. Create copy of FFT image
    3. Apply OTF to each image
    4. Shift one image
    5. Multiply both images using conjugate and sum absolute value of each complex number
    6. Phase is angle of resulting complex number Algorithm 2C: Phase Bias Lookup Learning For phase bias, the following steps are carried out for every tile on the flow-cell during the first cycle imaging of the sequencing run Input: Collection of images, e.g. for 2 angles and 3 phases per angle from each tile of the sequencing flowcell, a calibrated distortion model from Algorithm 1
Output: Phase bias lookup table
Algorithm:
    For each sequencing tile (not to be confused by SIM reconstruction subtile)
        i. Apply Step 3 of Algorithm 1 to estimate the center window SIM parameters (spacing, angle, the phases of each angle-channel pair) of the tile
        ii. Divide the image into subtiles, For each subtile:
            a. Apply distortion model via Algorithm 2A to obtain the subtile fringe spacing and angle for the subtile
            b. Perform wicker phase estimate on the first phase image of each channel-angle pair using the given fringe parameters from step a. on the local subtile
            c. Compute the difference between the phase obtained in Step iib and the center window phase 0 obtained from step i and save the phase bias into the corresponding 2d array for phase bias
        iii. Store the completed phase bias lookup table in memory with tile ID as the entry to be used later Repeat step 1. for every other sequencing tile encountered in the entire flowcell.

Note: For performance reasons, we estimate the phase bias lookup for each tile in first cycle of the sequencing run, however, the learning frequency can also be adjusted to learn on every N cycle if there are stability concerns.

In these pseudocodes, we presented techniques to estimate and map illumination peak angle, illumination peak spacing, and phase displacement parameters. The estimated parameters are used as input to structured illumination microscopy (SIM) image reconstruction. In the following section, we present a proposed SIM image reconstruction algorithm that can efficiently reconstruct high-resolution images of subtiles and then combine those subtile images to reconstruction the high-resolution image of the full FOV.

SIM Image Reconstruction

The SIM image reconstruction technology disclosed uses the angle, spacing, and phase estimations of the subtiles to reconstruct a high-resolution image. The technology disclosed can construct a full FOV high-resolution image in two steps. First, a high-resolution SIM image is reconstructed for a subtile using the subtile parameters. Second, the high-resolution images for the subtiles can be stitched together to construct the full FOV image. Alternatively, the high-resolution subtiles could be processed without stitching. This section begins with an example pseudocode for SIM image reconstruction of a subtile. This is referred to as "subtile reconstruction" algorithm. The technology disclosed exploits symmetries in the Fourier space by using the non-redundant data in the frequency domain. This reduces the computations required for some core operations nearly by one half. This section also presents an example pseudocode for combining the SIM images for subtiles to reconstruct the high-resolution image for the full image. This is referred to as "full field of view reconstruction" algorithm. Note that the parameter estimation techniques disclosed above can be used with traditional redundant or the disclosed non-redundant SIM image reconstruction techniques.

Algorithm 3: Subtile Reconstruction

Pseudocode for one implementation of reconstruct a high-resolution structured illumination microscopy image subtile follows.

Figure 18:
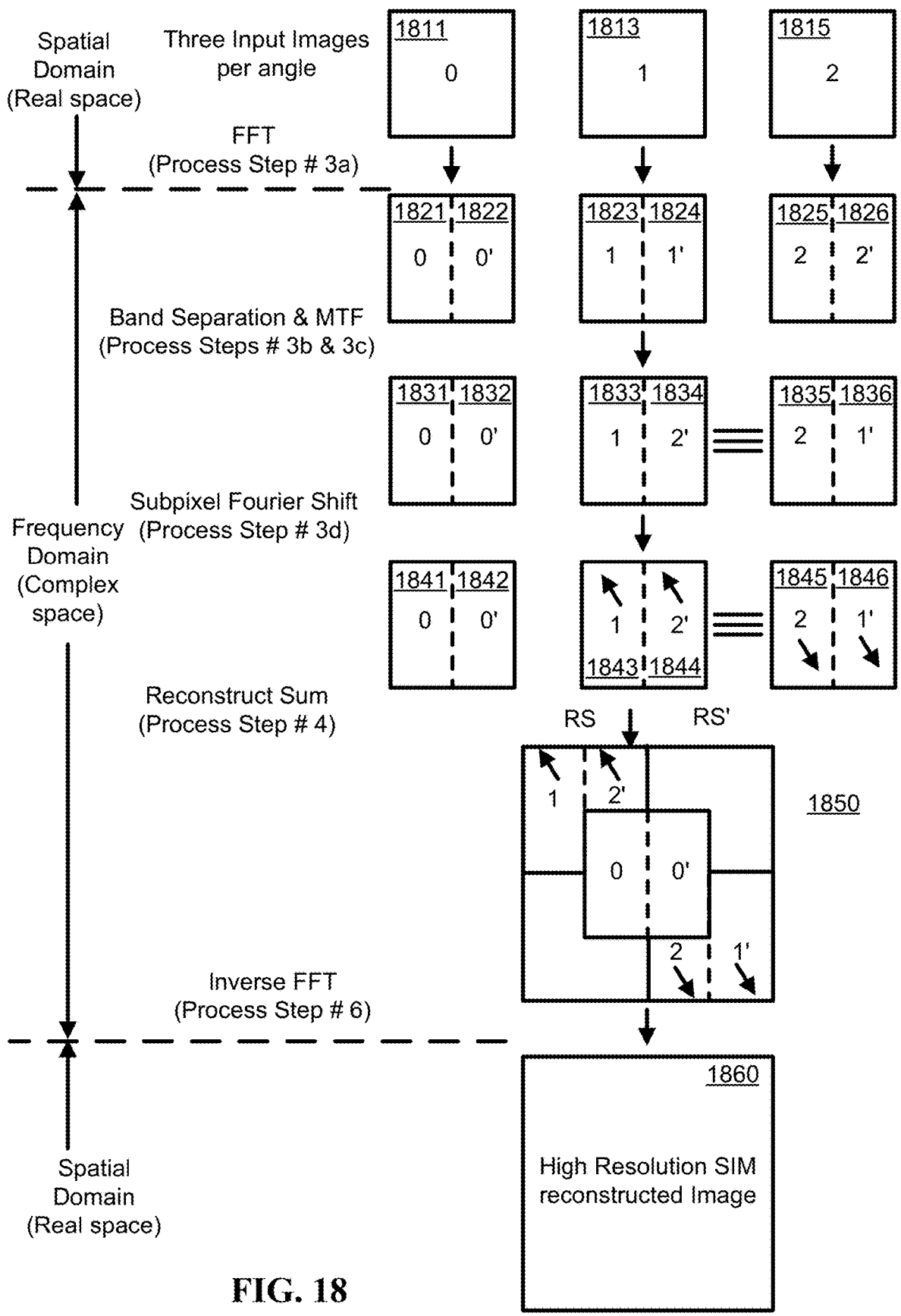
FIG. 18 is a high-level overview of process steps in the non-redundant subtile SIM image reconstruction algorithm.

Input:
  a. A collection of images of the sample with some grating profile ($I_{angle,phase}$). For each angle, we need at least 3 phase images, spaced out uniformly from 0 to 360 deg
  b. Parameters:
    i. Illumination peak spacing and angle for group of images corresponding to an angle
    ii. Phase for each image Output: One high-resolution reconstructed image for a subtile Algorithm:
1. Preprocess images (e.g. high pass filter)
2. Create a large Fourier image buffer (its size will depend on the final upsample factor required) and initialize to 0
3. For each angle
   a. For set of images each with a unique phase for the grating for given angle
     i. Perform a Fast Fourier Transform on each image
   b. Perform band separation on the collection of images (n>=3 input images→3 output or component images)
     i. Two of the three output images contain higher resolution information.
     ii. The left-over image has all the standard information (original resolution image)
     iii. Need to know phase for each image and modulation for entire set
   c. Apply MTF to each of the component images
   d. Shift each component image from band separation to their proper location in the larger Fourier image buffer and sum the components.
4. Build Wiener filter from input MTF by shift and summing a 2D MTF image into a large Fourier image
   a. We do this for each of the input images for each angle
   b. This does not have to be done for each reconstruction, it could be done once and provided as an input parameter
5. Apply Wiener and Apodization filters in Fourier space to the large Fourier representation of the reconstructed image
6. Perform an inverse Fast Fourier Transform on the large Fourier image buffer to get the high-resolution image More description of this non-redundant subtile reconstruction pseudocode is provided than for other pseudocode, because the technology disclosed cannot be explained by reference to prior art. The technology disclosed exploits symmetries in the Fourier space to increase efficiency in the SIM image reconstruction and decrease computing load. FIG. 18 presents a high level over view of our non-redundant subtile construction technology. Three images 1811, 1813, 1815 are acquired for each subtile per angle, preferably with uniformly spaced phases. We apply a discrete Fast Fourier Transform (FFT) to convert the image data from spatial domain (real space) to frequency domain (complex space). We exploit the FFT symmetry of the data representing the three images in the frequency domain. We improve the efficiency of reconstructing the high-resolution SIM image of the subtile by operating on the non-redundant portions of the image data in the frequency domain. The details of processing steps of the non-redundant subtile reconstruction algorithm are presented below.

Inputs 1-a. Collection of Images

The images of samples divided into subtiles are given as input to the subtile reconstruction algorithm. The images are divided into subtiles or subwindows or subregions of a predefined size e.g., 512×512 pixels. Subtiles of other sizes can be used.

Collection of image tiles extends prior technologies because so many tiles are needed to capture and image plane. In one implementation, image tiles are acquired with a diffraction grating that produces a sinusoidal illumination intensity pattern $I_{\theta,\phi}(r)$. The intensity varies according to location (x, y), represented by a vector r, which is a two-dimensional spatial position vector. For comparison, Lal et al. 2015 present a basic structured illumination microscopy reconstruction algorithm which is labeled as "Algorithm 1 SIM-RA". To explain the steps of our SIM image reconstruction algorithm we have used mathematical formulations from Lal et al. 2015. Note that the reconstruction algorithm presented by Lal et al. 2015 is applied to a full image, while our subtile reconstruction technology reconstructs a high-resolution SIM image subtiles.

A mathematical formulation for $I_{\theta,\phi}(r)$ is presented in Equation (1) of Lal et al. 2015. For each orientation of the sinusoidal illumination pattern θ, three SIM images of the specimen are acquired corresponding to three different illumination phases. In one embodiment, two sets of images are acquired using two angles of orientation of the sinusoidal illumination pattern i.e., $\theta_1=45°$, and $\theta_2=135°$ respectively.

The angle of orientation θ is also referred to as illumination peak angle β. In such an embodiment the nanowells can be positioned at the corners of a square or, more generally, a rectangle or quadrilateral. The angles of orientation are selected such that the images are taken along the lines connecting the opposing corners of the rectangle. This increases the apparent distance between nanowells.

In another implementation, three sets of images can be taken at three angles of orientation for example, $\theta_1=0°$, $\theta_2=60°$, $\theta_3=120°$ or $\theta_1=30°$, $\theta_2=90°$, $\theta_3=150°$. In this embodiment, the nanowells can be arranged at the opposing corners of a hexagon. The images are taken along the lines connecting the opposing ends of the hexagon geometry. In general, the sets of images can be selected to match the number of diagonals connecting opposing ends of the geometry in which the nanowells are arranged.

For each orientation θ, at least three images, spaced out from 0° to 360°, are acquired corresponding to three different illumination phases $\phi_1=0°$, $\phi_2=120°$, and $\phi_3=240°$. Uniform phase spacing is preferred. More images, such as five, six or seven, can be acquired by using a smaller phase step.

1-b (i) Structured Illumination Pattern Angle and Spacing Parameters

Illumination peak spacing 's' which defines the periodicity of the grating or the illumination of the sinusoidal intensity pattern $I_{\theta,\phi}(r)$ is also given as input. The illumination peak spacing 's' and illumination peak angle θ for subtiles are estimated using the "subtile angle and spacing mapping" algorithm presented above (also referred to as Algorithm 2A). The "final distortion calibration, with quadratic fit and lookup table" algorithm (also referred to as Algorithm 1) is applied to compensate errors in estimation of angle and spacing parameters for non-center subtiles due to optical sensing distortions. Example pseudocode for "subtile angle and spacing mapping" and "final distortion calibration, with quadratic fit and lookup table" algorithms are presented above.

1-b (ii) Phase Displacement Parameter

Phase displacement (also referred to as grating phase) 'ϕ' for the structured illumination intensity pattern $I_{\theta,\phi}(r)$ is also given as input. The phase values for the subtiles are estimated using "subtile phase mapping" algorithm (also referred to as Algorithm 2B). The "final distortion calibration, with quadratic fit and lookup table" algorithm (also referred to as Algorithm 1) is applied to compensate errors in estimation of phase parameter for non-center subtiles due to optical sensing distortions. The difference between phase of non-center subtiles and the center subtile per angle are stored in a lookup table. Example pseudocode for "subtile phase mapping" algorithm is presented above. With these inputs described, we turn to processing.

Processing Step 1: Preprocess Images (High Pass Filter)

Processing for subtile reconstruction can begin with image preprocessing. Pseudocode that generally corresponds to this description follows the explanation. The reconstruction of an enhanced image is performed in the Fourier space. But before applying Fourier transform to take the image data from spatial domain to frequency domain, we can apply a preprocessing step as described below to image tiles. The descriptions that follow are based on three images with different phase values along one angle. Two or more orientations will be used, as described above.

Acquired images can be preprocessed to remove noise. Noise has many sources. For example, exposure to intense excitation light can produce photobleaching that reduces the intensity of emission from the fluorophores. An illustration of noise in acquired SIM images is shown in FIG. 6 of Lal et al. 2015. The top left image FIG. 6, labeled (a), shows a raw SIM image with background fluorescence blur. This introduces large errors in the frequency content of raw SIM images in a small neighborhood around zero or DC frequency. A highpass filter, such as a Gaussian highpass or Butterworth highpass filter, can be used to preprocess the raw SIM images. The second image in FIG. 6, labeled as (b), shows a raw SIM image after background subtraction. The Fourier spectrum of both images (a) and (b) is the same as is shown. For detailed discussion on highpass filters the reader is referred chapter 4 of Gonzales and Woods 2008, "Digital Image Processing", $3^{rd}$ edition. In Chapter 4, Gonzales and Woods present an illustration in FIG. 4.52 that includes perspective plots, image representations and cross-sections of ideal, Butterworth and Gaussian highpass filters.

Processing Step 2: Create a Large Fourier Image Buffer

A buffer in memory can be reserved and initialized to receive the enhanced Fourier image. The size of the memory buffer depends on the upsample factor, the degree of enhancement. The SIM image reconstruction technique can theoretically produce an enhanced resolution along each angle or orientation of three images, that has up to 2 times the resolution of the acquired images along the orientation. For two or three sets of three images, we can reserve a buffer to store the high-resolution image with an upsample factor of 2.

Processing Step 3: Loop Steps 3-a to 3-d for Each Angle θ

Processing steps 3-a to 3-d are performed in a loop. In one iteration, the processing steps are performed for three images of a subtile acquired per angle. We now describe the details of the processing steps in the loop.

Step 3-a (Fast Fourier Transform):

A discrete fast Fourier transform (FFT) is applied to a set of images acquired with the same angle or orientation '0'. As described above, we acquire at least three images with different phases, along each orientation. Each image is transformed from the spatial domain to the frequency domain. For a N×N image, the order of complexity of calculating a 2-D discrete Fourier transform (DFT) is $O(N^4)$, which can be reduced to $O(N^3)$ by exploiting common subexpressions from row to row and column to column. A further speed up can be achieved if N is a power of 2. A Fast Fourier Transform (FFT) algorithm can achieve an order of complexity of $O(N^2 \log_2 N)$ for an N×N image when N is a power of 2. An example of exploiting common expressions in rows and columns is through the use of "butterfly computations". For details see Heckbert 1995, "Fourier Transforms and the Fast Fourier Transform (FFT) Algorithm" available at http://www.cs.cmu.edu/afs/andrew/scs/cs/15-463/2001/pub/www/notes/fourier/fourier.pdf. Thus, choice of a subtile size, such as 512×512 pixels, trades off frequency resolution against increased computation time. Subtiles with a side of 128, 256, 512, 1024, 2048, 4096 or in a range of 128 to 4096 pixels can be used.

Image data in the spatial domain is represented as real numbers. When we perform the Fourier transform, the resulting data in the frequency domain is represented as complex numbers. A complex number z can be represented as $z=x+iy$ where x and y are its real and imaginary parts. The conjugate of the complex number z is represented as $z^*=x-iy$.

Two example corner-shifted Fourier domain matrices are shown in FIG. 19, depicting matrices with even (1910) and odd (1920) values of N, to illustrate the symmetries in the Fourier space. These images in the frequency domain are represented by N×N matrices. The top row and left column of both matrices 1910 and 1920 are referred to as the DC row and DC column, corresponding to the zero or DC frequency components. In contrast to these corner-shifted matrices of values, plots in the frequency domain typically show the zero or DC frequency at the center of a circle.

The matrices in FIG. 19 exhibit symmetries in the Fourier or frequency domain. The DC row and DC column in matrices 1910 and 1920 have left-right and up-down conjugate symmetries. The matrix 1910, with an even number of rows and columns, has a middle column that also has up-down conjugate symmetry. Setting aside the top row and left column (1910, 1920) and, in the even matrix, the middle column (1910), the remaining portions of each matrix have 180-degree rotation conjugate symmetry. These portions of the two 1910 and 1920 are shown in bold lines and are sometimes referred to as a first block and a second block.

Dividing the full matrix in the frequency domain into two halves, after setting aside a row and column(s), produces a right half that, after 180-degree rotation, is the conjugate of the left half. FIG. 19 illustrates half matrices (1911, 1912) and (1921, 1922) for even and odd dimensioned matrices (1910, 1920). Values for the right half can be looked up from data for the left half. Taking this look-up into account, the left half matrix is the so-called non-redundant data and the right half matrix is the redundant data. The number of columns in the left half (slightly larger than a half) is ((N/2)+1) and the columns in the right half is (N−(N/2)−1). The technology disclosed keeps track of symmetries to reduce computing load.

When reconstructing the SIM images, we operate on the non-redundant left half of the full image matrices in Fourier space. This increases the efficiency as number of computations required is reduced considerably. In the following SIM reconstruction steps, we will present further details about how the symmetries in the Fourier space are exploited.

Step 3-b (Band Separation):

Shifted and unshifted frequency components are present in each captured image, because the positions of sources are randomly distributed relative to fringe peaks of illumination. This step separates shifted and unshifted frequency components in the frequency domain representation of the acquired images using a band separation matrix $M^{-1}$. The band separation matrix is also referred to as an inverse mixing matrix (Wicker et. al. 2013) or a reconstruction matrix (Lal et al. 2015). Gustafsson et. al. 2000 in their paper titled, "Doubling the lateral resolution of wide-field fluorescence microscopy using structured illumination" illustrate the band separation process in FIG. 5 of the paper. The figure illustrates separated frequency components from observed images. The band separation can be understood from equation (31) below, taken from Lal et al. 2015. The equation shows that the three components $\tilde{S}(k)\tilde{H}(k)$; $\tilde{S}(k-p_\theta)\tilde{H}(k)$; $\tilde{S}(k+p_\theta)\tilde{H}(k)$ are separated from the three observed images on the right side of the equation. The three images are acquired using an angle θ of the illumination pattern.

$$\begin{bmatrix} \tilde{S}(k)\tilde{H}(k) \\ \tilde{S}(k-p_\theta)\tilde{H}(k) \\ \tilde{S}(k+p_\theta)\tilde{H}(k) \end{bmatrix} = M^{-1} \begin{bmatrix} \tilde{D}_{\theta,\Phi_1}(k) \\ \tilde{D}_{\theta,\Phi_2}(k) \\ \tilde{D}_{\theta,\Phi_3}(k) \end{bmatrix} \quad (31)$$

The first component retrieved from equation (31) is the so-called DC component $\tilde{S}(k)\tilde{H}(k)$. This the component with unshifted spatial frequencies. When separated using precise phase and modulation parameters, this component does not include high frequency content beyond the Abbe diffraction limit. The second and the third components $\tilde{S}(k-p_\theta)\tilde{H}(k)$; $\tilde{S}(k+p_\theta)\tilde{H}(k)$ contain high frequency content shifted into the band pass region of the Abbe diffraction limit.

Figure 22:
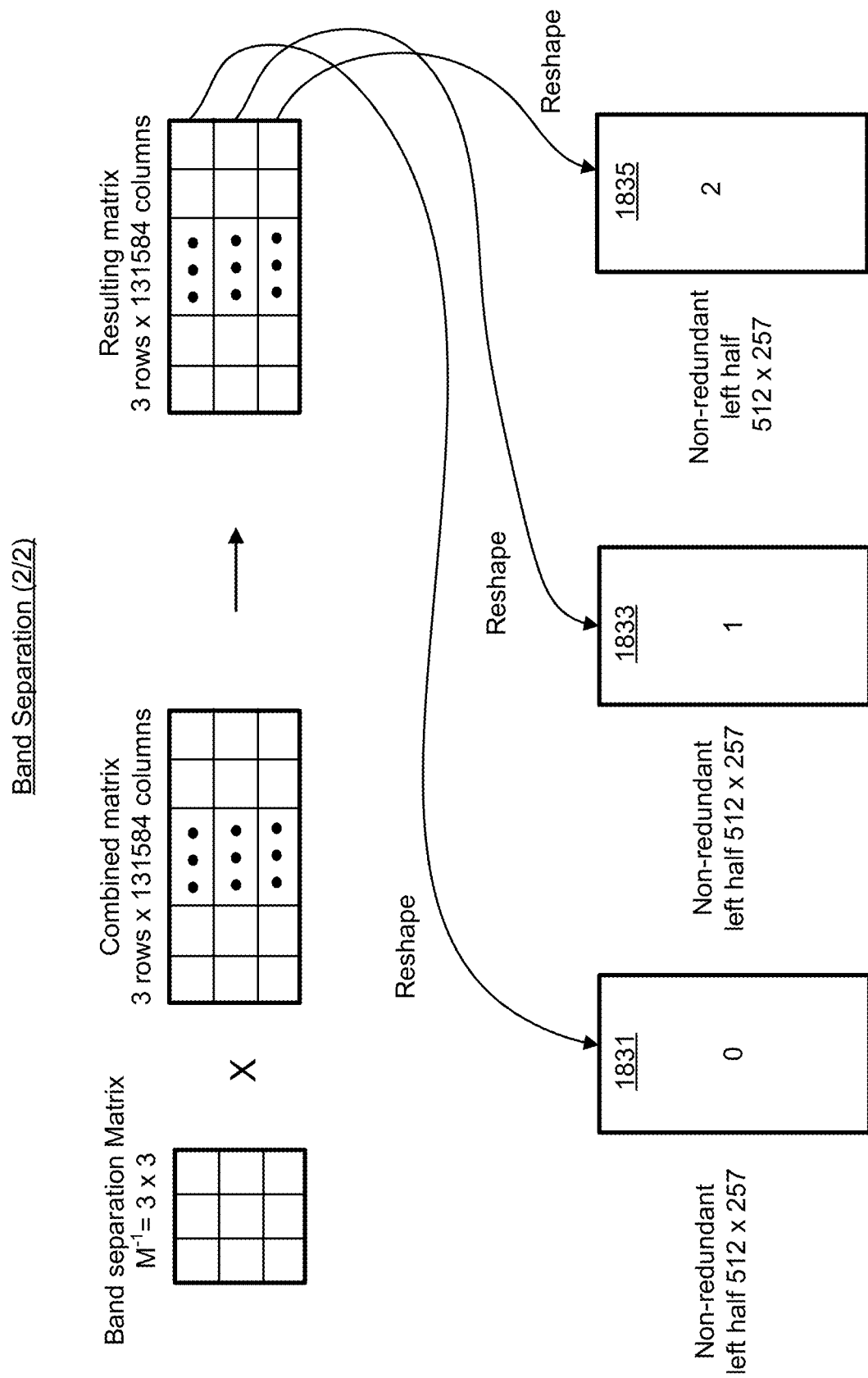
FIG. 22 illustrates band separation process by multiplication of the inverse band separation matrix with the reshaped matrix from FIG. 21.

The band separation step leverages the disclosed non-redundant SIM image reconstruction technology, as shown in FIGS. 20-22. Suppose the full matrix of each subtile's image in Fourier space has 512 rows and 512 columns as shown FIG. 20. We separate matrix positions in the three frequency domain matrices corresponding to the three images acquired at three phases for one angle into non-redundant and redundant halves as explained above. Each non-redundant half matrix has 512 rows and 257 columns, including two columns and one row of DC components and dominated by non-redundant coefficients that have complementary conjugate coefficients in the redundant half matrix. We reshape each non-redundant left half matrix into a vector and combine the three vectors for three half matrixes into a matrix having 3 rows and 131,584 columns, as shown in FIG. 21. We then multiple the inverse of the band separation matrix $M^{-1}$ with the combined matrix to get the resulting component separated matrix of the same size, also with 3 rows and 131,584 columns. The component separated matrix corresponds to the left side of the equation (31). We then reshape the three rows of the resulting matrix to obtain the non-redundant left halves of the matrices corresponding to three frequency components $\tilde{S}(k)\tilde{H}(k)$; $\tilde{S}(k-p_\theta)\tilde{H}(k)$; $\tilde{S}(k+p_\theta)\tilde{H}(k)$. The three non-redundant matrices are illustrated in FIG. 22 (and FIG. 18) as 1831, 1833, and 1835. In our case, the separated components are in the form of non-redundant left half matrices.

Now referring to FIG. 18, after process step 3-b, the full matrix for the so-called DC frequency component can be represented as a square matrix that combines the non-redundant half matrix 1831 (left half) and the redundant half matrix 1832 (right half), or it can be a rectangular matrix. The DC frequency matrix does not undergo the same shifting as the high frequency matrices, so the DC halves can be assembled earlier or later without computational penalty. For the two high frequency components, the symmetries are differently handled, to reduce the computation load.

Following process step 3-b, the full matrix of high frequency components is organized to combine parts from two bands, such as the non-redundant half matrix (1) 1843 from the first high frequency image and the redundant half matrix (2') 1844 from the second high frequency image. Equivalently, the non-redundant half matrix (2) 1845 from the second high frequency component and the redundant half matrix (1') 1846 from the first high frequency component can be combined.

While three full matrices are illustrated in FIG. 18 for DC and high frequency components, operations in steps 3b, 3c and 3d can be processed exploiting symmetries, processing the bands of frequency components by using half of the data.

A similar process can be applied to five images with 1D structured illumination with phase steps along an angle, separated into frequency components, or a larger number of images along an angle. A function other than sine or cosine varying illumination can be used. The technology disclosed also can be applied to sets of images created with 2D structured illumination.

Step 3-c (Apply Modulation Transfer Function):

Two alternatives for application of the modulation transfer function (MTF) and/or the optical transfer function (OTF) are described: a two-step application of an independent MTF, followed by Wiener filtering to reduce noise, and a one-step application of an MTF built into a Wiener filter. Both of these alternatives can take advantage of the disclosed non-redundant calculations technology.

In this two-step implementation, we multiply the (MTF), which is the amplitude or absolute value of the optical transfer function (OTF), with each of the three components $\tilde{S}(k)$ $\tilde{H}(k)$; $\tilde{S}(k-p_\theta)$ $\tilde{H}(k)$; $\tilde{S}(k+p_\theta)$ $\tilde{H}(k)$ obtained after step 3-b. Note that steps 3-b and 3-c are merged shown in FIG. 18, as application of the MTF does not impact symmetries in the matrices.

The modulation transfer function of a lens is a measurement of its ability to transfer contrast at a particular resolution from the object to the image. In other words, MTF is a way to incorporate resolution and contrast into a single specification. The resolution is an imaging system's ability to distinguish object detail. It can be expressed in terms of line-pairs per millimeter (lp/mm) where a line pair is a sequence of one black and one white line. This measure of line-pair per millimeter is also known as frequency. The inverse of the frequency yields the spacing in millimeters between the two resolved lines. Bar targets with a series of equally spaces, alternating white and black bars (also known as 1951 USAF target or a Ronchi ruling) are often used for testing system performance. As line spacing decreases (i.e., frequency increases on the target, it becomes increasingly difficult for the lens to efficiently transfer this decrease in contrast; as a result, the MTF decreases.

For further details of modulation transfer function, the reader is referred to an article titled, "Introduction to Modulation Transfer Function" available at https://www.edmundoptics.com/resources/application-notes/optics/introduction-to-modulation-transfer-function/. FIG. 5 in the above referenced article shows that as the spatial frequency of the lines increases, the contrast of the image decreases. For the image to appear defined, black must be truly black and white truly white, with a minimal amount of grayscale between. FIG. 6 of this article plots the MTF of an aberration-free image with a rectangular lens. The MTF decreases as the spatial resolution increases. It is important to note that actual systems are not completely aberration-free.

This step two-step application of the MTF and Wiener filtering can be replaced with the single step approach, which is presented at step 15 of SIM-RA Algorithm 1 of Lal et al. 2015. Again, step 3-c is the first part of an algorithm performs the Wiener filtering in two steps. Alternatively, this step can be performed after step 3-d without any impact on the quality of the SIM reconstructed image.

This two-step approach (i.e., applying MTF separately from the Wiener filtering) has been recommended in the SIM image reconstruction literature. For example, M. G. L. Gustafsson has recommended this two-step approach in his paper titled, "Surpassing the lateral resolution limit by factor of two using structured illumination microscopy," published in Journal of Microscopy, Vol. 198, Pt. 2, May 2000, pp-82-87. For SIM image reconstruction, this paper suggests multiplying each of the three frequency components by OTF of the microscope. Following this, the components are added where they overlap. Finally, the sum of the components is divided by the sum of the squares of the OTF and a small constant. The paper further states that this process is equivalent to one-step Wiener filtering.

Wiener filtering of three components in equations 32, 33 and 34 as shown below (taken from Lal et al. 2015):

$$\tilde{S}_u(k) = \left[\frac{\tilde{H}^*(k)}{|\tilde{H}(k)|^2 + \frac{\Psi_{o,\theta}}{\mathcal{A}^2|k|^{-2\alpha}}}\right]\tilde{S}(k)\tilde{H}(k) \quad (32)$$

$$\tilde{S}_u(k-p_\theta) = \frac{1}{m}\left[\frac{\tilde{H}^*(k)}{|\tilde{H}(k)|^2 + \frac{\Psi_{p,\theta}}{m^2\mathcal{A}^2|k-p_\theta|^{-2\alpha}}}\right]\tilde{S}(k-p_\theta)\tilde{H}(k) \quad (33)$$

$$\tilde{S}_u(k-p_\theta) = \frac{1}{m}\left[\frac{\tilde{H}^*(k)}{|\tilde{H}(k)|^2 + \frac{\Psi_{q,\theta}}{m^2\mathcal{A}^2|k+p_\theta|^{-2\alpha}}}\right]\tilde{S}(k+p_\theta)\tilde{H}(k) \quad (34)$$

The three frequency components $\tilde{S}u(k)$ $\tilde{H}(k)$; $\tilde{S}u(k-p_\theta)$ $\tilde{H}(k)$; $\tilde{S}u(k+p_\theta)$ $\tilde{H}(k)$ obtained on the left side of equations 32, 33, and 34 are referred to by Lal et al. 2015 as so-called ungraded estimates of the noisy estimates $\tilde{S}(k)$ $\tilde{H}(k)$; $\tilde{S}(k-p_\theta)$ $\tilde{H}(k)$; $\tilde{S}(k+p_\theta)$ $\tilde{H}(k)$; by applying Wiener filtering. The term ungraded appears to be borrowed from ungraded meshes of finite element analysis. SIM-RA Algorithm 1 of Lal et al. 2015 operates with the assumption that raw SIM images are corrupted by white noise. The expression in square bracket in equations 32, 33, and 34 is referred to as Wiener filter and m is the modulation factor.

The noisy estimates $\tilde{S}(k)$ $\tilde{H}(k)$; $\tilde{S}(k-p_\theta)$ $\tilde{H}(k)$; $\tilde{S}(k+p_\theta)$ $\tilde{H}(k)$ are referred to as degraded images by Gonzales and Woods in their book "Digital Image Processing" in section 5.7 on page 351. Gonzales and Woods refer to OTF $\tilde{H}(k)$ as a degradation function. In an ideal system with no noise, a simple "inverse filter" can be applied to retrieve the undegraded image. However, in most real systems noise is present in the acquired images. Therefore, the inverse filter cannot be used to recover undegraded components $\tilde{S}(k)$, $\tilde{S}(k-p_\theta)$, and $\tilde{S}(k+p_\theta)$. A Wiener filter recovers a graded image such that the mean squared error between the degraded image and the graded image is minimized. Therefore, Wiener filter is also referred to as "minimum mean square error" filter. Further details of the Wiener filter are presented in section 5.8 on page 352 of Gonzales and Woods, "Digital Image Processing".

The Wiener filtering or the two-step method of Gustafsson enables us to recover a close approximation of undegraded components which are referred to as ungraded estimates on the left sides of equations 32, 33, and 34 of Lal et al. 2015 as shown above.

Another important observation from equations 32, 33, and 34 of Lal et al. 2015 is that the numerators of the equations 32, 33, and 34 are conjugates of the OTF $\tilde{H}(k)$. If point spread function (PSF) H(r) of the optical system is real and symmetrical then it implies that OTF $\tilde{H}(k)$ is real. For real values, the OTF is equal to its conjugate, i.e., $\tilde{H}(k)=\tilde{H}^*(k)$. Further if the OTF is positive, the MTF (the absolute value of OTF) is equal to the OTF, i.e., $|\tilde{H}(k)|=\tilde{H}(k)$. From our previous observation, this further implies that $|\tilde{H}(k)|=\tilde{H}^*(k)$. This observation shows that MTF can be used as numerator in equation 32, 33, 34 (when OTF is real and positive) which means this process step 3-c is equivalent to multiplying the numerator of equations 32, 33, and 34 with the three degraded components $\tilde{S}(k)$ $\tilde{H}(k)$; $\tilde{S}(k-p_\theta)$ $\tilde{H}(k)$; $\tilde{S}(k+p_\theta)$ $\tilde{H}(k)$ respectively in the three equations 32, 33, and 34.

In the non-redundant SIM subtile reconstruction algorithm, we multiply the non-redundant matrices 1831, 1833, and 1835 obtained after the band separation step (step 3-b). This is an element-wise scalar multiplication and does not change the dimensions of the resulting non-redundant matrices. After this multiplication, we get the three non-redundant left half matrices 1831, 1833, and 1835 which are shown in FIG. 18. After applying the OTF, the symmetries in the three full matrices are maintained as explained in the band separation step.

First and Middle Column Averaging

We now present a computational feature that can improve the quality of reconstructed images using the non-redundant SIM image reconstruction algorithm. In FIG. 23B, we illustrate the Fourier space matrices of the two high frequency images. In the non-redundant algorithm, we use the left halves of the two matrices that are labeled as 1843 (left half block 1) and 1845 (left half block 2). These left halves are sometimes referred to as first blocks of complex coefficients. These two matrices are shown in the top row of FIG. 23B along with separated right half matrices 1846 (right block 1') and 1844 (right half block 2'). These right halves are sometimes referred to as second blocks of complex coefficients. The labelling of the left and right halves of the two matrices is consistent with FIG. 18 (fourth row from the top). The non-redundant algorithm uses the left or first halves of the two high frequency matrices during image reconstruction. Due to Fourier space symmetries the right or second half matrices can be reconstructed using look-up of the counterpart left half matrices. The second row of matrices in FIG. 23B shows stitching of left half matrix of one high frequency image to right half matrix of the second high frequency image during image reconstruction. These stitched matrices are also shown in $3^{rd}$ and $4^{th}$ rows of FIG. 18.

The left half matrices of the two high frequency images in this implementation have two more columns than their counterpart right half matrices. These two columns are first and middle columns which are shown with a hatched pattern in FIG. 23B. The first and middle columns of 1843 and 1845 represent DC components that would, with perfect instruments and measurement, match. As the instruments used for capturing images (at different phases) have imperfections and noise can also be introduced in this process, the two high frequency matrices can have different values in their first and middle columns. Reconstruction can be improved by forcing the first and middle columns of 1843 and 1845 to have the same values.

Figure 23C:
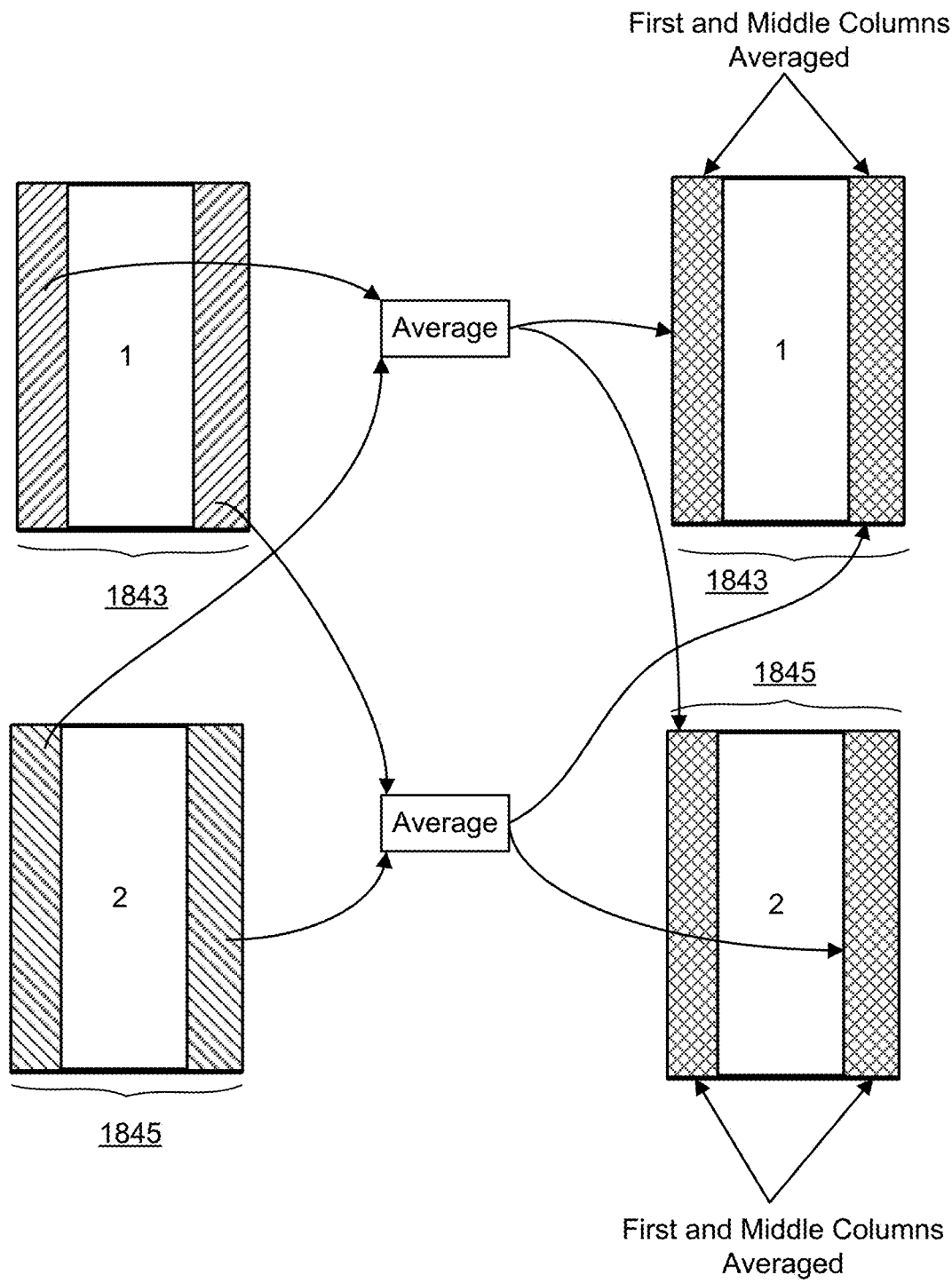

Averaging first and middle columns of the non-redundant components of matrices for two high frequency components is one way to match these columns in 1843 and 1845, to improve the quality of reconstructed image by introducing symmetry in the values of these columns. FIG. 23C illustrates averaging of the first and middle columns of left half matrices of the two high frequency images in Fourier space. The averaged values in the first and middle columns of the two matrices make the resulting matrices satisfy Fourier space symmetries. The first and last columns after averaging are shown with a cross-hatch pattern in FIG. 23C.

Other techniques can also be used to match values of these columns of 1843 and 1845. For example, we can use values in the first and middle columns of either the first or the second high frequency image and use these values in both matrices 1843 and 1845. Or a weighted combination of the values of the first and middle columns of the two high frequency images can also be used. For example, combining the values by assigning two-thirds weight to values of one high frequency image and one-third weight to values of the other high frequency image. It is understood that different relative weights can be assigned to combine the values of the corresponding columns.

Step 3-d (Subpixel Shifting):

In this step, each of the high frequency components $\tilde{S}(k-p_\theta) \tilde{H}(k)$; $\tilde{S}(k+p_\theta) \tilde{H}(k)$ is shifted to overcome quantization effects of a discrete fast Fourier transform. Because pixel positions in the Fourier space matrix correspond to discrete frequency bins, we refer this as subpixel shifting.

Explaining this, Karras et. al. 2019, in their paper "Successful optimization of reconstruction parameters in structured illumination microscopy—A practical guide", published in Optics Communications, have illustrated shifting of the higher frequency components into passband of the OTF when structured illumination pattern is used (see FIG. 1 of Karras et. al. 2019). During subpixel shifting, the true positions of the high frequency components are centered at frequencies $p_\theta$ and $p_\theta$ respectively in the frequency domain. This shifting is illustrated in equations 35 and 36 taken from Lal et. al. 2015.

$$\mathcal{F}[\mathcal{F}^{-1}\{\tilde{S}_u(k-p_\theta)\} \times e^{-i2\pi p_\theta \cdot r}] = \tilde{S}_s(k-p_\theta) \qquad (35)$$

$$\mathcal{F}[\mathcal{F}^{-1}\{\tilde{S}_u(k+p_\theta)\} \times e^{+i2\pi p_\theta \cdot r}] = \tilde{S}_s(k+p_\theta) \qquad (36)$$

In prior art SIM image reconstruction algorithms, such as SIM-RA Algorithm 1 presented in Lal et al. 2015, two Fourier transform operations are performed per high frequency images to shift the high frequency content to its correct position as shown in equations 35 and 36. The shift property of the Fourier Transform allows us to shift a signal. The shifting can be done by taking the information from frequency domain into spatial domain and then applying a multiplication (also referred to as applying a translation vector). Fourier transform is then applied to this shifted signal in spatial domain to bring it back to frequency domain. More information regarding shift property of Fourier Transforms can be found on http://www.thefouriertransform.com/transform/properties.php. The shifting of the high frequency content is actually performed in the real space by performing an inverse Fourier transform on the ungraded images so as not to constrain the translation vector to whole pixels in the discrete Fourier transforms. Thus, we can achieve sub-pixel shifting in the real space. The shifted high frequency components are then transformed to frequency domain by applying Fourier transform.

We improve the efficiency of SIM image reconstruction and decrease the required computational resources by using symmetries in the Fourier space. The so-called DC frequency component does not need to be subpixel shifted as it is in a reference location, as illustrated by FIG. 18. The high frequency component matrices are shifted relative to the DC frequency component matrix.

In the disclosed non-redundant algorithm, we shift only one matrix of high frequency components, after combining nonredundant halves of the complementary phase shifted matrices of high-frequency components, shown in FIG. 18. The combined halves of high frequency components are shown as the left half 1833 and the right half 1834 or labeled 1|2' matrix shown in middle column of the third row of FIG. 18. This matrix is shifted from the Fourier domain to the spatial domain and back again, instead of two matrices in prior art SIM image reconstruction algorithms. The shifted matrix 1|2' is shown in the middle column of fourth row in FIG. 18 with two arrows pointing diagonally upwards towards top left corners. This matrix is composed of the left half matrix 1843 and right half matrix 1844. The second shifted high frequency matrix which is composed of left half matrix 1845 and 1846 or labeled as 2|1' is obtained using Fourier space symmetries and conjugation of the 1|2' matrix. We shift it the same amount as shifting in 1|2' but in opposite direction which is indicated by two arrows pointing diagonally towards bottom right corner.

The processes steps 3a to 3d are repeated in a loop across illumination peak angles. In this example, we are using two angles or orientations, so we perform the above steps for the second set of three images acquired with a second orientation of the structured illumination pattern.

Processing Step 4: Reconstruct Sum and Build Wiener Filter

The Wiener filter can be built once and then applied repeatedly to filter images even if the parameters change. The supplementary material for Karras et. al. 2019 paper, titled, "Successful optimization of reconstruction parameters in structured illumination microscopy—A practical guide," published in Optics Communications, illustrates tuning of the Wiener filter parameter (w), which is the constant part of the denominator in equations 32, 33, and 34. FIG. 51 of this supplementary material for Karras et. al. 2019 illustrates impacts of different values of the Wiener filter parameter (w) on retrieved image spectra. A low value of the Wiener filter parameter can result in noise in the retrieved spectra. Too high a value can result in loss of image data. The parameter value for a Wiener filter can be empirically chosen, as discussed in Lal et al. 2015 and Karras et. al. 2019 supplementary materials. Other type of Fourier space low pass filters can alternatively, be used to reduce noise. For example, Gaussian low pass filter, Butterworth low pass filter or Hamming low pass filter. Details of these filters are available on http://fourier.eng.hmc.edu/e101/lectures/Fourier_Analysis/node10.html.

Only parts of the matrices that include high-frequency components overlap with the so-called DC frequency matrix. The expanded matrix in which coefficients from the multiple Fourier domain frequency matrices are combined is wider and taller from the individual matrices before combination by an upsample factor, which reflects the image resolution enhancement. The upsample factor can be between 1.0 to 2.0 of the width and height of the individual matrices. When the upsample factor is 1.0, there is no image resolution enhancement. There are no high frequency components and images taken at all phases along an orientation overlap with each other. When the upsample factor is 2.0, the shifted matrices of high frequency components are separated from each other such that their edges (or borders) touch at the center of the unshifted matrix. This means that the width and height of the high-resolution reconstructed image is increased two times that of individual image matrices. This combined matrix is illustrated as a large matrix 1850 in FIG. 18. The matrix 1850 is illustrated twice as wider and taller than the individual matrices labeled 1|2' and 2|1' to show that the reconstructed image is enhanced. When the upsample factor for image resolution enhancement is greater than 1.0 and less than 2.0, the shifted matrices 1|2' and 2|1' are positioned closer and overlap each other at the center of the large matrix 1850.

In FIG. 18, we illustrate constructing matrix 1850 from matrices for three images at the first angle. The non-redundant half for the DC component for first angle is shown as 1841 in FIG. 18. We then place the subpixel shifted coefficients for one high frequency image on the top left part of the matrix 1850 and for the other high frequency image in the bottom right part. Redundant conjugate components needed to complete 1850 can be looked up in the complementary non-redundant components, keeping track of matrix positions of complementary components (coefficients), and applying a changed sign to the any imaginary part of copied coefficients.

Adding a second, orthogonal angle and three more images (which are not shown) would fill out the square. We place the full matrix for one high frequency component for the second angle at the bottom left part of the matrix 1850 and for the second high frequency component at the top right part.

Combining nine images is illustrated in Lal et al. 2015. Coefficients at overlapping matrix positions are combined in matrix 1850. This is the six-image variation, for two angles instead of three.

Visualization of combining matrices is clearest when the coefficients are depicted as center shifted, with the mid-value of the frequency range in the center of the matrix, but calculations may actually be performed using corner shifted matrices, with the lowest frequency component in a top left or bottom right corner, for instance. The reconstruction of enhanced resolution image matrix 1850 is illustrated in FIG. 18 by placing low frequency components at the center and high frequency components away from the center. This arrangement of frequency content is referred to as center shifted spectrum. Application of Fast Fourier Transform (FFT) to image data in spatial domain results in corner shifted spectrum in which amplitudes of low frequency components end up at the corners of the two-dimensional spectrum in Fourier space (or frequency domain). High frequency components are positioned closer to the center of the two-dimensional spectrum. For ease of understanding, it is useful to visualize the frequency content in frequency domain as center shifted spectrum in which low frequency components are positioned close to the center and high frequency components are positioned away from the center. Symmetries of quadrants in corner shifted spectrum allow swapping of the quadrants diagonally to move the low frequency components closer to the center. Therefore, corner shifted spectrum can be converted to center shifted spectrum in a straightforward manner and vice versa. The conjugated symmetries and redundant regions hold in both corner shifted and center shifted spectrum. The center shifted spectrum in FIG. 18 is presented for ease of understanding of the reader.

A Wiener filter can be built for the combined image using the one step (Lal et al. 2015) or the two step (Gustafsson 2000) techniques presented above for the band separated images in Step 3-c. For example, in one implementation, the Wiener filter can be built using an MTF (modulation transfer function) which is the amplitude or absolute value of the OTF (optical transfer function). In this implementation, we perform the reconstruction process to computationally simulate the overlapping frequency information in the Wiener filter. We apply the Wiener filter weights for band separated images to the OTF of the combined image to build the Wiener filter for the combined image. The Wiener filter is applied to the combined image in the next step.

Processing Step 5: Apply Wiener Filter and Apodization Filters

In this step, we apply the Wiener filter or an alternative filter built in the previous step to the combined image in the Fourier space. In the step 3-c, we separated Wiener filtering into two steps by applying an independent MTF. See equations 32, 33, and 34 in the step 3-c. As a two-step filtering process, this step involves applying remaining parts of the Wiener filter (presented in equations 32, 33, and 34) to the combined image in the Fourier space. In an alternative embodiment, we can apply the Wiener filter to Fourier space representations of the three frequency components per angle before combining them to form the combined image. When applied early, we can apply the Wiener filter to only the non-redundant halves of the matrices for band separated frequency components.

The application of Wiener filter enhances the signal, but it can also increase the noise in the images. An appropriately designed apodization filter can avoid hard edges introduced in the images introduced due to high frequency content.

Apodization filter is a low pass filter that removes frequency content outside a pre-defined radius in Fourier space. Apodization filter reduces errors introduced by the Wiener filter. Other low pass filters such as real space Hamming low pass filter or Gaussian low pass filter can also be applied to reduce errors introduced by Wiener filter. Note that Apodization filter is optional and not used by some SIM reconstruction algorithms such as in SIM-RA Algorithm 1 of Lal et al. 2015. The apodization filter can, alternatively, be applied to just the non-redundant halves of the matrices for three frequency components earlier in the pipeline.

Processing Step 6: Perform an Inverse FFT

In this step we apply the inverse Fourier transform to matrix 1850 for the full image in the frequency domain. Application of an inverse fast Fourier transform (IFFT) transforms the matrix components in the Fourier domain into an image in the spatial domain (in real space). This resulting matrix 1860 is the high-resolution SIM reconstructed image. When subtiles are used, it is part of a larger tile.

SIM Image Reconstruction for Full FOV Image

Subtiles of high-resolution SIM images can be combined to reconstruct the high-resolution image of the full FOV. Pseudocode for one implementation of the technology disclosed, to reconstruct a high-resolution full field of view image from multiple subtile images, is presented below. The algorithm presented below is referred to as "full field of view reconstruction" algorithm (also referred to as Algorithm 4). It extends algorithm 3 for subtile reconstruction. It takes as input the images acquired and the distortion coefficients for estimation parameters. Estimation of the distortion coefficients for angle and spacing parameters (input 2), and phase bias look up table (input 3) is presented above. The algorithm divides the full FOV images into subtiles of equally sized regions. SIM images are reconstructed for subtiles as presented in algorithm 3 above. Finally, the high-resolution SIM images of subtiles are combined to reconstruct the high-resolution SIM image of the full FOV data (algorithm step 4b).

Algorithm 4: Full Field of View Reconstruction

Input:
1. Collection of images, e.g. for 2 angles and 3 phases per angle
2. Distortion coefficients for angle/spacing (see final distortion calibration with quadratic fit and lookup table algorithm)
3. Distortion lookup table for phase (see final distortion calibration with quadratic fit and lookup table algorithm)
4. Wiener filter and apodization parameters Output: Reconstructed output Algorithm
1. Build the following images/filters (sized to match the subregion)
   a. OTF
   b. Wiener
   c. Apodization
2. Divide the image into equally sized subregions, e.g. 512×512
   a. If the image is not evenly divisible by the subregion size, at the right edge or bottom, shift the subregion to the left (or up) such that it falls on image.
   b. Setup book keeping for boundary subregions to ensure only the non-overlapping part is copied out for the right or bottom edge subregion
3. Estimate parameters at the center of the image using, e.g. 512×512 window (see subtile angle and spacing mapping algorithm and subtile phase mapping algorithm)
   a. Estimate illumination peak angle and spacing for each angle
   b. Estimate modulation for each angle
   c. Estimate phase for each image
4. For each subregion
   a. Reconstruct the higher resolution subregion using subtle reconstruction algorithm
      i. Using grating and angle found in step 3, and the given distortion coefficients to estimate the local grating and angle
      ii. Using the phase found in step 3 and the given distortion lookup table to estimate the proper phase
      iii. Given the previously built OTF, Wiener and apodization for the subregion
   b. Copy output from (a) to large image
      i. If a boundary subregion, only copy the missing data In the context of previous descriptions, this pseudo code should be self-explanatory.

Potential Improvements to SIM Image Reconstruction Algorithm

We present potential improvements to the SIM image reconstruction algorithm (SIM) disclosed in the U.S. Provisional Patent Application No. 62/924,130, entitled, "SYSTEMS AND METHODS FOR STRUCTURED ILLUMINATION MICROSCOPY"; and the U.S. Provisional Patent Application No. 62/924,138, entitled, "INCREASED CALCULATION EFFICIENCY FOR STRUCTURED ILLUMINATION MICROSCOPY". Both provisional applications were filed on Oct. 21, 2019.

The first potential improvement is related to phase bias look-up table. The Baseline SIM algorithm uses static phase bias look-up table. The assumption in Baseline model is that phase bias and distortion can be learned once and stored in the look-up table. The values in the look-up table are assumed to be stable and applicable to multiple sequencing runs. The Baseline SIM algorithm assumes that phase bias look-up table (LUT) remains stable in the spatial domain. This means that the same look-up table can be applied across tiles of a flowcell. Our second assumption in Baseline algorithm is that the LUT remains stable across multiple sequencing runs. Experiments showed that these assumptions may not be true for all flowcells and sequencing runs. Tiles in a flowcell can have different tilts or other distortions. The values in look-up table can impacted by various environmental factors that change over multiple sequencing runs.

The "All In" SIM algorithm, therefore, includes learning the phase bias look-up table for every sequencing run per tile, when a new flowcell is loaded into the sequencer and a sequencing run is initiated. This can increase the processing time required in the first cycle of a sequencing run. However, substantial improvement in error rate and percentage of clusters that pass the filter (or % PF) metrics is observed as illustrated in the following paragraphs.

The second potential improvement is related to geometric distortion, which causes parallel lines to bow or otherwise distort. The geometric distortion can be cause distortions in the imaging or optical path and in the flow cell. In some cases, all or some tiles in a flowcell can have tilts and may not be flat. This can cause geometric distortion. Characterizing all tiles in a flowcell is preferred because there can be variations in a flowcell from tile to tile. Early version of corrections assumed that the geometric distortion can be learned once and used across multiple sequencing runs. Experiments showed that this assumption may not be true for all sequencing runs. The "All In" algorithm, therefore, includes learning the geometric distortion for every tile in a flowcell in a first cycle of a sequencing run.

The third potential improvement is related to stitching of subtile images to form the full field of view (FOV) image. In the Baseline SIM algorithm, when inverse Fast Fourier transform (IFFT) is applied to subtiles in frequency domain, the edges of the subtiles are apparent in the spatial domain. Therefore, the stitched subtiles in the full field of view show stitch line at the edges of subtiles. The stitch line issue causes dark artifacts to appear along the boundary of subtiles. The All-In SIM algorithm solves the stitch line issue by using an overlap between the subtiles. For example, the subtiles can have an overlap of 5 to 15 pixels. In one implementation, the subtiles have an overlap of 8 pixels along the boundary. When reconstructing the full field of view (FOV) image, the "All-In" algorithm can discard the outer 8 pixels for subtiles and use the inner region to reconstruct the full FOV image in the spatial domain. In this implementation, the size of subtile can be larger than 512× 512 pixels by adding border pixels (e.g., 8 pixels) on each side. In another implementation, the border pixels of subtiles can be averaged instead of discarding the border pixels.

The fourth potential improvement is related to optimization of Apodization and Weiner filters. The filter parameters depend on upsampling. The Baseline SIM algorithm uses 1.2 times upsampling which can shave off a partial pixel. When the subtile images are stitched together in spatial domain, this can cause shifting of images and alignment issues. The shave off of a pixel is due to upsampling factor (i.e., 1.2) that produces non-integer number of pixels. The All-In SIM algorithm uses 1.5 times upsampling to overcome the partial pixel shave off issue by using an upsampling factor that produces an integer number of pixels. Thus, providing a cleaner subtile images for stitching together. In other implementations, other upsampling factor values such as 1.25 times upsampling can be used which can also produce an integer number of pixels.

In some implementations, the technology disclosed can use dose ramping to compensate for damage to nucleotides caused by exposure cycles in the sequencing run. In dose ramping the laser power of blue and green channel lasers is increased.

Performance Comparison Results

We compared performance of Baseline SIM algorithm with All-In SIM algorithm. The two algorithms are compared using the quality of sequencing results as indicated by error rate and percentage of clusters passing filter (% PF). The error rate metric measures the percentage of basecalls made that were erroneous when compared against a known reference genome in the sequencing process. Clusters passing filter or % PF metric is an indication of signal quality from each cluster of molecules on the flowcell. Lower error rate and higher % PF values are desired as they indicate good sequencing output with high quality basecalls. Out of more than a hundred tiles on a flow cell, we selected results for best tile per sequencing run to compare the algorithms. Tiles in a flowcell can have variability in terms of flatness, tilt, surface polishing and other environmental factors. The reason for selecting the best tile for comparison out of over 100 tiles is to reduce variability caused by these other external factors through statistical aggregation.

Figure 25A:
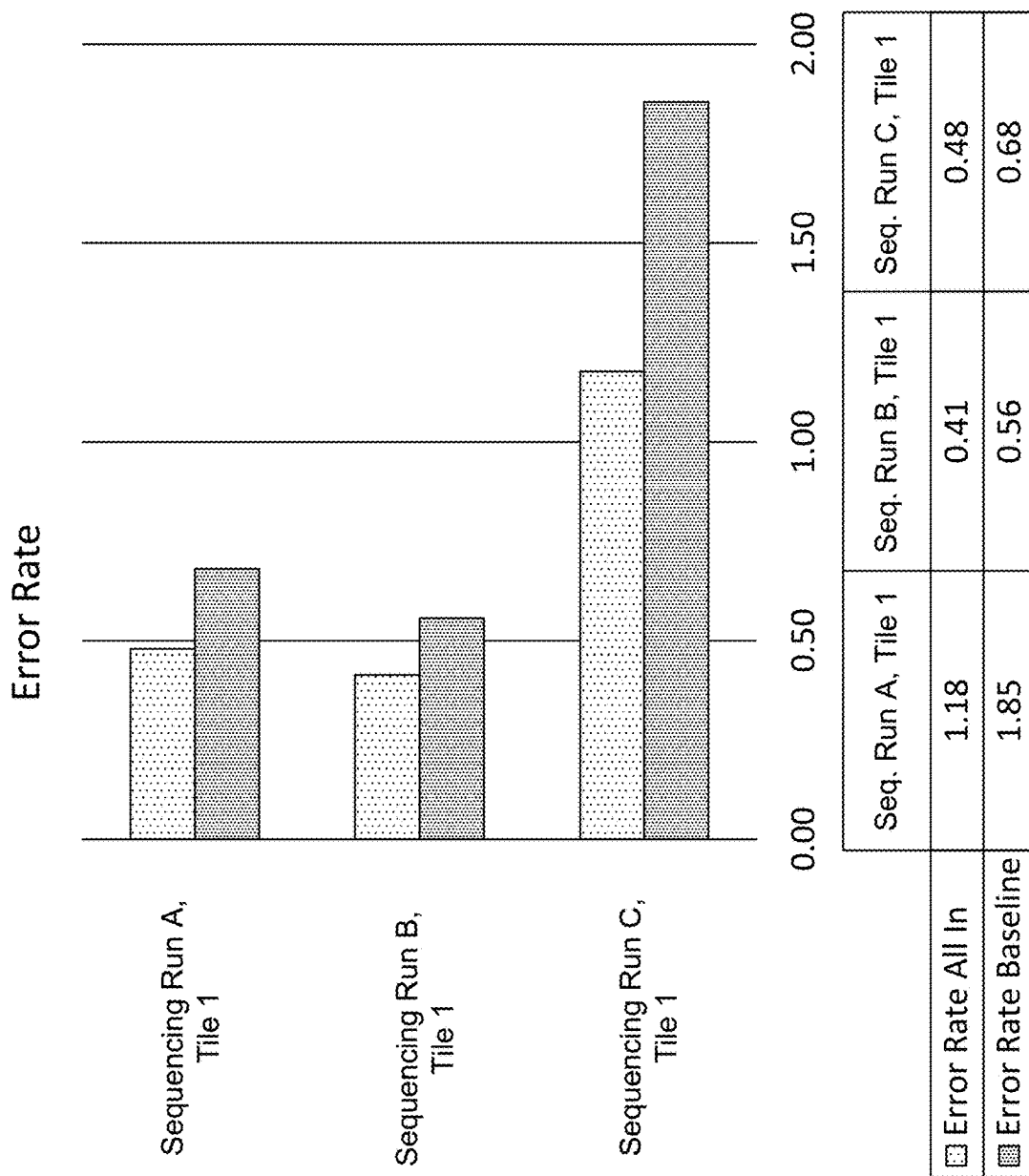
FIGS. 25A and 25B present improvements in error rate and percentage of clusters passing filter (% PF) metrics with updates in SIM image reconstruction algorithm.

FIG. 25A presents error rates for the Baseline and the All-In algorithms for three sequencing runs, labeled as A, B and C. For each sequencing run, the error rate for the best tile is presented for the two algorithms. The top bar indicates error rate for best tile in All-In algorithm and bottom bar indicates error rate for best tile in Baseline algorithm for respective sequencing runs. The table at the bottom of the graph tabulates quantitative improvements in error rate of the best tile when the All-In algorithm is used. For example, the best tile error rate for sequencing run A is 1.85% when Baseline algorithm is used. The best tile error rate for the sequencing run A is 1.18% when All-In algorithm is used, indicating a higher quality sequencing process with less error rate. Similar improvements in lowering the error rate are observed for sequencing run B and C when using the All-In algorithm.

Figure 25B:
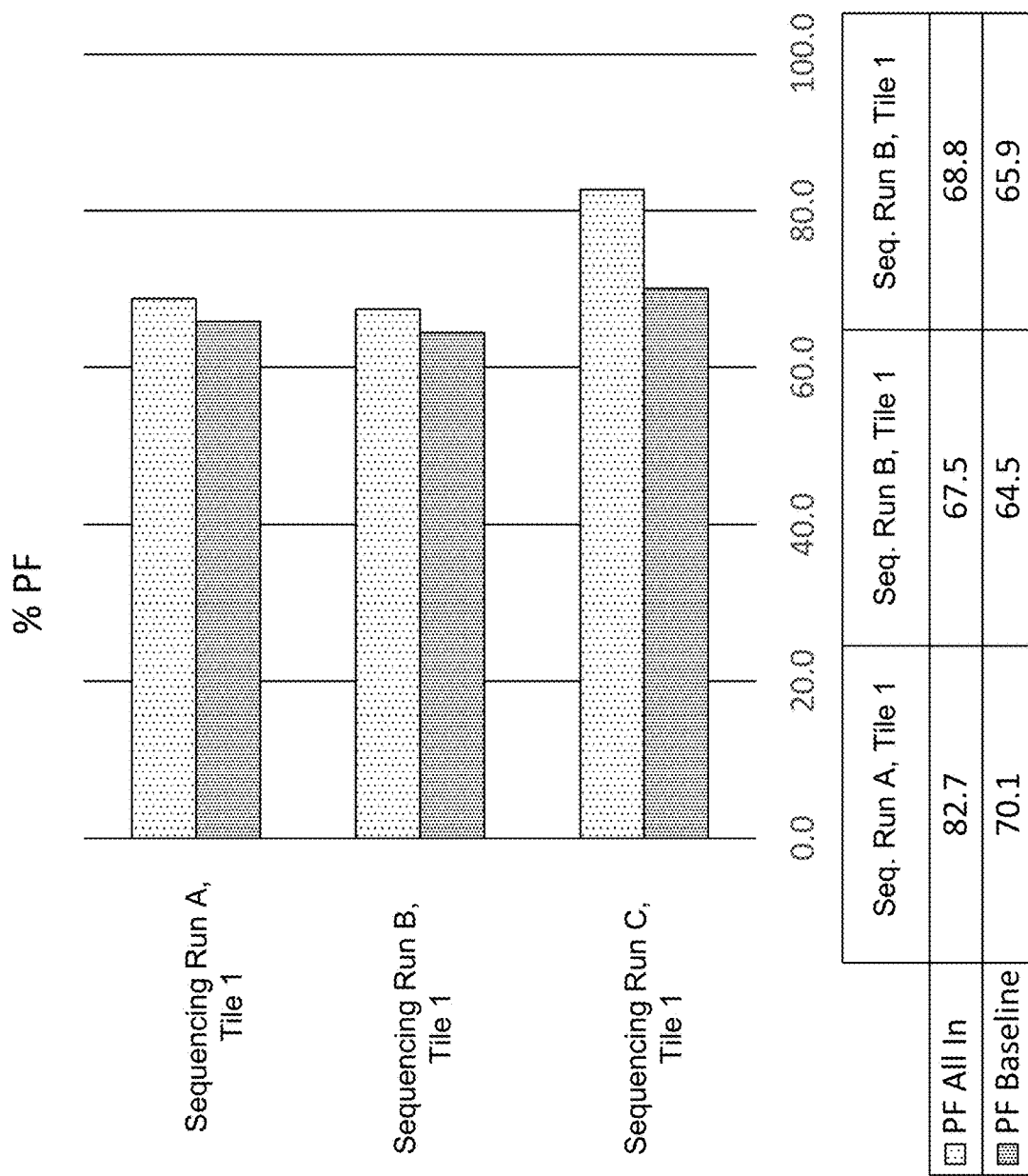

FIG. 25B presents clusters passing filter (or % PF) results for best tile in three sequencing runs for the two algorithms. The bottom table presents % PF values for best tile in respective sequencing runs for two algorithms. The All-In algorithm results in higher % PF values for all sequencing runs. Specifically, the % PF value for best tile in sequencing run A is 82.7 indicating that 82.7% of clusters on the flowcell tile are deemed good quality clusters to generate basecall information for. The % PF value for best tile in sequencing run is only 70.1. A higher % PF value results in more clusters passing the filter thus increasing the sequencing throughput. The patterned flow cells can have a theoretical maximum limit on the number of clusters which is equal to the number of nanowells in which clusters of molecules can form. Results in FIGS. 25A and 25B show that All-In algorithm results in lower error rates and higher throughputs (due to higher % PF values) as compared to the Baseline algorithm.

Figure 26A:
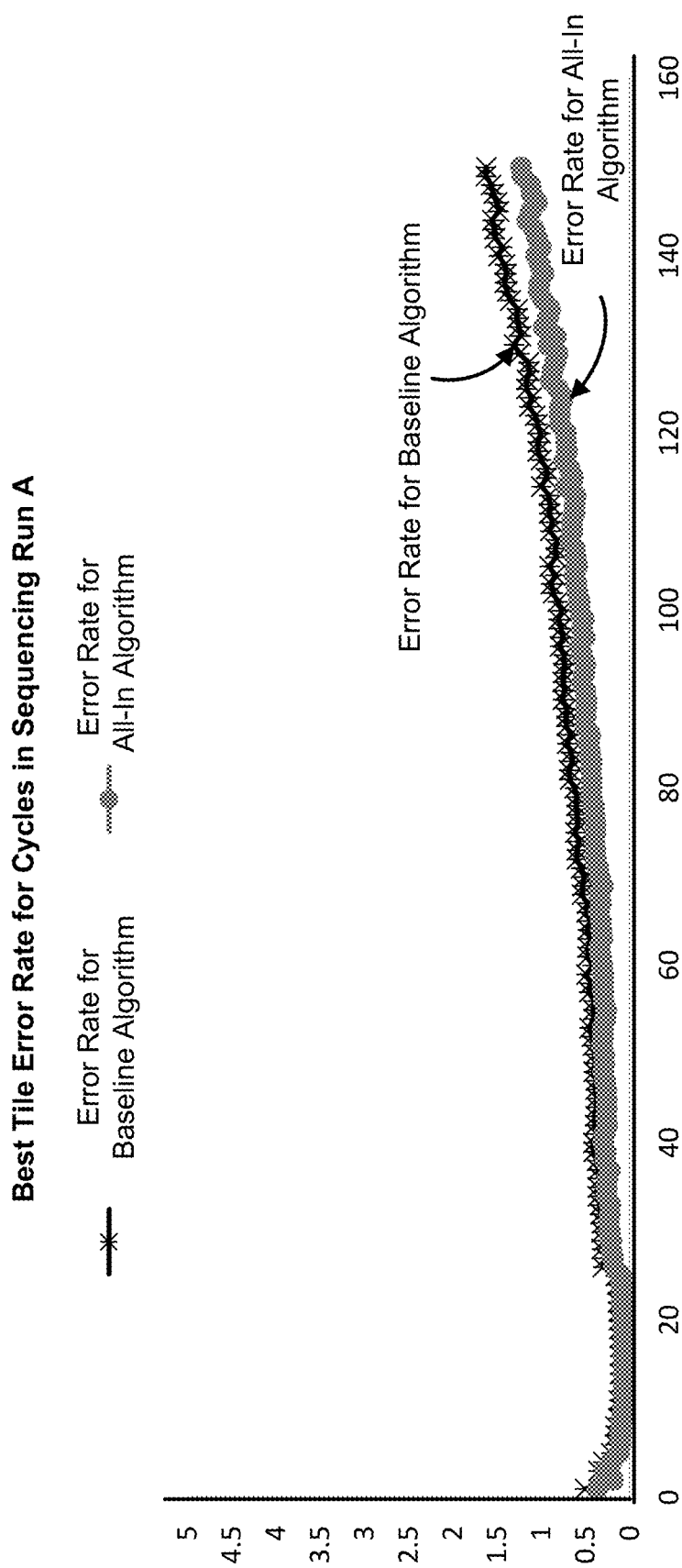
FIGS. 26A to 26C present graphical illustrations of improvements in error rate over multiple cycles in sequencing runs.
Figure 26B:
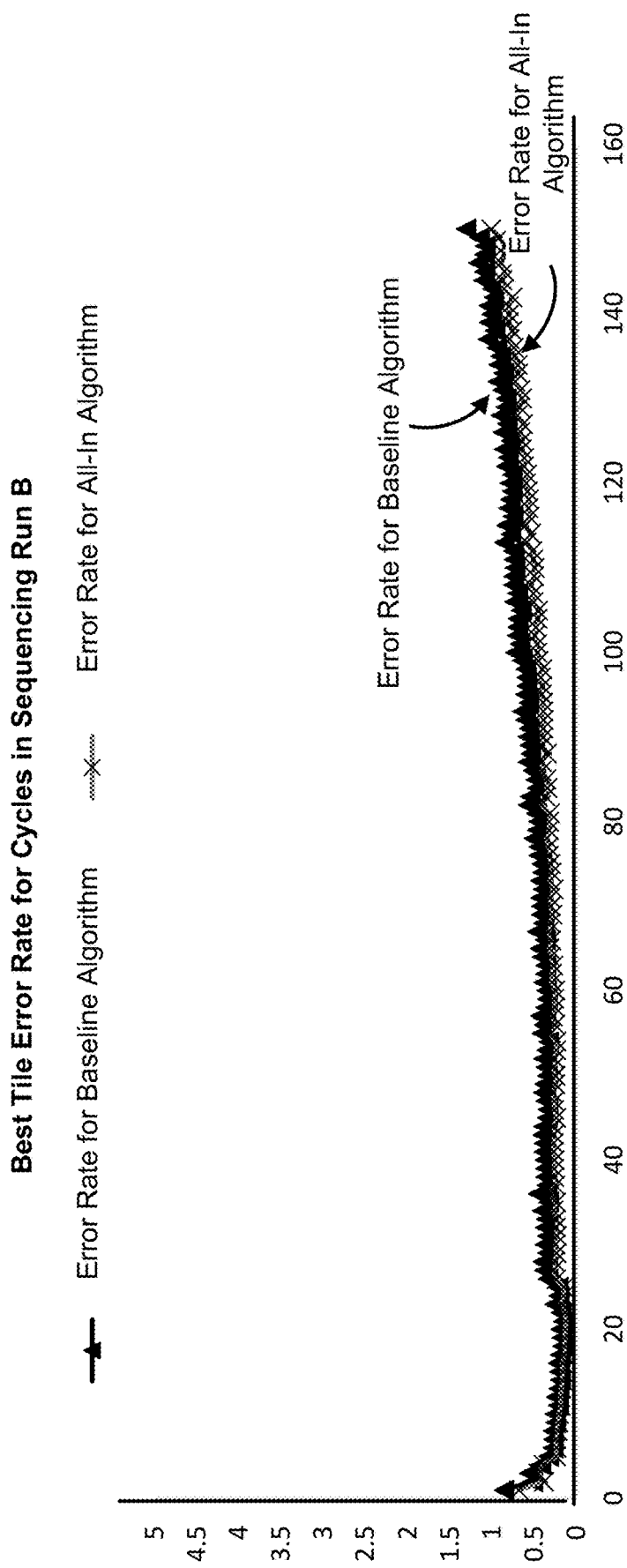
Figure 26C:
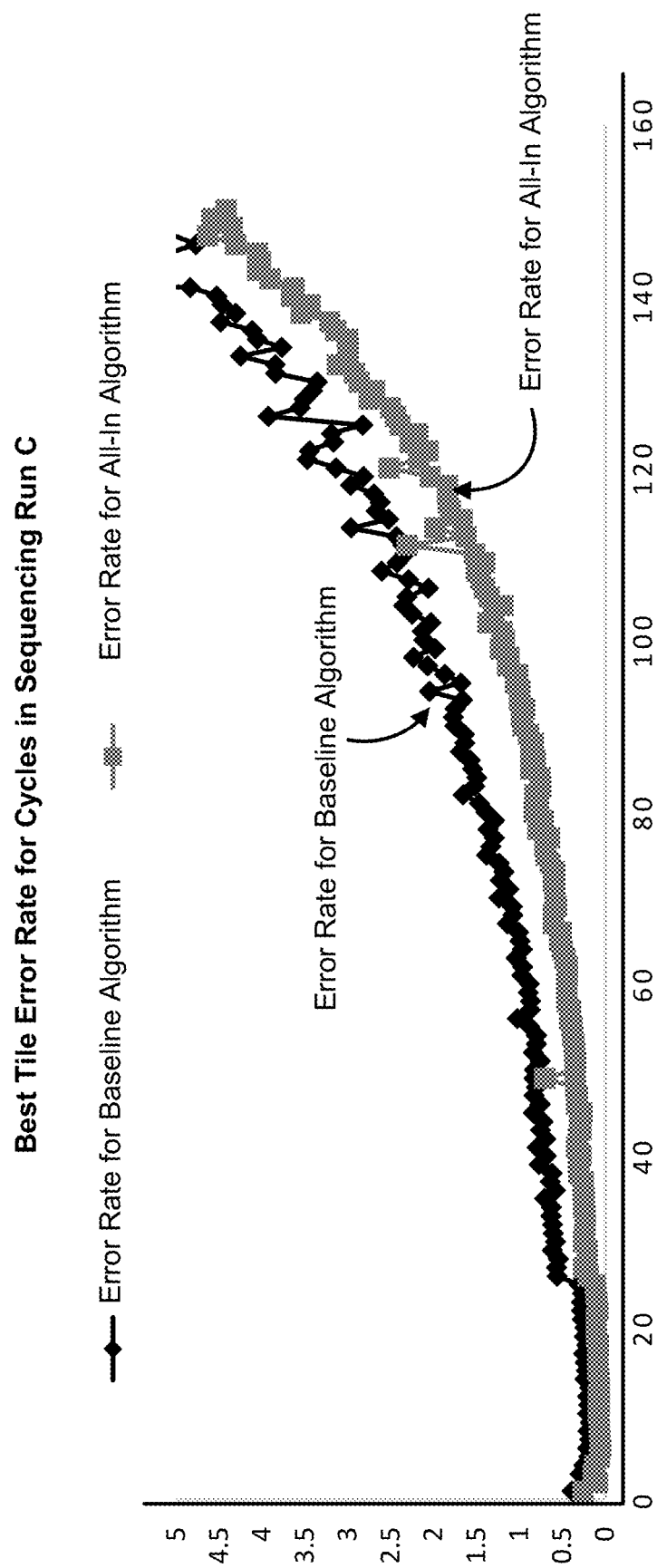

FIGS. 26A, 26B and 26C presents best tile error rate for cycles in sequencing runs A, B, and C, respectively. Separate time series of error rates in sequencing runs are presented for Baseline and All-In algorithms. The results in FIGS. 26A to 26C illustrate that All-In algorithm reduces the error rates in sequencing runs. The improvement in error rate using All-In algorithm for best tile can vary from cycle to cycle. In FIG. 26A, for initial 25 cycles, the error rates of Baseline and All-In algorithms are almost same, however as the sequencing run proceeds, the error rate for All-In algorithm reduces as compared to error rate for Baseline Algorithm. FIG. 26B shows that the error rate for All-In algorithm are marginally better in the initial cycles. In the later cycles of the sequencing run, All-In algorithm performs better than Baseline algorithm. FIG. 26C illustrates best tile error rates for cycles in sequencing run C for the two algorithms. The performance of All-In algorithm is significantly better than Baseline algorithm for majority of cycles. The graphs also illustrate particular cycles for which All-In algorithm has higher error rate. These results can help technicians or researchers to focus on quality issues causing increase in error rate for particular cycles.

Figure 26D:
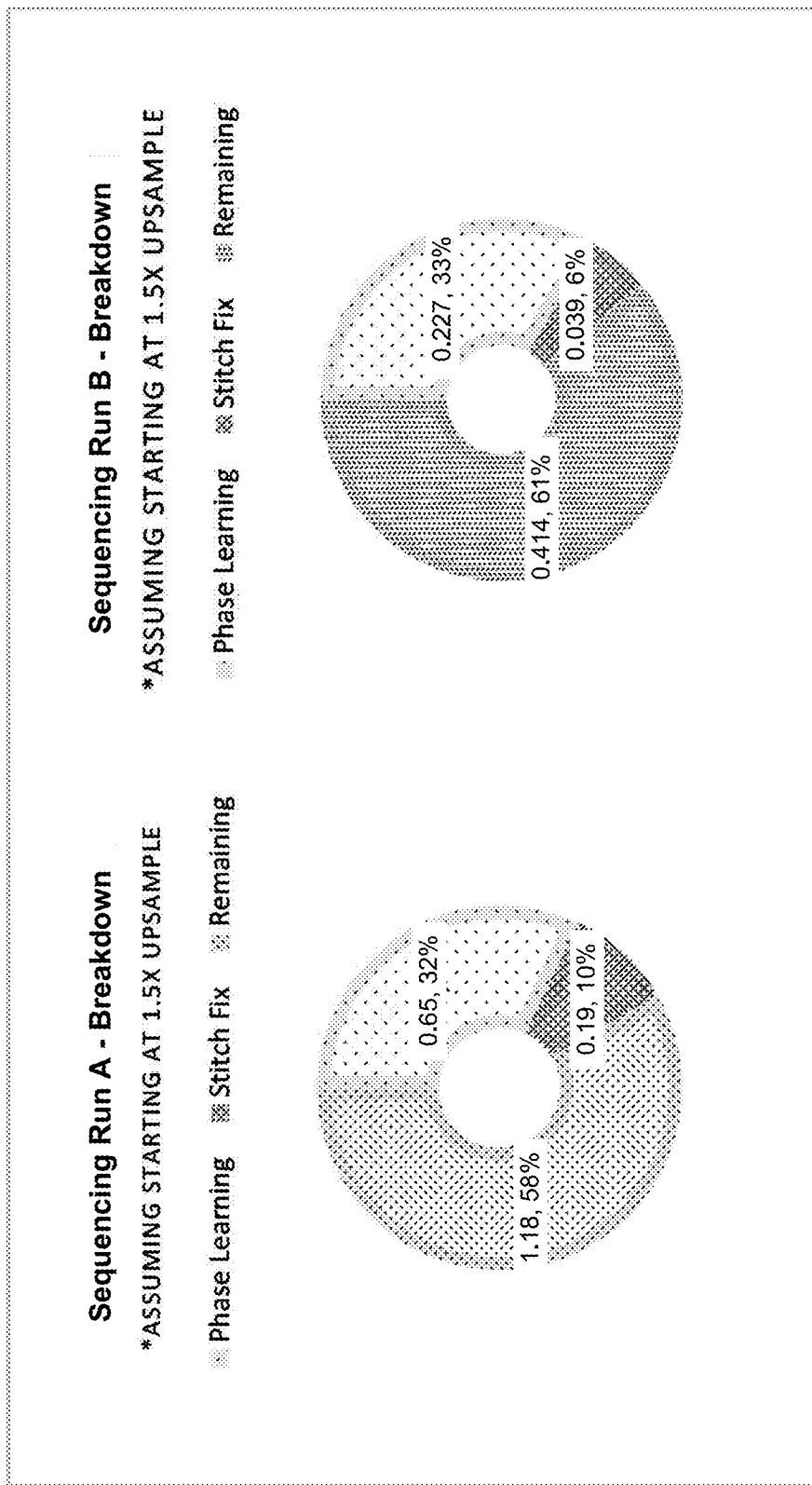
FIG. 26D presents graphical plots of improvement in error rates by inclusion of phase learning and stitch fixing techniques in the Baseline SIM algorithm.

FIG. 26D presents improvements in error rate achieved by specific updates to the All-In algorithm as compared to the Baseline Algorithm. For example, the left plot presents improvements in error rate for sequencing run A by including phase learning and stich fixing, one by one. Phase learning refers to estimation of phase bias that can capture the relationship between phase displacement values for non-center subtiles with respect to center subtiles. A separate phase bias lookup table is generated and stored per tile of the flowcell. The error rate for the Baseline algorithm for sequencing run A is 1.85 as shown in first column of table in FIG. 24A. The error rate improvement when phase learning is included in Baseline algorithm is 0.65 or 32% and the error rate improvement in Baseline algorithm is 0.19 or 10% when stitch fixing is included in the Baseline model. The graph can also be interpreted as phase learning reducing error rate by 0.65 and stitch fixing reducing error rate by 0.19, respectively in the Baseline algorithm. The residual error rate after inclusion of two techniques is 1.18.

The graphical plot on the right in FIG. 26D presents improvements in error rate caused by phase learning and stitch fix techniques for sequencing run B. The inclusion of phase learning in Baseline algorithm reduces the error rate by 0.227 or 33%. The inclusion of stitch fixing in Baseline algorithm reduces the error rate by 0.039 or 6%. The residual error rate after inclusion of both techniques is 0.414. We now present a discussion of the impact of the technology disclosed when the disclosed SIM parameter estimation and image reconstruction techniques are applied to process images from a sequencing run.

Impact of the Technology Disclosed

Simplified examples are presented to illustrate how the technology disclosed can reduce computation resource requirements for structured illumination image enhancement across a flow cell over multiple cycles and several hours. Machine capabilities vary, so round numbers have been chosen to make the example calculations easy to follow. Keep in mind that the technologies disclosed can be independently applied, singularly or in combination. In some implementations, the parameters can be estimated more frequently to compensate for system instability due to environmental factors. For example, as described above, the "All-In" SIM algorithm estimates phase bias lookup table in the first cycle of every sequencing run. This can increase time duration for the first cycle by up to 30 percent. However, significant performance improvement in error rates and % PF metrics can be achieved.

Suppose a sequencing run involves 150 cycles of analysis with two illumination frequencies at a rate of 6 minutes per cycle. The basic image tile capture in 150 cycles takes 15 hours. Suppose that two angles, +/−45 degrees are used for the structured illumination with three images per angle in each cycle. The number of images per tile over 150 cycles is 1800 images. Suppose there are 70 subtiles in a 7×10 grid. The processing requirement is 126,000 subtiles in 900 minutes.

In a first implementation, suppose that the system has been calibrated before the run and that the quadratic fits plus the lookup table generated for spacing, angle and phase differences can be used throughout the run. In this implementation, the near-center subtile would be subject to fringe peak estimation 1800 times. This is the number of times that there is a change in the flow cell position or the illumination laser source or the projected structured illumination phase.

In this first example, the system would avoid fringe peak estimation 69 out of 70 times. For 124,200 image subtiles, the other subtiles would use the pre-calculated relationship with the near-center subtile to determine reconstruction parameters. The estimation of reconstruction parameters is more computationally expensive than the actual reconstruction. So computational requirements are reduced by more than half. Further reduction can be achieved using the outlined reliance on symmetries.

Application of symmetries allows conjugate pair values to be looked up, instead of calculated by FFT and other methods. Special care needs to be taken with subtile sections that have reflected symmetries, instead of the 180-degree rotation and sign change operation symmetry that dominates. With an even number of rows and columns in corner shifted Fourier transform space, the top row and the left and middle+1 columns are handled different, due to reflected rather than rotated symmetries. See, FIG. 19. With an odd number of rows and columns in a corner shifted Fourier transform space, the top row and the left column are handled different, due to reflected rather than rotated symmetries. See, FIGS. 19 and 23A. Other symmetries can be applied to a center shifted Fourier transform space.

The center column of FIG. 18 illustrates how half of the calculations in the frequency domain can be avoided at various steps, by focusing on non-redundant data. Suppose this reduces calculations by 40 percent and image coefficient storage by 50 percent during these steps, until reconstruction of the whole image at 1850, 1860. The conjugate pairs need not be included in calculations during steps 3b-3d, because value lookups can be applied when values are need in 1850, 1860 for the conjugate pairs.

Thus, one technology disclosed can save 50 percent of required computational resources and the other can save 40 percent. Cumulatively, the computational expense of SIM reconstruction can be reduced by more than two-thirds.

In a second implementation, suppose that the system is calibrated at the start of a run and again at the mid-point, to update the quadratic fits and the lookup table. Suppose that this calibration takes 8 minutes, because it involves fringe peak estimation of all 70 subtiles followed by fitting and lookup table generation. This estimation extends run time from 15 hours to 15 hours 16 minutes. If, instead of applying the technology disclosed, estimation was performed for every subtile and exposure frequency, once for every image trio, for a total of 300 parameter estimations, the run time would more than triple.

In the second implementation, the impact of applying symmetries would not change.

It is expected that the combined impact of the technologies disclosed will be to allow real time processing of image tiles to be performed using a CPU without addition of a GPU, FPGA or CGRA to the system. Alternatively, simpler computing resources can be used, even if a GPU, FPGA or CGRA implementation is chosen. This can reduce system complexity and facilitate retaining the form factor of existing machines, while increasing their real time processing capabilities.

Particular Implementations

Subtiles of a Full Field of View Captured by a Sensor

The subtiling technology disclosed can be described from the perspectives of calibration and/or production using a calibrated scanner.

In one calibration implementation of the technology disclosed, a method is described for calibration or characterization of a scanner detecting florescence of millions of samples distributed across a flow cell or, more generically, an imaging plane, in images collected over multiple cycles. Structured illumination is used to improve resolution between fluorescent samples positioned closer together than an Abbe diffraction limit for optical resolution. This method of calibrating the scanner to use substantially a full field of view projected by a lens onto an optical sensor in the scanner, includes capturing the image tiles under a structured illumination at multiple angles and phase displacements of the structured illumination. Variations on the method may use 2D structured illumination and a different phase displacement stepping pattern. The method involves calculating optical distortion across the image tile, including measuring spacing between intensity peaks and angle of the intensity peaks in at least 9 subtiles of the image tile, including a near-center subtile, and fitting a spacing surface and an angle surface to the measured spacing and angle, respectively. Of course, other configurations for dividing image tile can be used, such as 3×3, 5×5, 5×7, 9×9, 8×11, 9×16 subtiles. Images captured by larger sensors be divided into more subtiles, not limited to the subtile arrays listed. A fitted spacing surface and fitted angle surface express corrections for distortions across the subtiles of the image tile. Resulting fit coefficients are saved including the fitting results that relate the spacing of the intensity peaks and the angle of the intensity peaks across the at least 9 subtiles to the near center subtile. Calibrating further includes measuring phase displacements of the structured illumination at the multiple angles and phase displacements within the subfields and saving a look-up table that expresses differences between the phase displacement in the near-center subtile and the phase displacements in other subtiles of the image tile. This calibration prepares the scanner for production, for analyzing the florescence of millions of samples distributed across the flow cell or imaging plane, in images collected over multiple cycles.

In a production implementation, the method produces enhanced images of florescence of millions of samples distributed across a flow cell or imaging plane, from images collected over multiple cycles. This includes processing captured image tiles covering positions across the flow cell, the image tiles captured at multiple angles and phase displacements of the structured illumination, over the multiple cycles. This processing is directed to subtiles of each image tile. It includes accessing saved estimated fitting results or generating estimated fitting results that express spacing and angle distortion relationships between a near-center subtile and other subtiles. The fitting results can be coefficients of a polynomial surface fit or values in a look-up table. This method also includes accessing a saved look-up table or generating a look-up table that expresses phase displacement differences between the near-center subtile and the other subtiles. The fitting results and look-up table are combined with measurements for the near-center tile of each captured image tile, of the spacing between intensity peaks, the angle of the intensity peaks, and the phase displacements of the structured illumination. Reconstruction parameters are determined, on a per-subtile basis, for each captured image tile and then applied in SIM reconstruction. This method produces enhanced resolution images for the subtiles at the positions across the flow cell or imaging plane, over the multiple cycles, with resolving power better than the Abbe diffraction limit.

For example, for an image tile, divided into 9 subtiles, the method includes deriving estimated reconstruction parameters for at least 8 additional subtiles of the image tile, in addition to the near-center subtile. The estimated spacing and angle reconstruction parameters for the additional subtiles are derived by combining the accessed or estimated parameters for the near-center subtile with saved fitting results that relate the spacing parameters and the angle parameters across the at least 8 additional subtiles to the near-center subtile. The estimated phase displacement reconstruction parameters for the additional subtiles are derived by combining the accessed or estimated parameters for the near-center subtile with a saved look-up table for the phase displacement measurement across the at least 8 additional subtiles, relative to the near center subtile. As described above, other configurations for dividing the image tile can be used without impacting the parameter estimation process described above.

The enhanced resolution images can be used to sequence the samples of over multiple cycles or, otherwise, to study florescence over an image plane captured by dozens, hundreds or even thousands of image tiles.

In a combined calibration and production implementation, the actions of described above are combined, so the scanner is calibrated and then used in production. The technology disclosed includes a method implementation that improves performance of a scanner detecting florescence of millions of samples distributed across a flow cell, in images collected over multiple cycles. Structured illumination is used to improve resolution between fluorescent samples positioned closer together than an Abbe diffraction limit for optical resolution. Applying this technology, calibrating the scanner using substantially a full field of view projected by a lens onto an optical sensor in the scanner, includes capturing the image tiles under a structured illumination at multiple angles and phase displacements of the structured illumination. It involves calculating optical distortion across the image tile, including measuring spacing between intensity peaks and angle of the intensity peaks in at least 9 subtiles of the image tile, including a near-center subtile, and fitting a spacing surface and an angle surface to the measured spacing and angle, respectively. Of course, image tile can be divided into more subtiles as described above. A fitted spacing surface and angle surface express corrections for distortions across the subtiles of the image tile. Resulting coefficients of the fit are saved. Calibrating further includes measuring phase displacements of the structured illumination at the multiple angles and phase displacements within the subfields and saving a look-up table that expresses differences between the phase displacement in the near-center subtile and the phase displacements in other subtiles of the image tile.

The method progresses with processing captured image tiles covering positions across the flow cell, captured the image tiles at multiple angles and phase displacements of the structured illumination, over the multiple cycles. Doing this includes combining the saved fitting results and the saved look-up table with measurements for each captured image tile, in the near-center tile, of the spacing between intensity peaks, the angle of the intensity peaks, and the phase displacements of the structured illumination, to determine reconstruction parameters for each captured image tile, on a per-subtile basis. It further includes producing enhanced resolution images for the subtiles at the positions across the flow cell, over the multiple cycles, with resolving power better than the Abbe diffraction limit and using the enhanced resolution images to sequence the samples of over multiple cycles.

Each of the implementations of the combined calibration and production implementation presented above has separate utility. For instance, a first entity could deliver and calibrate the scanner for use by a second entity. The first entity could use a different calibration approach to determine and express spacing and angle distortion relationships and phase displacement differences between the near-center subtile and other subtiles, and the production technology described could still be used. The calibration technology described could be used, then the second entity could use the calibrated scanner in a different manner. Thus, the technology disclosed includes the calibration and/or production implementations.

This method and other implementations of the technology disclosed can each optionally include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations.

When the imaging plane is a flow cell, the samples can be distributed in millions of nanowells across the flow cell. At least some adjoining pairs of nanowells can be positioned closer together than an Abbe diffraction limit for optical resolution. Structure illumination allows such close positioning. Alternatively, the samples can be randomly distributed across the flow cell.

The subtiles each include at least 512 by 512 pixels of the optical sensor. Larger or smaller numbers can be used, including 256, 400, 1024, 2048 and 4096 or in a range of 256 to 4096 pixels. Performance can be improved when the subtile dimension is a power of 2, practical ranges that we have found to work well are 512 and 1024 pixels.

The subtiles can overlap by at least 2 pixels of the optical sensor. Larger or smaller numbers can be used. For example, for a 512-pixel wide window, up to a 256-pixel overlap could be used, and for 1024 pixels wide, up to a 512 overlap could be used.

Results of fitting the spacing surface and the angle surface can be stored as coefficients of a quadratic, cubic or higher order surface, or in a look-up table calculated from polynomial fits of the spacing and angle surfaces.

In some implementations, re-measuring the spacing between intensity peaks and angle of the intensity peaks in the subtiles, refitting the spacing surface and the angle surface, and saving the re-fitting results for use in processing subsequently captured image tiles can be performed one or more times during a sequencing run. This can be done, for instance, at an intermediate cycle such as the $50^{th}$ cycle or later among at least 100 cycles. In some implementations, re-measuring can be performed when computing resources are available such as at the end of a sequencing run or during the time between two reads when chemistry step is being performed for the next read.

Nanowells can be arranged in a regular repeating pattern. For a rectangular pattern, two structured illumination angles can be used, substantially along two diagonals connecting opposing corners of a rectangle in the pattern, so that intensity peaks of the structured illumination are oriented substantial normal to the two diagonals. For a repeating hexagonal pattern of nanowells, with three diagonals connecting opposing corners of hexagons in the pattern, three structured illumination angles can be used with intensity peaks that are oriented substantial normal to the three diagonals. Alternatively, samples can be randomly distributed over an imaging plane without nanowells. Or, the samples could be regularly arranged over the imaging plane by some means other than nanowells.

The method can further include aggregating the enhanced resolution images for subtiles into an enhanced resolution image for a tile and using the enhanced resolution image tile for further analysis. The further analysis can include sequencing the samples, one position per cycle.

As an improvement on fitting the surfaces, the method can further include determining a cropping margin and applying the cropping margin to remove from calculations pixels around edges of the sensor from consideration, before fitting of the spacing surface and the angle surface to the measured spacing and angle. The margin can be uniform around edges of the sensor or it can vary by edge, such as wider at the ends of a rectangular sensor than along the long edge.

The method can further include measuring spacing between intensity peaks and angle of intensity peaks over at least 8 by 11 subtiles of the image tile. Other configurations for dividing the image tile into subtiles can be used as described above.

The subtiling technology disclosed can be used to produce an enhanced resolution image from images of a target captured under structured illumination. In one image reconstruction implementation of the technology disclosed, a method is described for dividing a captured image of the target captured by an optical sensor into 9 or more subtiles and operating independently on each of the 9 or more subtiles. As described above, more subtiles can be used to subdivide the image captured. The method includes transforming, in a respective subtile, at least three images of the target into a Fourier domain to produce at least three frequency domain matrices of the respective subtile. The images are captured by a sensor in a spatial domain while applying at least three phase displacements of the structured illumination along one angle. An inverse mixing matrix is calculated using estimated reconstruction parameters. The inverse matrix is applied to the frequency domain matrices to produce at least three phase-separated matrices in the Fourier domain, which are unshifted and shifted matrices. A subpixel shifting on at least one shifted matrix is performed. The subpixel shifting includes transforming the shifted matrix from the Fourier domain into the spatial domain, applying a translation vector to data in the spatial domain, and transforming the translated data from the spatial domain data. The subpixel shifting produces two or more realigned shifted matrices in the Fourier domain. The method includes aligning and summing overlapping values of the unshifted matrix and the realigned shifted matrices to produce an expanded frequency coverage matrix. The expanded frequency coverage matrix is inversely transformed from the Fourier domain to produce an enhanced resolution subtile in the spatial domain. Optionally, the enhanced resolution image of the target can be produced by merging the enhanced resolution subtiles for the 9 or more subtiles.

This method and other implementations of the technology disclosed can each optionally include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations.

The process steps of method can be applied repeatedly to produce a sequence of the enhanced resolution images. The sequence of enhanced resolution images can be used to sequence samples imaged by the sensor over multiple cycles.

The subtiles each include at least 512 by 512 pixels of the optical sensor. Larger or smaller numbers can be used, including 256, 1024, 2048 and 4096 or 256-4096 pixels. Performance can be improved when the subtile dimension is a power of 2, practical ranges that we have found to work well are 512 and 1024 pixels.

The subtiles can overlap by at least 2 pixels of the optical sensor. Larger or smaller numbers can be used, for example for 512, a 256-pixel overlap would be appropriate and for 1024 a 512 overlap would be appropriate.

The method can further include aggregating the enhanced resolution images for subtiles into an enhanced resolution aggregate image and using the enhanced resolution aggregate to sequence the sample over multiple cycles.

The method can be further applied to image tiles at positions across a flow cell that capture fluorescence of millions of samples distributed across the flow cell. Such an application of the method produces enhanced images of the flow cell.

When the imaging plane is a flow cell, the samples can be distributed in millions of nanowells across the flow cell. At least some adjoining pairs of nanowells can be positioned closer together than an Abbe diffraction limit for optical resolution. Structure illumination allows such close positioning. Alternatively, the samples can be randomly distributed across the flow cell. In such an implementation, the method further includes producing sequences of the enhanced images for the flow cell and using the sequences of the enhanced images to call sequences of the samples.

The computer implemented methods described above can be practiced in a system that includes computer hardware. The computer implemented system can practice one or more of the methods described above. The computer implemented system can incorporate any of the features of methods described immediately above or throughout this application that apply to the method implemented by the system. In the interest of conciseness, alternative combinations of system features are not individually enumerated. Features applicable to systems, methods, and articles of manufacture are not repeated for each statutory class set of base features. The reader will understand how features identified in this section can readily be combined with base features in other statutory classes.

As an article of manufacture, rather than a method, a non-transitory computer readable medium (CRM) can be loaded with program instructions executable by a processor. The program instructions when executed, implement one or more of the computer implemented methods described above. Alternatively, the program instructions can be loaded on a non-transitory CRM and, when combined with appropriate hardware, become a component of one or more of the computer implemented systems that practice the methods disclosed.

Each of the features discussed in this particular implementation section for the method implementation apply equally to CRM and system implementations. As indicated above, all the method features are not repeated here, in the interest of conciseness, and should be considered repeated by reference.

Non-redundant SIM Image Reconstruction Application

The technology disclosed relates to reducing computing resources required to produce an enhanced resolution image from structured illumination of a target.

In one implementation of the technology disclosed, a method is described for producing an enhanced resolution image from images of a target captured under structured illumination. This method applies one or more transformations to non-redundant data and then recovers redundant data from the non-redundant data after the transformations.

The method includes transforming at least three images of the target, captured by a sensor in a spatial domain. This sensor captures images from at least three phase displacements of structured illumination along one angle. Three captured images in the spatial domain are transformed into a Fourier domain to produce at least three frequency domain matrices. These frequency domain matrices include at least non-redundant components and redundant conjugate components. The redundant conjugate components are conjugates, in complementary matrix positions, of the non-redundant components. The method further includes using estimated reconstruction parameters to generate an inverse mixing matrix and applying the inverse mixing matrix to at least the non-redundant components. This produces at least three phase-separated matrices in the Fourier domain, which are unshifted and shifted matrices. These matrices include non-redundant unshifted components and non-redundant shifted spatial frequency components, derived by applying the inverse mixing matrix to the non-redundant components of the frequency domain matrices;

The method also includes performing one or more intermediate transformations on at least the non-redundant components of the phase-separated matrices. One intermediate operation is subpixel shifting. This includes transforming from the Fourier domain into the spatial domain at least the non-redundant shifted spatial frequency components of the shifted matrices. Then applying a translation vector to data in the spatial domain and transforming the translated data from the spatial domain data into one or more realigned shifted matrices back in the Fourier domain. Applying the translation vector effectively realigns overlapping values in the shifted matrices in the Fourier domain with the unshifted matrix more precisely than whole matrix positions of discrete Fourier transforms. The redundant conjugate components can be recovered, after the intermediate transformations, from the non-redundant components by copying transformed values from the non-redundant components to the complementary matrix positions of the redundant conjugate components and changing a sign of imaginary parts of the copied values to produce transformed redundant conjugate components. This reduces the resources required during the intermediate transformations. Constructing an enhanced resolution image further includes aligning and summing overlapping values of the unshifted matrix and the shifted matrices to produce an expanded frequency coverage matrix, then inversely transforming the expanded frequency coverage matrix from the Fourier domain to produce an enhanced resolution image in the spatial domain.

In some implementation, a series of enhanced resolution images are produced by repeatedly applying the preceding actions. Optionally, for instance in sequencing by synthesis, the technology disclosed can be applied to using the series of enhanced resolution images, to sequence samples imaged by the sensor of over multiple cycles.

This method and other implementations of the technology disclosed can each optionally include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations.

Technology disclosed can be applied to components arranged in a corner shifted matrix, the complementary matrix positions of the redundant conjugate components are rotated 180 degrees from matrix positions of the non-redundant components.

The method can further include applying, during the intermediate operations, of one or two-step Wiener filtering to reduce noise. When two-step Wiener filtering is applied, an independent modulation transfer function can be applied to the phase separated matrices as an intermediate transformation to compensate for optical transfer of contrast by an objective lens which has decreasing ability to transfer contrast with increasing spatial frequency. The noise removal components of the Wiener filtering can be separately applied, later. The intermediate operations can further include applying Apodization filtering.

In some implementations, the phase-separated matrices in the Fourier domain include an even number of rows and an even number of columns. For these even dimension matrices, column averaging can be applied as an intermediate operation to average a DC column, of the DC components, with a middle column, one column beyond the center of the even dimensioned matrix. This column averaging can precede the subpixel shifting.

In some implementations, in the phase-separated matrices in the Fourier domain are corner shifted. Then, the DC components appear in a top row, or bottom row and a left column, or right column, of the matrices and the redundant conjugate components appear in a block rotated 180 degrees from the orientation of the non-redundant components.

In some implementations, the phase-separated matrices in the Fourier domain include an odd number of rows and an odd number of columns without a column between blocks of the non-redundant components and the redundant conjugate components. In odd matrices, the redundant conjugate components also appear in a block rotated 180 degrees from the orientation of the non-redundant components.

In implementations wherein the target includes regularly spaced nanowells arranged in a rectangular pattern, the method can be applied to sets of at least three images from phase displacements along two angles of the structured illumination of the target, with the two angles are along diagonals between opposing corners of the rectangles. Alternatively, in implementations wherein the target includes regularly spaced nanowells arranged in a hexagonal pattern, the method can be applied to sets of at least three images from phase displacements along three angles of the structured illumination of the target, with the three angles are along diagonals between opposing corners of hexagons.

The method can further include applying the Wiener filtering during the intermediate operations in two steps. When performed in two steps, includes applying an independent modulation transfer function to the phase separated matrices to compensate for optical transfer of contrast, which decreases with increasing spatial frequency, by an objective lens transferring the target under the structured illumination to a sensor. It further includes applying noise removal components of the Wiener filtering or another equivalent filter.

The method can further include applying an Apodization filter during the intermediate operations.

The phase-separated matrices in the Fourier domain can include an even number of rows and an even number of columns. For such even matrices, the method can further include applying column averaging during the intermediate operations to average a DC column, of the DC components, with a middle column, between blocks of the non-redundant components and the redundant conjugate components. The column averaging can precede the subpixel shifting.

When the phase-separated matrices in the Fourier domain are top left corner shifted, the DC components can appear in a top row and a left column of the matrices and the redundant conjugate components appear in a block rotated 180 degrees from its orientation as the non-redundant components. Alternatively, the phase-separated matrices can be bottom right corner shifted.

The phase-separated matrices in the Fourier domain alternatively can include an odd number of rows and an odd number of columns. Such odd matrices do not include a middle column between blocks of the non-redundant components and the redundant conjugate components.

The method further can be applied to sets of at least three images of the target captured through a lens by a sensor in the spatial domain, from phase displacements along two angles of the structured illumination of the target. When the target includes regularly spaced nanowells, the two angles can be oriented substantially are along diagonals between opposing corners of quadrilaterals among the regularly spaced nanowells. These quadrilaterals can be squares and the two angles can be substantially orthogonal, within one to three degrees. Alternatively, the method can be applied to sets of images from phase displacements along three angles of the structured illumination of the target. This is useful when the target includes spaced nanowells regularly spaced in a hexagonal pattern. With this pattern, the three angles can be along diagonals between opposing corners of hexagons in the pattern.

The computer implemented methods described above can be practiced in a system that includes computer hardware. The computer implemented system can practice one or more of the methods described above. The computer implemented system can incorporate any of the features of methods described immediately above or throughout this application that apply to the method implemented by the system. In the interest of conciseness, alternative combinations of system features are not individually enumerated. Features applicable to systems, methods, and articles of manufacture are not repeated for each statutory class set of base features. The reader will understand how features identified in this section can readily be combined with base features in other statutory classes.

As an article of manufacture, rather than a method, a non-transitory computer readable medium (CRM) can be loaded with program instructions executable by a processor. The program instructions when executed, implement one or more of the computer implemented methods described above. Alternatively, the program instructions can be loaded on a non-transitory CRM and, when combined with appropriate hardware, become a component of one or more of the computer implemented systems that practice the methods disclosed.

Each of the features discussed in this particular implementation section for the method implementation apply equally to CRM and system implementations. As indicated above, all the method features are not repeated here, in the interest of conciseness, and should be considered repeated by reference.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein. The scope of the technology disclosed is defined by the appended claims.

Computer System

Figure 24:
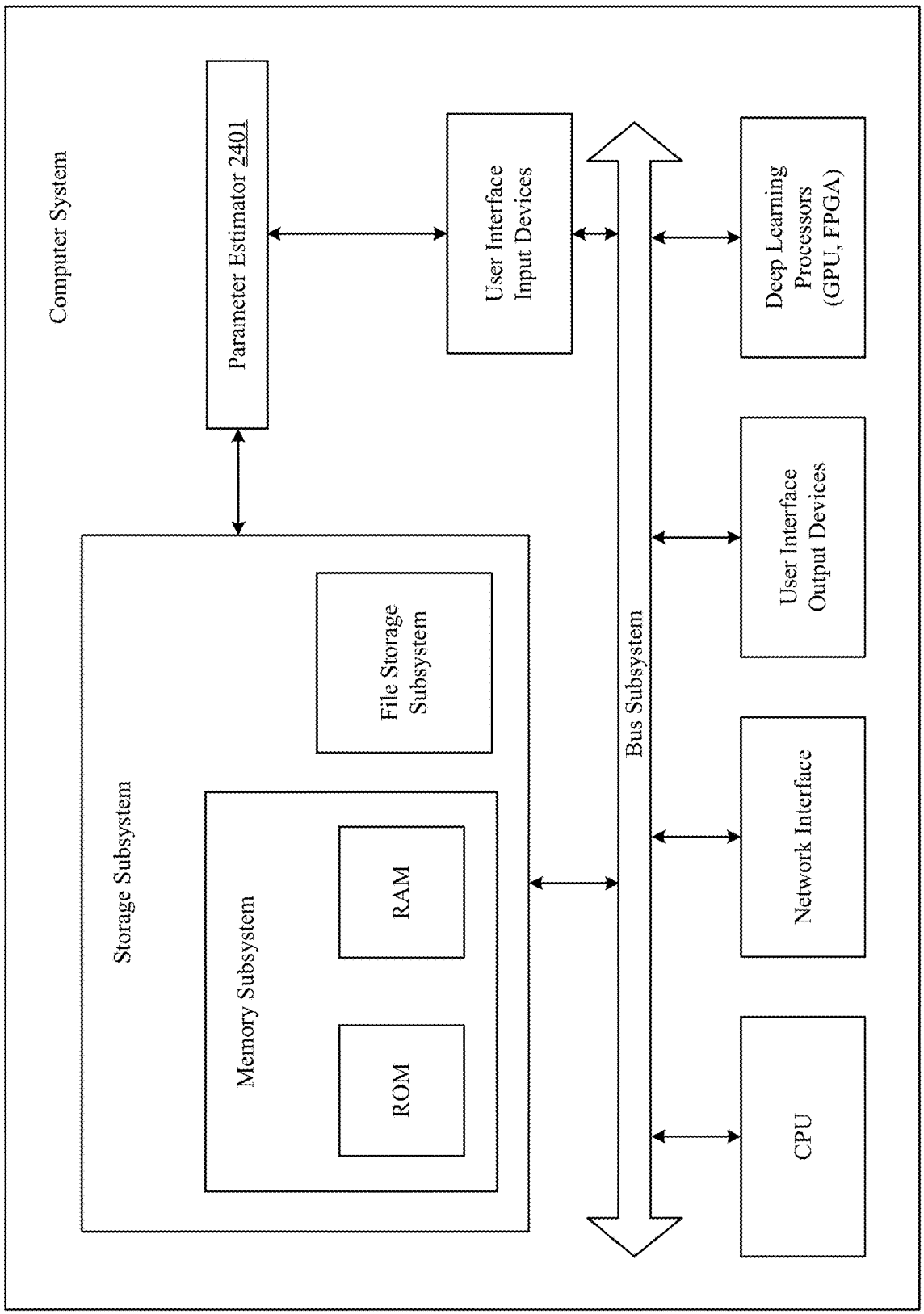
FIG. 24 is a simplified block diagram of a computer system that can be used to implement the technology disclosed.

FIG. 24 is a simplified block diagram of a computer system that can be used to implement the technology disclosed. Computer system typically includes at least one processor that communicates with a number of peripheral devices via bus subsystem. These peripheral devices can include a storage subsystem including, for example, memory devices and a file storage subsystem, user interface input devices, user interface output devices, and a network interface subsystem. The input and output devices allow user interaction with computer system. Network interface subsystem provides an interface to outside networks, including an interface to corresponding interface devices in other computer systems.

In one implementation, a parameter estimator 2401 to estimate the three parameters (angle, spacing and phase offset) is communicably linked to the storage subsystem and user interface input devices.

User interface input devices can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system.

User interface output devices can include a display subsystem, a printer, a fax machine, or non-visual displays such as audio output devices. The display subsystem can include a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system to the user or to another machine or computer system.

Storage subsystem stores programming and data constructs that provide the functionality of some or all of the modules and methods described herein. These software modules are generally executed by processor alone or in combination with other processors.

Memory used in the storage subsystem can include a number of memories including a main random access memory (RAM) for storage of instructions and data during program execution and a read only memory (ROM) in which fixed instructions are stored. A file storage subsystem can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem in the storage subsystem, or in other machines accessible by the processor.

Bus subsystem provides a mechanism for letting the various components and subsystems of computer system communicate with each other as intended. Although bus subsystem is shown schematically as a single bus, alternative implementations of the bus subsystem can use multiple busses.

Computer system itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system depicted in FIG. 24 is intended only as a specific example for purposes of illustrating the technology disclosed. Many other configurations of computer system are possible having more or less components than the computer system depicted in FIG. 24.

The deep learning processors can be GPUs or FPGAs and can be hosted by deep learning cloud platforms such as Google Cloud Platform, Xilinx, and Cirrascale. Examples of deep learning processors include Google's Tensor Processing Unit (TPU), rackmount solutions like GX4 Rackmount Series, GX8 Rackmount Series, NVIDIA DGX-1, Microsoft' Stratix V FPGA, Graphcore's Intelligent Processor Unit (IPU), Qualcomm's Zeroth platform with Snapdragon processors, NVIDIA's Volta, NVIDIA's DRIVE PX, NVIDIA's JETSON TX1/TX2 MODULE, Intel's Nirvana, Movidius VPU, Fujitsu DPI, ARM's DynamicIQ, IBM TrueNorth, and others.

What is claimed is:

1. A method to produce an enhanced resolution image from images of a target captured under structured illumination, the method including:
    transforming at least three images of the target, captured by a sensor in a spatial domain, from at least three phase displacements of the structured illumination along one angle, into a Fourier domain to produce at least three frequency domain matrices that each include first blocks of complex coefficients and redundant, second blocks of complex coefficients that are conjugates to the first blocks;
    using estimated reconstruction parameters, applying an inverse mixing matrix to the first blocks to produce at least three phase-separated half-matrices in the Fourier domain, which are an unshifted half-matrix and shifted half-matrices;
    performing one or more intermediate transformations on the phase-separated half-matrices, including:
        subpixel shifting, by transforming from the Fourier domain into the spatial domain the shifted half-matrices, applying a translation vector to data in the spatial domain, and transforming translated data from the spatial domain data back into the Fourier domain to produce realigned shifted half-matrices, wherein applying the translation vector compensates for limited spatial resolution of the sensor that captured the images and
    calculating complex coefficients of second blocks in the Fourier domain to produce full matrices from the half-matrices, after the intermediate transformations, by copying complex coefficients from the unshifted half-matrix and the realigned shifted half-matrices, as conjugates, into respective second block positions to produce shifted and unshifted full matrices from the half-matrices, including changing a sign of imaginary parts of the copied complex coefficients;
    aligning and summing overlapping complex coefficients of the unshifted full matrix and the shifted full matrices to produce an expanded frequency coverage matrix; and
    inversely transforming the expanded frequency coverage matrix from the Fourier domain to produce an enhanced resolution image in the spatial domain.

2. The method of claim 1, further including using a sequence of enhanced resolution images, produced by repeatedly applying actions of claim 1 to sequence samples imaged by the sensor over multiple cycles.

3. The method of claim 1, wherein positions of the complex coefficients in the second blocks, when arranged in a corner shifted matrix, are rotated 180 degrees from positions of the complex coefficients in the first blocks.

4. The method of claim 1, further including applying, during the intermediate transformations, of one or two-step Wiener filtering to reduce noise.

5. The method of claim 4, further including applying the two-step Wiener filtering, including:
    applying an independent modulation transfer function to the phase separated matrices to compensate for optical transfer of contrast, which decreases with increasing spatial frequency, by an objective lens transferring the target under the structured illumination to a sensor; and then later applying noise removal components of the Wiener filtering.

6. The method of claim 1, further including applying Apodization filtering during the intermediate transformations.

7. The method of claim 1, wherein the phase-separated matrices in the Fourier domain include an even number of rows and an even number of columns, further including setting equal between the shifted matrices a DC column, of DC complex coefficients, and a middle column, of other complex coefficients.

8. The method of claim 7, further including averaging, over the shifted matrices, values in the DC column, of DC complex coefficients, and the middle column, of other complex coefficients before the setting equal.

9. The method of claim 7, further including copying values in the DC column, of DC complex coefficients, and the middle column, of other complex coefficients from one of the shifted half-matrices to another of the shifted half-matrices.

10. The method of claim 7, further including calculating a weighted average, over the shifted half-matrices, of values in the DC column, of DC complex coefficients, and the middle column, of other complex coefficients before the setting equal.

11. The method of claim 1, wherein at least one of the phase-separated matrices in the Fourier domain is corner shifted, DC complex coefficients appear in a top row and a left column of the matrices and the complex coefficient conjugates appear in a second block rotated 180 degrees from an orientation of the first block.

12. The method of claim 1, wherein the phase-separated matrices in the Fourier domain include an odd number of rows and an odd number of columns without a middle column between the first blocks and the second blocks.

13. The method of claim 1, further including applying the method to sets of at least three images of the target captured through a lens by a sensor in the spatial domain, from phase displacements along two angles of the structured illumination of the target, wherein the target includes regularly spaced nanowells and the two angles of the structured illumination are along diagonals between opposing corners of quadrilaterals among the regularly spaced nanowells.

14. The method of claim 1, further including applying the method to sets of at least three images of the target captured through a lens by a sensor in the spatial domain, from phase displacements along three angles of the structured illumination of the target, wherein the target includes regularly spaced nanowells and the three angles are along diagonals between opposing corners of hexagons among the regularly spaced nanowells.

15. The method of claim 1, wherein applying the translation vector effectively realigns overlapping values in the shifted matrices in the Fourier domain with the unshifted matrix more precisely than whole matrix positions of discrete Fourier transforms.

16. A non-transitory computer readable storage medium impressed with computer program instructions to produce an enhanced resolution image from images of a target captured under structured illumination, the instructions, when executed on a processor, implement a method comprising:
  transforming at least three images of the target, captured by a sensor in a spatial domain from at least three phase displacements of the structured illumination along one angle, into a Fourier domain to produce at least three frequency domain matrices that each include first blocks of complex coefficients and redundant second blocks of complex coefficients that are conjugates, to the first blocks;
  using estimated reconstruction parameters, applying an inverse mixing matrix to the first blocks to produce at least three phase-separated half-matrices in the Fourier domain, which are an unshifted half-matrix and shifted half-matrices;
  performing one or more intermediate transformations on the phase-separated half-matrices, including:
  subpixel shifting, by transforming from the Fourier domain into the spatial domain the shifted half-matrices, applying a translation vector to data domain, and transforming translated data from the spatial domain data back into the Fourier domain to produce realigned shifted half-matrices, wherein applying the translation vector compensates for limited spatial resolution of the sensor that captured the images and
  calculating complex coefficients of second blocks in the Fourier domain to produce full matrices from the half-matrices, after the intermediate transformations, by copying complex coefficients from the unshifted half-matrix and the realigned shifted half-matrices, as conjugates, into respective second block positions to produce shifted and unshifted full matrices from the half-matrices, including changing a sign of imaginary parts of the copied complex coefficients;
  aligning and summing overlapping complex coefficients of the unshifted matrix and the shifted full matrices to produce an expanded frequency coverage matrix; and
  inversely transforming the expanded frequency coverage matrix into the spatial domain to produce an enhanced resolution image.

17. The non-transitory computer readable storage medium of claim 16, implementing the method further comprising:
  using a sequence of enhanced resolution images, produced by repeatedly applying actions of claim 16, to sequence samples imaged by the sensor over multiple cycles.

18. The non-transitory computer readable storage medium of claim 16, wherein positions of the complex coefficients in the second blocks, when arranged in a corner shifted matrix, are rotated 180 degrees from positions of the complex coefficients in the second blocks.

19. The non-transitory computer readable storage medium of claim 16, implementing the method further comprising:
  applying, during the intermediate transformations, a one or two-step Wiener filtering to reduce noise.

20. The non-transitory computer readable storage medium of claim 19, implementing the method further comprising:
  applying an independent modulation transfer function to the phase separated matrices to compensate for optical transfer of contrast, which decreases with increasing spatial frequency, by an objective lens transferring the target under the structured illumination to a sensor; and then later applying noise removal components of the Wiener filtering.

21. The non-transitory computer readable storage medium of claim 16, implementing the method further comprising:
  applying, before the subpixel shifting transformation, Apodization filtering.

22. The non-transitory computer readable storage medium of claim 16, wherein the phase-separated matrices in the Fourier domain include an even number of rows and an even number of columns, further including setting equal between the shifted matrices a DC column, of DC complex coefficients, and a middle column, of other complex coefficients.

23. The non-transitory computer readable storage medium of claim 22, implementing the method further comprising:
averaging, over the shifted matrices, values in the DC column, of DC complex coefficients, and the middle column, of other complex coefficients before the setting equal.

24. The non-transitory computer readable storage medium of claim 22, implementing the method further comprising:
copying values in the DC column, of DC complex coefficients, and the middle column, of other complex coefficients from one of the shifted matrices to another of the shifted matrices.

25. The non-transitory computer readable storage medium of claim 22, implementing the method further comprising:
calculating a weighted average, over the shifted matrices, of values in the DC column, of DC components, and the middle column, of other components before the setting equal.

26. The computer readable medium of claim 22, wherein the column averaging precedes the subpixel shifting.

27. The computer readable medium of claim 16, wherein at least one of the phase-separated matrices in the Fourier domain is corner shifted, DC complex coefficients appear in a top row and a left column of the matrices and the complex coefficients conjugates appear in a second block rotated 180 degrees from an orientation of the first block.

28. The computer readable medium of claim 27, wherein the phase-separated matrices in the Fourier domain include an odd number of rows and an odd number of columns without a middle column between the first blocks and the second blocks.

29. The computer readable medium of claim 16, further impressed with program instructions, the method further including applying the method to sets of at least three images of the target captured through a lens by a sensor in the spatial domain, from phase displacements along two angles of the structured illumination of the target, wherein the target includes regularly spaced nanowells and the two angles of the structured illumination are along diagonals between opposing corners of quadrilaterals among the regularly spaced nanowells.

30. The computer readable medium of claim 16, further impressed with program instructions, the method further including applying the method to sets of at least three images of the target captured through a lens by a sensor in the spatial domain, from phase displacements along three angles of the structured illumination of the target, wherein the target includes regularly spaced nanowells and the three angles are along diagonals between opposing corners of hexagons among the regularly spaced nanowells.

31. A method to produce an enhanced resolution image from images of a target captured under structured illumination, the method including:
transforming at least three images of the target, captured by a sensor in a spatial domain from at least three phase displacements of the structured illumination along one angle, into a Fourier domain to produce at least three frequency domain matrices that each include first blocks of complex coefficients and redundant, second blocks of complex coefficients that are conjugates, to the first blocks;
using estimated reconstruction parameters, applying an inverse mixing matrix to the first blocks to produce at least three phase-separated half-matrices in the Fourier domain, including one unshifted and at least two shifted half-matrices, derived from the first blocks of the phase-separated half-matrices;
performing a subpixel shifting transformation of the shifted half-matrices, including transforming from the Fourier domain into the spatial domain the shifted half-matrices, applying a translation vector to data in the spatial domain, and transforming the translated data back into the Fourier domain to produce realigned shifted matrices;
recovering the redundant conjugate complex coefficients from the unshifted half-matrix and the realigned shifted half-matrices, as conjugates, by copying transformed complex coefficients into respective second block positions to produce shifted and unshifted full matrices from the half-matrices, including changing a sign of imaginary parts of the copied transformed complex coefficients;
aligning and summing overlapping complex coefficients of the unshifted full matrix and the shifted full matrices to produce an expanded frequency coverage matrix; and
inversely transforming the expanded frequency coverage matrix into the spatial domain to produce an enhanced resolution image.

32. The method of claim 31, further including using a sequence of enhanced resolution images, produced by repeatedly applying actions of claim 31, to sequence samples imaged by the sensor over multiple cycles.

33. The method of claim 31, wherein positions of the complex coefficients in the second blocks, when arranged in a corner shifted matrix, are rotated 180 degrees from positions of the complex coefficients in the first blocks.

34. The method of claim 31, further including applying, before the subpixel shifting transformation, a one or two-step Wiener filtering to reduce noise.

35. The method of claim 34, further including applying the two-step Wiener filtering, including:
applying an independent modulation transfer function to the phase separated matrices to compensate for optical transfer of contrast, which decreases with increasing spatial frequency, by an objective lens transferring the target under the structured illumination to a sensor; and then later applying noise removal components of the Wiener filtering.

36. The method of claim 31, further including applying, before the subpixel shifting transformation, Apodization filtering.

37. The method of claim 31, wherein the phase-separated matrices in the Fourier domain include an even number of rows and an even number of columns, further including setting equal between the shifted matrices a DC column, of DC complex coefficients, and a middle column, of other complex coefficients.

38. The method of claim 37, further including averaging, over the shifted matrices, values in the DC column, of DC complex coefficients, and the middle column, of other complex coefficients before the setting equal.

39. The method of claim 37, further including copying values in the DC column, of DC complex coefficients, and the middle column, of other complex coefficients from one of the shifted half-matrices to another of the shifted half-matrices.

40. The method of claim 37, further including calculating a weighted average, over the shifted half-matrices, of values in the DC column, of DC complex coefficients, and middle column, of other complex coefficients before the setting equal.

41. The method of claim 31, wherein at least one of the phase-separated matrices in the Fourier domain is corner shifted, DC complex coefficients appear in a top row and a left column of the matrices and the complex coefficients conjugates appear in a second block rotated 180 degrees from an orientation of the first block.

42. The method of claim 31, wherein the phase-separated matrices in the Fourier domain include an odd number of rows and an odd number of columns without a middle column between the first blocks and the second blocks.

43. The method of claim 31, further including applying the method to sets of at least three images of the target captured through a lens by a sensor in the spatial domain, from phase displacements along two angles of the structured illumination of the target, wherein the target includes regularly spaced nanowells and the two angles are along diagonals between opposing corners of quadrilaterals among the regularly spaced nanowells.

44. The method of claim 31, further including applying the method to sets of at least three images of the target captured through a lens by a sensor in the spatial domain, from phase displacements along three angles of the structured illumination of the target, wherein the target includes regularly spaced nanowells and the three angles are along diagonals between opposing corners of hexagons among the regularly spaced nanowells.

\* \* \* \* \*